(12) United States Patent
Rosenbaum

(10) Patent No.: US 11,227,452 B2
(45) Date of Patent: *Jan. 18, 2022

(54) METHOD FOR DETERMINING DRIVING CHARACTERISTICS OF A VEHICLE

(71) Applicant: Walter Steven Rosenbaum, Jerusalem (IL)

(72) Inventor: Walter Steven Rosenbaum, Jerusalem (IL)

( * ) Notice: Subject to any disclaimer, the term of this patent is extended or adjusted under 35 U.S.C. 154(b) by 190 days.

This patent is subject to a terminal disclaimer.

(21) Appl. No.: 16/575,870

(22) Filed: Sep. 19, 2019

(65) Prior Publication Data

US 2020/0013244 A1     Jan. 9, 2020

Related U.S. Application Data

(63) Continuation of application No. 15/497,458, filed on Apr. 26, 2017, now Pat. No. 10,467,824.
(Continued)

(30) Foreign Application Priority Data

Apr. 26, 2016  (EP) ...................................... 16020153
Apr. 26, 2016  (EP) ...................................... 16020155
Apr. 26, 2016  (EP) ...................................... 16020157
Apr. 26, 2016  (EP) ...................................... 16020158
Apr. 26, 2016  (EP) ...................................... 16020159
(Continued)

(51) Int. Cl.
*G07C 5/08*     (2006.01)
*B60W 20/00*    (2016.01)
(Continued)

(52) U.S. Cl.
CPC ......... *G07C 5/0808* (2013.01); *G01M 17/007* (2013.01); *G07C 5/008* (2013.01)

(58) Field of Classification Search
CPC ....... G07C 5/08; G07C 5/0808; B60W 20/00; B60W 10/08; B60W 30/18; F02D 41/02;
(Continued)

(56) References Cited

U.S. PATENT DOCUMENTS 10,467,824 B2 *  11/2019  Rosenbaum ........ G01M 17/007
2012/0209463 A1 *  8/2012  Gibbs ..................... B60K 6/46
701/22
(Continued)

FOREIGN PATENT DOCUMENTS

JP     H09301143 A      11/1997
WO     2016012185 A1     1/2016
WO     WO-2016012185 A1 *  1/2016  ............ B60T 8/1705

*Primary Examiner* — Yuri Kan
(74) *Attorney, Agent, or Firm* — Laurence A. Greenberg; Werner H. Stemer; Ralph E. Locher

(57) ABSTRACT

To provide an enhanced method to determine from a driving characteristics of the vehicle a long term mechanical stress of a vehicle, it is proposed that during operation of the vehicle an acceleration of the vehicle is detected by an acceleration sensor in the vehicle and evaluated by a vehicle analyzing system in the vehicle, wherein a driving parameter occurring during an acceleration event in which the vehicle acceleration is above a predetermined threshold is used to determine a driving characteristics value of the vehicle.

17 Claims, 15 Drawing Sheets

Related U.S. Application Data

(60) Provisional application No. 62/371,405, filed on Aug. 5, 2016, provisional application No. 62/371,407, filed on Aug. 5, 2016, provisional application No. 62/338,216, filed on May 18, 2016.

(30) Foreign Application Priority Data

| May 13, 2016 | (EP) | ..................................... 16020178 |
| May 25, 2016 | (EP) | ..................................... 16020190 |
| May 25, 2016 | (EP) | ..................................... 16020191 |
| Dec. 9, 2016 | (EP) | ..................................... 16020489 |

(51) Int. Cl.
*B60W 10/08* (2006.01)
*B60L 11/18* (2006.01)
*G01M 17/007* (2006.01)
*G07C 5/00* (2006.01)

(58) Field of Classification Search
CPC ....... F02D 41/10; G01C 21/26; B60T 8/1705; B60L 11/18; G01M 17/007
See application file for complete search history.

(56) References Cited

U.S. PATENT DOCUMENTS

| 2013/0085655 | A1* | 4/2013 | Kii | ......................... B60K 31/18 |
| | | | | 701/103 |
| 2014/0121928 | A1* | 5/2014 | Kurumisawa | .......... B60T 8/1755 |
| | | | | 701/70 |
| 2015/0073634 | A1* | 3/2015 | Rosenberger | ............. B60L 7/26 |
| | | | | 701/22 |
| 2015/0266390 | A1* | 9/2015 | Shin | ..................... B60L 11/1851 |
| | | | | 701/22 |
| 2015/0375748 | A1* | 12/2015 | Nagase | ............. B60W 30/0953 |
| | | | | 701/41 |
| 2016/0281620 | A1* | 9/2016 | Nakade | ................ B60W 30/146 |
| 2017/0219356 | A1* | 8/2017 | Murayama | .............. G01C 21/26 |

* cited by examiner

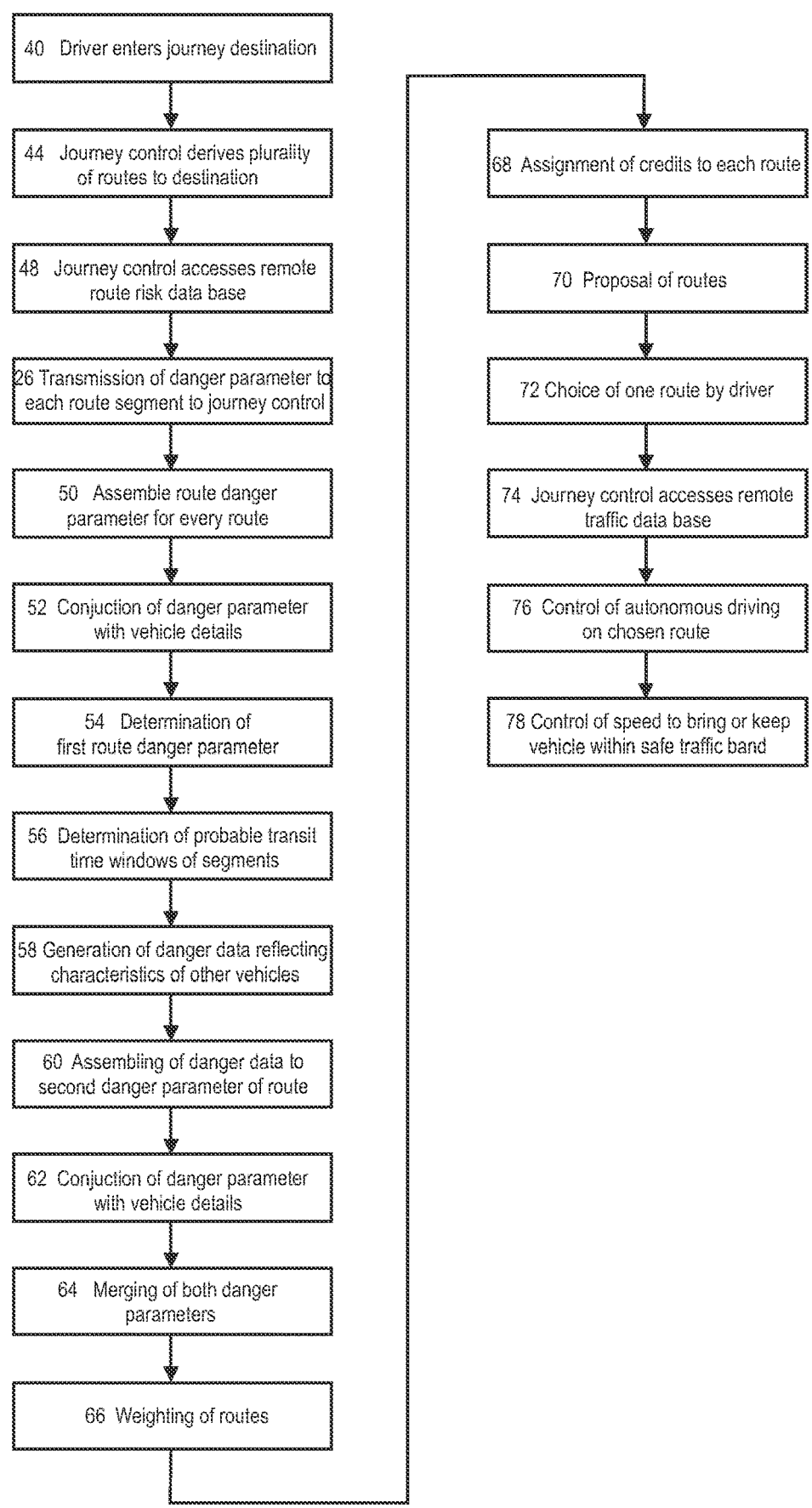

FIG 16

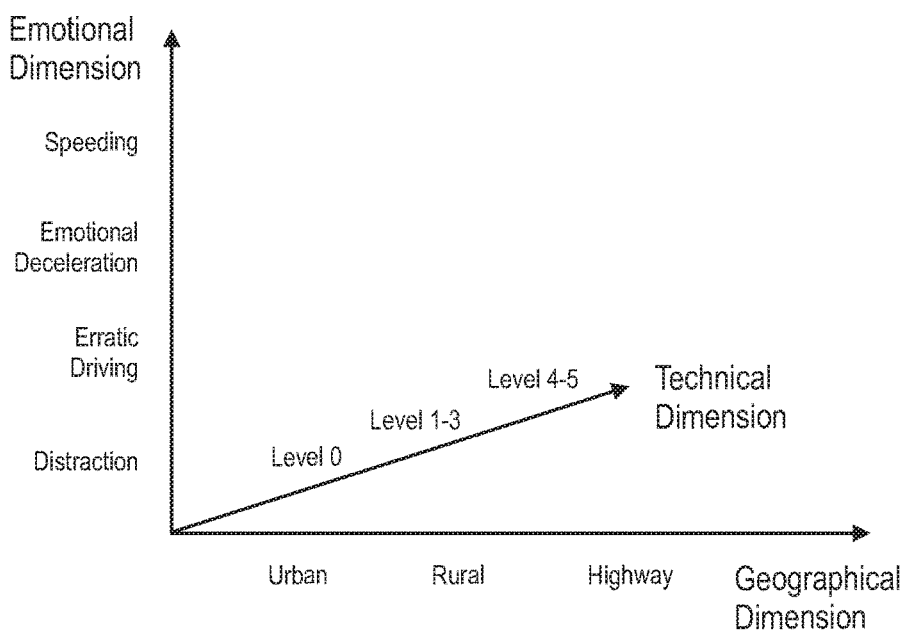

FIG 17

1) Metric Values $\quad \underbrace{m_{01}, m_{02}, \ldots m_{0n}}, \quad \underbrace{m_{11}, m_{12}, \ldots m_{1n}}, \quad \underbrace{m_{41}, m_{42}, \ldots m_{4n}},$ 2) Metric $\quad\quad\quad\quad\quad QM_0 \quad\quad\quad\quad\quad QM_1 \quad\quad\quad\quad\quad QM_4$ 3) Variance $\quad\quad\quad\quad\quad \sigma_0 \quad\quad\quad\quad\quad\quad \sigma_1 \quad\quad\quad\quad\quad\quad \sigma_4$ 4) Statistical Test

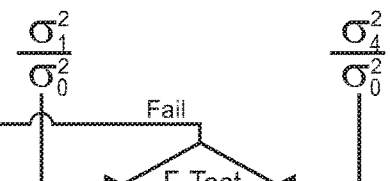

5) Supplemental Test

6) Weighting

7) Application

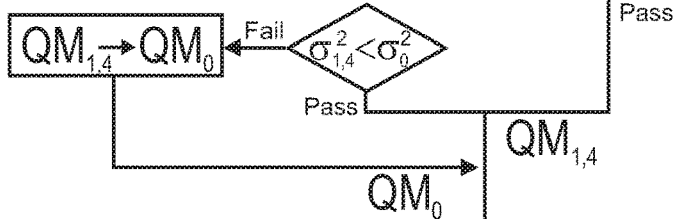

METHOD FOR DETERMINING DRIVING CHARACTERISTICS OF A VEHICLE

CROSS-REFERENCE TO RELATED APPLICATION

This application is a continuation of patent application Ser. No. 15/497,458, filed Apr. 26, 2017; which claimed the benefit, under 35 U.S.C. § 119(e), of provisional applications Nos. 62/371,405, filed Aug. 5, 2016, 62/371,407, filed Aug. 5, 2016, and 62/338,216, filed May 18, 2016. The application also claims the priority, under 35 U.S.C. § 119, of the following European patent applications:

EP 16020153, filed Apr. 26, 2016;
EP 16020155, filed Apr. 26, 2016;
EP 16020157, filed Apr. 26, 2016;
EP 16020158, filed Apr. 26, 2016;
EP 16020159, filed Apr. 26, 2016;
EP 16020178, filed May 13, 2016;
EP 16020190, filed May 25, 2016;
EP 16020191, filed May 25, 2016; and
EP 16020489, filed Dec. 9, 2016.

The prior applications are herewith incorporated by reference in their entirety.

BACKGROUND OF THE INVENTION

Field of the Invention

The invention relates to a method for determining driving characteristics of a vehicle.

Many aspects of vehicles require exact knowledge of mechanical stress which is applied on components of the vehicle, like a car or motorbike, during its operation. One aspect is cost efficient construction and design of a vehicle and its parts exposed to wear during driving. Usually, such mechanical stress is evaluated during long testing periods of a new vehicle, wherein a testing version of the vehicle is driven by test drivers over longs distances under all kinds of driving conditions. During such driving tests sensors measure all kinds of driving characteristics parameters, and after a testing period components of the vehicle are determined for wear and damage.

Although such testing periods supply vehicle manufacturers with huge amounts of data it happens from time to time that first vehicle versions sold in the marked feature component defects resulting from incorrect wear estimations of the manufacturer. The term "wearout" will be synonymous with "wear" in the following. On the other end, it happens during repair of vehicles that damaged components are replaced prompting the question what kind of long term driving characteristics caused such wearout or damage of the component. One answer to such question is individual driving characteristics of different vehicle drivers which are difficult to simulate or imitate during long term testing periods by test drivers. Normal wear testing, as part of production certification, suffers from the inability of a priori testing to anticipate the complexity of real-life life circumstances.

Hence to bridge between production testing and the event driven wear world, it would, therefore, be helpful to learn more about and quantify individual driving characteristics. For this it is helpful to cover enough real-life testing results to statistically quantify with known reliability the wearout profiles of components of a vehicle. Further, a comparison of wearout on components of a vehicle and measured individual driving characteristics of the vehicle driver would provide the manufacturer with detailed mechanical stress information with regard to specific components. Such information is valuable during redesign of the component for future versions of the vehicle. In an analogous manner such quantification of driver induced stress on the vehicle can be entered into telematics risk management as used in User Based Insurance.

Another aspect of driving involves many different driving assistant systems active during a journey of a vehicle. A typical example is a braking assistant, measuring the vehicle speed and a distance to an obstacle located in the front of the vehicle. Depending on the speed and the distance of the vehicle to the obstacle the braking assistant initiates an emergency braking to prevent a collision of the vehicle with the obstacle.

Although these intelligent assists should vest a vehicle with a degree of proactive control of it dynamics and component wear, fundamentally they all filter back to the driver/operator whose human attributes can nullify or distort the intended driving aids potential impacts. Still having a driver dependency implies the driver's responsiveness to safety aids determines their effectiveness, not the technology itself. Talking on phone, or radio turned up high or conversation can blot out warnings and similar human distractions can affect the efficacy of most other aids.

Furthermore, depending on the driving habits of different drivers, some drivers tend to react early to an obstacle becoming visible in front of the vehicle, thus an early assistant induced emergency braking is very useful since a failure of early braking of the driver is evidence of distraction or other dangerous reason. Other drivers, however, tend to a rougher driving style and are used to brake later and more suddenly. An early intervention of the braking assistant might then be annoying to the driver with the risk that the driver deactivates the braking assistant. It would be desirable, therefore, if a more individual driving characteristic would be used to control a driving assistant system, so that the system could be adapted to the current driving situation.

BRIEF DESCRIPTION OF THE INVENTION

It is an object of the invention to provide an enhanced method for determining driving characteristics of a vehicle and particularly to determine from the driving characteristics a long term mechanical stress of a vehicle, or to control a driving assist or autonomous system using driving characteristics of the vehicle.

This object is solved by a method for determining driving characteristics of a vehicle, wherein during operation of the vehicle an acceleration of the vehicle is detected, preferably continuously detected or at random times, by an acceleration sensor in the vehicle and may be evaluated by an analyzing system in the vehicle. A driving parameter occurring during an acceleration event in which the vehicle acceleration is above a predetermined threshold is used to determine a driving characteristics value of the vehicle.

The invention is based on the consideration that individual driving characteristics is reflected by certain driving behavior parameters which, for example, influence driving safety and the long term wearout of vehicle components as well. Such driving behavior can be inattentive driving, low anticipatory driving, or highly emotional driving. Such behavior can fairly well be detected by monitoring specific acceleration events occurring during driving. If, for example, a vehicle is decelerated disproportionately often from a speed value to zero with a high deceleration value, this can be evidence for inattentive driving. If, in a second example, a vehicle shows high acceleration values during high speed driving, or a high deceleration shortly after a high acceleration, this is evidence for low anticipatory driving, or highly emotional driving, respectively. If, in a third example, a strong acceleration occurs at high speed this could be a sign of highly emotional driving related to specific wearout of high speed/high acceleration driving. The adaptation of a driver assistant system to the current driving characteristics may lead to a more efficient intervention of the system.

With regard to wear and tear of vehicle components, for instance, each driving style causes different stress pattern resulting in different wearout symptoms of characteristic components of the vehicle. Since the driving style or driving characteristics of individual drivers is difficult to simulate or replicate in test phases of a new vehicle, the determination of driving characteristics of a vehicle is a valuable method for determining a long term mechanical stress of the vehicle and/or providing statistical inference to related projections such as those related to road side repair and UBI pricing. Even further, the warranty period of a vehicle can be made dependent on the components wear or the driving characteristics of a driver or a vehicle. If the driving characteristics value indicates a driving with potentially low wear of mechanical components of the vehicle the warranty can be prolonged. Since this is an attractive incentive for the vehicle owner he may want to change his driving behavior leading to better driving safety—and in general: traffic safety for surrounding vehicles. Accordingly, determining the driving characteristics of a driver or vehicle involves many advantages for vehicle construction, wearout prediction and vehicle repair, UBI risk assessment, warranty adaptation, and traffic safety.

Further, the driving characteristic can be an accident risk of the vehicle, like over a driving timespan, driving distance or road section, or a driving safety relevant parameter.

The driving characteristic value can be a quantification of the driving characteristic, either a single numerical value, a multidimensional value, like a vector, or a function dependent on a one or more independent parameters. The value can be used for controlling a driving assist system. A driving assist system is an electronic system in the vehicle for supporting the driver in specific driving situations, like safety critical situations, or situations where the driving comfort or driving economy can be enhanced by the system. In the following driver assist systems include those systems which leave the final control to the driver and those which overtake control from the driver either in special situations or in general for a specific function, like during autonomous driving. A driver assist system may intervene semi-autonomously or autonomously into the drivetrain—brake or acceleration, or another system control, or alert the driver through a human machine interface in safety critical situations.

Acceleration events, thus a permanent positive or negative acceleration of the vehicle above a predetermined acceleration threshold value over a time period, have two main triggers: Free driver decisions on one hand, like to overtake another car or jump into a short space in a neighboring faster driving lane, and traffic or sudden change induced situations, like the change of a traffic light right in front of the vehicle, on the other hand. While the freely chosen acceleration events mostly are begun with high positive acceleration, the traffic induced situations usually involve strong negative acceleration moments, thus high deceleration values.

Further, the vehicle speed value immediately before, during or immediately after the acceleration event helps to separate purely traffic induced acceleration events from driver characteristic influenced acceleration events. If, for example, another vehicle in front brakes strongly, or another traffic participant disregards a right of way, the vehicle under observation will experience a significant deceleration. However, the speed at the end of the acceleration event give significant evidence of how the driver is used to react on such traffic event. An attentive driver will have more space between the vehicles for braking his vehicle into safe condition than an inattentive driver, resulting in a higher end speed after the braking process for the attentive driver, and thus in less mechanical stress for the vehicle for certain vehicle components. Further, if a vehicle is braked down to zero, a strong positive acceleration alteration occurs at to the moment of stopping the vehicle, since the negative acceleration during braking changes to zero acceleration in the moment of stopping the vehicle. Such moments will cause relatively strong wear of muffle elements or similar components in the vehicle. Accordingly, a generally or often inattentive driver will have a significant different wearout characteristics in certain components of the vehicle than an attentive driver. These same driver induced vehicle excess stress and wear also have direct statistical extrapolation to rating of roadside repair and UBI policy rating.

The acceleration can be analyzed by the vehicle analyzing system in the vehicle. It can then determine whether an acceleration falls into the category of an acceleration event, thus is above the threshold. By this a time period of the acceleration event can be determined. The driving parameter may be monitored permanently for finding those driving parameter values which occurred during the time period of the acceleration event. Or the monitoring of the driving parameter is triggered by the acceleration event, thus delivering only those parameter values which occurred during the time period of the acceleration event. In general, the driving parameter may be buffered, so that its values which occurred a predetermined time span before the beginning of the acceleration event can be associated to the acceleration event as well. Preferably, only those driving parameter values which occurred during the acceleration event—or are associated by means of buffering—are used to determine the driving characteristic value.

The driving characteristics of a vehicle can be one specific driving characteristic or a plurality of different driving characteristics in combination. The driving parameter can be a vehicle speed value indicating a speed that the vehicle drove during the acceleration event or a predetermined time span before or after the acceleration event, for instance. Such speed or another driving parameter in addition or alternatively can be used to determine the driving characteristics value of the vehicle.

If the driving parameter is an activity of a mobile communication device of the vehicle analyzing system, the driving parameter can be used to determine the current state of distraction of the driver. If, for example, the driver is telephoning and a strong braking of the vehicle occurs, this is a strong sign of hazardous distraction. A braking assistant, a lane departure warning system or other safety relevant driving assistant can be adapted to the current situation, so that it interferes earlier, for example, without disturbing the driver.

For quantifying a communication action, i.e. an activity of the mobile communication device, a numerical value can be related to each communication action, resulting in a driving parameter value. If communication action is detected during an acceleration event, data related to the communication action can be stored, like metadata of an incoming or outgoing telephone call. No recording of a spoken message or the telephone call as such is necessary. From the metadata a numerical value can be derived resulting in a driving parameter value. Metadata from an incoming text message may be turned into a low value and an outgoing telephone call in a higher value, for example.

The driving characteristics value can be used as mechanical stress indicator for specific vehicle parts, at least one mechanical compound of the vehicle. In this way the determination of the driving characteristics value is a helpful method for determining a long term mechanical stress of the vehicle, or of one or more of its mechanical components. Further, the driving characteristics value can be used to assess specific stressful driving characteristics of a particular driver relevant to—for example—pricing, road side repair or UBI liability coverage, respectively.

Preferably, the invention relates thus to a method for determining a long term mechanical stress of a vehicle, wherein the driving characteristics of the vehicle is determined, as mentioned above, and the long term mechanical stress is determined from the driving characteristics value of the vehicle.

In general, for determining a vehicle driving characteristics providing information about long term mechanical stress of the vehicle or long term wearout characteristics of components of the vehicle, it is advantageous to detect the acceleration of the vehicle, and to evaluate a driving parameter, like vehicle speed or an activity of a mobile communication device, during the acceleration event differently than outside the acceleration event. Or in other words, from the moment on when the acceleration exceeds a positive or negative acceleration threshold and until the acceleration A falls below the threshold $A_T$ the driving parameter is evaluated differently as outside this time period.

The acceleration event is thus existent in the time window where $A>A_T$, or in other words from $t_1$ to $t_2$, where $t_1$ is the time when A exceeds $A_T$, and $t_2$ is the time when A falls below $A_T$. In an alternative $t_2$ is set differently, for example the time point where A falls to zero, thus the time window reaches to the end of the acceleration. In a further alternative the time window is fixed in time with $t_1$ the time when A exceeds $A_T$, and $t_2$ is a fixed time span later, like 1 minute.

Preferably, the acceleration is a longitudinal acceleration, thus a positive or negative acceleration in the normal driving direction of the vehicle. An advantageous threshold for positive and/or negative acceleration lies between 0.2 and 0.4 g, and lies preferably at 0.3 g.

The predefined threshold value can be used as a trigger for recording position data, as GPS values, or communication activity, for example. The recording and/or saving of position data or communication activity in a memory can be triggered by an acceleration event. In another embodiment the predefined threshold value is used as a trigger for determination of speed data from the position data, and preferably for storing speed data in a memory for later use. The recording or storing of location data, communication activity, and/or determination of speed can be started at the beginning or at a predefined time span before the beginning of the acceleration event, and can be terminated at the end or at a predefined time span after the beginning of the acceleration event. For starting before the acceleration event, the location data can be temporarily stored in a buffer and transferred to a permanent memory in case of an occurrence of an acceleration event.

The driving characteristics value is determined from the driving parameter, like the vehicle speed value, a vehicle acceleration value or a time value which is related by one or more predetermined correlations with an acceleration event. Examples for such values are
    vehicle speed at the beginning of the acceleration event,
    vehicle speed at the end of the acceleration event,
    maximum vehicle speed during the acceleration event,
    maximum vehicle speed during a continuous acceleration after the beginning of an acceleration event,
    maximum vehicle speed within a predefined time window after the beginning of an acceleration event,
    vehicle speed at the end of a continuous deceleration after the beginning of an acceleration event,
    a vehicle speed difference between the vehicle speed at two time points, like at the beginning and at the end of the acceleration event, or at the beginning of the acceleration event and the time point where deceleration becomes zero.
    one or both vehicle speeds at a predetermined time point of the acceleration event(s), like the beginning of one or both acceleration events,
    speed difference at the time points of the beginning of the first acceleration event and the end of the second acceleration event,
    one or both maximum accelerations of one or both acceleration events,
    the duration of one or both acceleration events, and/or
    the time span between the two acceleration events, like from the end of the first event to the beginning of the second event.

The driving parameter—in any form, like listed above—related to an acceleration event may give information about the behavior of the driver with regard to the relation of driving parameter, like driving speed, and driving acceleration, especially to erratic acceleration and thus to erratic driving. The communication activity during an acceleration event gives information about the behavior of the driver with regard to his distraction during driving. Thus, the driving parameter characterizes driving distraction. This are examples of emotional driving behavior. Thus, he driving parameter characterizes the acceleration event, especially erratic driving. Depending on the driving parameter, the following event data can be distinguished:
    acceleration event data,
    deceleration event data,
    erratic driving data, and
    distraction driving data.

A more integrated value for determining the driving characteristics value is an acceleration event value. For determining an acceleration event value the above values can be set in relation to one another, and/or acceleration characteristics can be used additionally, like
    the maximum acceleration during the acceleration event,
    the duration of an acceleration event, and
    a sequence of acceleration events within a predetermined time period.

Further, an acceleration event value can be calculated from
    one or more vehicle speed values which can be combined in an arbitrary manner,
    one or more communication activities which can be combined in an arbitrary manner, wherein a communication activity can be rated by a value to result in an acceleration event value by itself or in combination with another acceleration characteristics value related to the acceleration event, possibly one or more acceleration characteristics which can be combined in an arbitrary manner with one or more vehicle speed values or communication activities, and/or one or more further parameters, like the time of the day of the acceleration event, a geographical place or region where the event took place, and/or a characteristics of the place or region, like an urban or rural place or a driving on a highway or expressway.

An acceleration event value can be a one dimensional value or a more dimensional acceleration event vector if more than one single value is the result of such combination. In the following for the reason of simplicity, a more dimensional acceleration event vector is called an acceleration event value as well.

A more informative driving characteristics value can be generated if a plurality of acceleration event values, like multiple speed differences each within an acceleration event, are subsumed, like averaged, to a driving metric. There are four driving metrics distinguished:

Acceleration quality metric,
Deceleration quality metric,
Erratic quality metric, and
Distraction quality metric.

An acceleration quality metric can be, for example, the average of maximum speeds of multiple acceleration events. A deceleration metric can be, for example, the average of multiple speed differences divided by the average vehicle speed at the beginning of the respective deceleration events. A further example of a deceleration quality metric is this average speed difference divided by an average speed, like the speed of the vehicle at the beginning or at the end of the acceleration events, or the statutory speed of the location where the vehicle drove at the beginning or at the end of the acceleration events. Such driving metrics are meaningful mechanical stress indicators from which mechanical stress and/or wearout properties can be derived as well as driver assist control values or UBI inference.

In other words, the evaluation of the driving characteristic, long term mechanical stress, or driver induced stress of a vehicle, respectively, may comprise the determination of a driving metric. In general, the driving metric can be derived from an average of a plurality of acceleration event values,
a variance of a plurality of acceleration event values,
a quotient of any of the values mentioned in this paragraph or before, like an average of a plurality of acceleration event values divided by an average of the driving parameter values occurring at the beginning or end of the acceleration events.

This is true for all four kinds of driving metrics.

Again the value of the stress or wearout determination result can be increased if a driving metric is calculated from a plurality of acceleration event values from multiple acceleration events. One method is to associate the acceleration event values each with a geostationary parameter of the location where the acceleration event occurred, like the category urban, rural or highway. For one or each category a plurality of acceleration event values are subsumed, like averaged, to a driving metric. The plurality of events can be all events of a trip, of a day or any other predetermined time period or driving distance.

From the above it becomes clear that from the driving parameter—depending on the event resulting in acceleration event data, deceleration event data, erratic driving data, and/or distraction driving data—an acceleration event value can be derived. From the driving parameter directly as the lowest level or from the acceleration event value as the next higher level, a driving metric can be derived, called driving quality metric as well, like acceleration quality metric, deceleration metric, erratic driving metric and distraction metric. The driving characteristics can be a metric, or it is derived from one of the above levels. Thus, the driving characteristic can be any of the above levels or a forth level above the metric level. From the metric directly or the driving characteristic the driving assist control value or function is derived—or a tear and wear value/function or a UBI rate.

Thus there are multiple level of data:
Level 1: The driving parameter, categorized into event data
Level 2: The acceleration event value, derived from level 1
Level 3: The driving metric, derived from level 1 or 2
Level 4: The driving characteristics, derived from level 1, 2 or 3
Level 5: The driving assist control value/function, for example, derived from level 3 or 4

The driving characteristics value can be—or derived from—a vehicle speed value or a communication activity directly, an acceleration event value, or a driving metric. A driving assist control value or function or the mechanical stress of a component of the vehicle can be calculated from the driving characteristics value and driving assist control parameters or vehicle component parameters, respectively.

New vehicles released the last years are supplied with an on board diagnose system and a communication unit for transmitting operation data and/or defect data to a remote server, like a server of a vehicle repair shop or the vehicle manufacturer. Acceleration data measured by the on board diagnose system or any other sensor system fixed or contained in the vehicle could be used to collect data which are used to determine the driving characteristics value and thus to evaluate mechanical stress and wearout data of vehicle components and corresponding UBI characteristics. Additionally or alternatively the acceleration sensor could be embedded in a mobile device, like a smartphone.

In a second embodiment of the invention a measure for inattentive driving, and thus for specific wearout of vehicle components or associated UBI risk assessment, is the vehicle speed value at the beginning and the end of an acceleration event, or, in other words: the speed difference caused by a strong acceleration, like braking of the vehicle. The speed difference is used as acceleration event value for determination of the driving characteristics value by the server. To prevent the creation of large amount of not useful data the acceleration event value may be stored only if the driving speed at the end of the acceleration event is at or below a threshold speed, and the driving value is discarded if the driving speed is above the threshold. Preferably, the threshold is below 5 km/h, especially 0 km/h.

The intensity of a braking has strong influence on the wearout property of this braking process as well as vehicle or driver UBI assessment. Accordingly, it is advantageous to include a further speed value or acceleration value into the calculation of the acceleration event value. In a first example the vehicle speed at the beginning of the acceleration event is used as divider for the speed difference. The acceleration event value is then the speed difference of the acceleration event divided by the vehicle speed at the beginning of the acceleration event. In a second example the maximum acceleration is used as multiplier for the speed difference. The acceleration event value is then the speed difference of the acceleration event multiplied by the maximum acceleration of the acceleration event, possibly multiplied with a predetermined constant factor. In a third example the time span of the acceleration event is used as multiplier for the speed difference or the speed at the beginning of the acceleration event. The acceleration event value is then the speed difference of the acceleration event multiplied by the time span of the acceleration event, possibly multiplied with a predetermined constant factor. Further, the vehicle speed at the beginning of the acceleration event, the maximum acceleration of the acceleration event and/or the time span of the acceleration event may be used with the speed difference in any multiplying and/or dividing manner to generate the acceleration event value.

In general with regard to the positive acceleration detection. A simple method is the evaluation of a plurality of speed values sent to the server without time and acceleration data. The higher the speed value and the higher the number of such acceleration events is during a driving trip, a day, or any other time period or driving distance, the higher is the driving characteristics value.

In a more detailed method the speed value is compared with a geostationary speed value, like the speed limit at the location where the acceleration event occurred, or an average speed of other vehicles at this position during a predetermined time period. In general, geostationary dat may be any data which refer to location, place or device fixed in its geographical location, like data found in a Geographical Information System (GIS). This comparison leads to the driving characteristics value, which might be the positive difference between the speed value and the statutory value. The event may be ignored and data be erased from the server memory if the difference is negative, the maximum driving speed during the acceleration event being below the statutory value. The speed difference is an acceleration event value useful for calculating a driving characteristics value.

In general: If the observed vehicle speed value lies in a predetermined position with respect to the geostationary speed value, like above a statutory speed limit, the driving characteristics value is determined, by the server, for instance. If the observed vehicle speed value lies in a predetermined other position with respect to the geostationary speed value, like within a statutory speed limit, it is advantageous, that the observed vehicle speed value, and preferably all acceleration event data coming with this acceleration event, is erased from the memory of the evaluating unit, like the server, preferably from every unit. With this a generation of masses of less valuable data is prevented, and privacy is kept in a more thorough way.

In a third method acceleration data are additionally used to generate the acceleration event value, like a maximum acceleration or a duration of the acceleration event.

If for generation of an acceleration event value the location and/or the time of the acceleration event is necessary, such data need to be transmitted to the server. Preferably, the vehicle analyzing system assigns location and/or time to the acceleration event and transmits these data together with the speed value to the server, without transmitting an exact driving route or a course of driving speed before and/or after the acceleration event.

In an alternative method the speed value is assigned by the vehicle analyzing system to a travel trend line which was generated by the vehicle analyzing system, preferably the app. The trend line is transmitted to the server together with its speed value. The server assigns a type of area to the trend line and determines the driving characteristics value from the speed value and the type of area, like urban, rural, or highway.

Further, the driving characteristics value derived from a driving metric describes a driving style of a driver of the vehicle, at least for one trip or over a day or another predetermined time span. This information can be used for feedback to the driver, like giving a proposal for a recreation break during the trip. Another useful application for such data is the use for actuarial purposes. If the driver takes part on a Pay How You Drive system (PHYD), or better known as User Based Insurance (UBI), the estimation of the risk of driving of individual drivers is essential. The driving characteristics value derived from a driving metric is a valuable tool for determining such risk.

In general, specific and advantageous details of the invention are outlined in the following.

Preferably, the driving characteristics value is a value indicating mechanical stress of at least one mechanical component of the vehicle. The value may be used to determine a long term driver induced mechanical stress of the vehicle.

The acceleration can be a speedup of the vehicle and the driving parameter can be a maximum speed value during the acceleration event. The maximum speed value may be used to calculate the driving characteristics value of the vehicle.

An acceleration event value can be calculated from the driving parameter and a geostationary speed value assigned to the position where the acceleration event occurred. The driving parameter in this case is preferably the vehicle speed during an acceleration event. This acceleration event value may then be used in the calculation of the driving characteristics value.

Preferably, the acceleration event value is used in the calculation of the driving characteristics value only if the vehicle speed is in a predetermined relation to the geostationary speed value, like above the geostationary speed value, especially above a predetermined value above the geostationary speed value, like 5% above the geostationary speed value. If the vehicle speed is outside the predetermined relation to the geostationary speed value, like at or below the geostationary speed value, the speed value may be erased from the memory before any use in a calculation of the driving characteristics value.

The geostationary speed value can be a statutory speed limit at that position, and the predetermined relation is the speed value being higher than the statutory speed limit. Alternatively or additionally the geostationary speed value can be an average speed of other vehicles at that position, especially dependent on the time of the day.

Preferably, the driving characteristics value is derived from driving parameter values of a plurality of acceleration events during a driving event like during a continuous journey of the vehicle. The driving characteristics value can be derived from a of acceleration values occurring in a plurality of acceleration events.

The driving parameter can be a vehicle speed which occurred during the acceleration event, wherein for determination of the driving characteristics value the vehicle speed may be assigned to a geostationary traffic category. Such category may be traffic category, like urban, rural or highway of the place of occurrence of the acceleration event.

Preferably, for each category a plurality of driving parameter values are averaged to a driving metric.

The communication system may comprise a mobile communication device and a communication device fixed in the vehicle. The mobile communication device may collect position data of the positions where the vehicle drove during the acceleration event and may calculate a vehicle speed from the position data. Preferably, the mobile communication device is a mobile phone.

The acceleration sensor can be located in a fixed device of the vehicle analyzing system, like a dongle plugged into an on-board diagnose system port or interface of the vehicle and/or a mobile device of the vehicle analyzing system, like in a mobile phone, which may further comprise a software application which adapts the acceleration threshold to the type of the acceleration sensor.

The acceleration can be a negative acceleration of the vehicle, and the speed at the beginning of the acceleration event is higher than at the end of the acceleration event.

Preferably, the driving parameter is the speed difference between the speed at the beginning of the acceleration event and the speed at the end of the acceleration event.

The driving parameter may be stored if the vehicle speed at the end of the acceleration event is at or below a threshold speed, and the driving parameter is discarded if the vehicle speed is above the threshold. Especially, in a preferred embodiment of the invention, the driving parameter is stored if the vehicle speed at the end of the acceleration event is zero, and the driving parameter is discarded if the vehicle speed at the end of the acceleration event is above zero.

Preferably, the speed at the beginning and at the end of the acceleration event is used to calculate an acceleration event value from which the driving characteristics value is derived. The acceleration event value may be, for instance, calculated from the speed difference between the speed at the beginning and at the end of the acceleration event divided by the speed at the beginning of the acceleration event. Further, an acceleration quality metric can be calculated from average of a plurality of speed differences between the speed at the beginning and at the end of a plurality of acceleration events divided by the average of the plurality of respective speeds at the beginning of the acceleration events, or divided by the average of the plurality of respective statuary or prevailing speeds at the beginning or end of the acceleration events.

Another advantageous possibility would be to calculate the acceleration event value from the speed difference between the speed at the beginning and at the end of the acceleration event multiplied by the maximum negative acceleration value during the acceleration event. An acceleration metric can be calculated in the same way by averaging over a plurality of acceleration events, as described above.

In general, the driving characteristics value may be derived from a duration time of the acceleration event. More specifically, the acceleration event value can be calculated from the speed difference between the speed at the beginning and at the end of the acceleration event multiplied by the duration of the acceleration event. Again, an acceleration metric can be calculated in the same way by averaging over a plurality of acceleration events.

In general, to receive a more superior value the driving characteristics value may be derived from a number of acceleration events during a driving event and the driving parameter values of those acceleration events.

An acceleration event value can be determined from the driving parameter which occurred during the acceleration event, and wherein for determination of the driving characteristics value the acceleration event value is assigned to a geostationary category of the place of occurrence of the acceleration event. The geostationary category can be a traffic category, like urban, rural or highway, for instance, of the place of occurrence of the acceleration event. Preferably for each category a plurality of driving acceleration event values are averaged to a driving metric.

In a further embodiment of the invention a plurality of driving parameter values, each being a speed difference within an acceleration event, are averaged to an average speed value, and a mechanical stress indicating driving metric is determined from the average speed value divided by the average vehicle speed at the beginning of the acceleration events.

In general with regard to erratic driving, this is a driving style causing distinct mechanical stress and wearout on certain vehicle components, such as damping elements of the vehicle, a clutch and parts related to it. Examples of erratic driving are gap hopping in a traffic jam or risky passing on twisted rural roads. Evidence for erratic driving is, for instance, a strong acceleration followed by a strong deceleration or the other way around, so two opposite acceleration events. Opposite in this context means positive and negative acceleration, thus acceleration, as commonly used for positive acceleration, and deceleration. The predetermined threshold of the acceleration value is the absolute value of the acceleration value, thus an acceleration value above the threshold may result from a strong negative acceleration the absolute value of this acceleration value being positive and above the threshold. The threshold value may be identical for acceleration and deceleration, but will in most cases be different for acceleration and deceleration.

Crucial for a decision whether two opposite acceleration events, like an acceleration followed by a deceleration both over the respective predetermined threshold, are evidence of erratic driving is the time span between the two events. If the two opposite acceleration events occur within a predetermined time period, the events are valuable for determining the driving characteristics value. The time span can be the difference in time between the end of the first acceleration event and the beginning of the following acceleration event.

A data saving method for finding an acceleration event pair comprises the steps that the vehicle analyzing system upon the occurrence of an acceleration event opens a time window having the length of the predetermined time period for the occurrence of an opposite acceleration event, and stores data of the acceleration event only if an opposite acceleration event occurs within the time window.

Preferably the time span between the two opposite acceleration events is entered into an equation for determination of an acceleration event value. The acceleration event value can be an intermediate value derived from the driving parameter occurring during at least one of the acceleration event, and being used for determining the driving characteristics value.

In general, the acceleration event value can be calculated from
- one or both vehicle speeds at a predetermined time point of the acceleration event(s), like the beginning of one or both acceleration events,
- one or both maximum accelerations of one or both acceleration events,
- the duration of one or both acceleration events,
- the time span between the two acceleration events, like from the end of the first event to the beginning of the second event, and/or
- speed difference at the time points of the beginning of the first acceleration event and the end of the second acceleration event.

In this embodiment for quantifying erratic driving the acceleration event value can be calculated without the use of a vehicle speed involved with the acceleration event, for example, if the acceleration event value is purely the time span between the two opposite acceleration events.

In general, details of the invention can be characterized as follows:

Preferably, the vehicle analyzing system determines the driving parameter from the sequence of two opposite acceleration events if a time span between the two opposite acceleration events is within a predetermined time period.

The vehicle analyzing system may—upon the occurrence of an acceleration event—open a time window having the length of the predetermined time period for the occurrence of an opposite acceleration event. The data of the acceleration event may only be stored if the opposite acceleration event occurs within the open time window.

For calculating the driving characteristics value the time period between the two opposite acceleration events may be used, like the time span between end of first and beginning of second event.

The driving parameter can be a vehicle speed during the first one and/or second one of the two acceleration events.

The driving parameter can be an acceleration value, especially the maximum acceleration during the first one and/or second one of the two acceleration events.

In a preferred embodiment of the invention the vehicle analyzing system comprises a mobile communication device, which is preferably a mobile phone, like a smart phone, a tablet or the like, and a further communication device fixed in the vehicle. The mobile communication device may collect position data of the positions where the vehicle drove and calculates a vehicle speed from the position data. The position and speed data may be gathered continuously during a whole vehicle journey, at least during the acceleration event.

To determine a driving characteristic of the vehicle, the mobile device may generate a pattern of use of a mobile device of the vehicle analyzing system over a plurality of acceleration events. From this pattern a communication activity metric can be generated. Such metric can be used to control a driver assist system, like to set a threshold for a driving aid. If the driver is a heavy phone user on highways, for example, the interference threshold for a driver assist system can be set lower in highways but not necessary in urban or rural area.

Preferably, the communication activity is monitored continuously during vehicle movement. Communication activity data, like metadata, of all communication activities may then be collected and stored, accordingly. The communication activity data can be associated with time, location of occurrence, vehicle speed at the occurring time and/or acceleration data, like the acceleration value. However, to keep data privacy, alternatively the vehicle analyzing system may erase the data of single uses related to those acceleration events from its memory, and transmits the pattern to a remote server, like for further evaluation of the driving characteristics or other data. The pattern may comprise a speed value associated to each acceleration event and/or position information associated to each acceleration event.

Further, the pattern may comprise information at how many acceleration events the mobile device was used during a driving unit and/or information about the kind of use of the mobile device including telephony, written data input, internet use, and/or film play.

To distinguish between communication action by the driver while driving and communication action by another front-seat passenger with the mobile device of the driver, the mobile device may group addresses, like telephone numbers or internet addresses, targeted by the mobile device into address groups and associate at least one of those groups to the owner of the mobile device. Preferably, the pattern then distinguishes between mobile device activity associated to the mobile device owner and mobile device activity associated not to the mobile device owner, like another passenger in the driving vehicle. The association may use voice sampling of persons using the mobile device for telephony, like leveraging on distinctive voice characteristics such as frequency to discriminate between speakers.

From a characteristic of the acceleration event, like from an acceleration value of the acceleration event, an acceleration event duration and/or a speed of the vehicle during the acceleration event, the acceleration event can be categorized into regular events and accidental events, the accidental events involving some kind of dangerous situation, at least statistically. While data of regular acceleration events are less important for a controlling of a driver assistant system and wear and tear of vehicle components, accidental events may contain useful data for a controlling of a driver assistant system and wear and tear of vehicle components. In a further advantageous embodiment of the invention, the mobile device buffers mobile device usage data, and acceleration events are categorized into regular events and accidental events, and in case of the occurrence of an accidental event the mobile device stores usage data spanning from a predetermined time span before the an accidental event at least to the accidental event from the buffer to a long term memory. The usage data are data of the use of the mobile communication device. Preferably, the stored usage data are sent to a remote server for evaluation.

The acceleration sensor may located in a mobile device of the vehicle analyzing system which further comprises a software application which adapts the acceleration threshold to the type of the acceleration sensor.

The collection of driving data is related to the topic of data privacy. To avoid the permanent correlation of collected driving data with statutory parameters like statutory speed limit, it is desired to camouflage the driving data to such amount that a privacy conflicting correlation of driving data with statutory data is not possible. Advantageous camouflaging can be achieved by one or more of the following measures which can be combined in any manner:

Driving data are camouflaged by a device carried in the vehicle during driving, and only the camouflaged data are sent to a remote server for evaluation of the driving characteristics value.

The vehicle carries a mobile communication device, like a smart phone, a tablet or the like, the driving data are sent from an on board device to the mobile device, the mobile device camouflages the driving data and sends the camouflaged data to a remote server.

Camouflaging driving data, preferably within the vehicle, especially by the mobile device carried in the vehicle, by one or more of the following steps:

Position coordinates of location points which the vehicle passed during driving are camouflaged by a position error, preferably by a two-dimensional position error, which is added to each two-dimensional position coordinates, preferably the position error being larger than 10 m on average.

Position coordinates of location points which the vehicle passed during driving are processed into travel trend lines, preferably by a device in the vehicle, which show a position inaccuracy, and preferably leaving open which road the vehicle took during driving.

The trend lines are sent to a remote server, whereas the transmission of the location points in combination with the time stamps of the location points to the server is blocked.

The server assigns to the trend line a trend line category, like urban, rural, highway.

A start of a compilation of data relating to one driving metric is triggered by the existence of a new trend line, and the termination is triggered by the existence of the next following trend line.

Driving metric data is associated with a travel trend line by virtue of it being compiled while the metric related data is acquired.

Time stamps of the time at which the vehicle passed location points are separated from the location points into separate files.

The location points are collected at random time intervals.

A plurality of time stamps are consolidated into a superior time value which is sent to the server, whereas the time stamps are blocked from being sent to the server.

The consolidated time value is assigned to a travel trend line.

The vehicle detects at least one acceleration location of an acceleration event and assigns the acceleration location to a travel trend line, and sends the driving characteristics value of the acceleration event together with an identification of the assigned trend line to a remote server.

A server assigns trend line characteristics to an acceleration event.

A server determines from a driving characteristics value and a trend line characteristics of the assigned trend line data for determining a mechanical stress indicating value, or UBI risk management inference, for example.

Another possibility to achieve data privacy to a certain degree is outlined in the following. Each acceleration event is associated with a time point or time slot, like 1 minute or 10 minutes. With the aid of the time the acceleration event is associated to a travel trend line. The driving parameter and the association to a trend line may then be sent to the server 4. No location where the communication action occurred is sent to the server 4. The server 4 determines the geographical category from the trend line, like urban, rural or highway. The acceleration event values occurring during a vehicle journey or another time period—except the trend line—are stored in a memory, like a buffer, and randomized in their order to further camouflage their rough location association. The driving parameter and/or the acceleration event value may be associated to their trend line as well and sent to the server 4. The server 4 associates the geographic category to the data, stores them in another memory—again without the trend line association—and randomizes them in the file. From the stored data all values of acceleration events during a journey, a day or another predefined time period, are associated to their geographic category as a whole. No detailed association of single events to single event data is present anymore.

Further, the invention is directed to a vehicle analyzing system. Preferably, the system is prepared to perform a method according to the invention as described above. For this it may be equipped with software which when executed performs the method. Preferably, the system comprises an acceleration sensor, a communication unit prepared for sending data to a remote server and an acceleration monitoring unit for monitoring the acceleration of the vehicle. To provide an enhanced system for determining driving characteristics of a vehicle and particularly to determine from the driving characteristics a long term mechanical stress of a vehicle, the vehicle analyzing system comprises an evaluation unit to determine a driving parameter of the vehicle occurring during an acceleration event in which the vehicle acceleration is above a predetermined threshold.

Furthermore, especially with regard to the controlling of the driving assist or autonomous driving system, the object is solved by a method for determining a driving characteristic of a vehicle, wherein the vehicle is driving autonomously and/or with safety assist system support, especially autonomously, on a public road, an interaction between a driver of the vehicle and a vehicle component is recorded, and a driving characteristic value of the vehicle is derived as a function of said interaction.

The driving characteristic can be an accident risk of the vehicle, like over a driving timespan, driving distance or road section. The driving characteristic value can be a quantification of the driving characteristic, either a single numerical value, a multidimensional value, like a vector, or a function dependent on a one or more independent parameters. The value can be used for controlling a driving assist system. A driving assist system is an electronic system in the vehicle for supporting the driver in specific driving situations, like safety critical situations, or situations where the driving comfort or driving economy can be enhanced by the system. In the following driver assist systems include those systems which leave the final control to the driver and those which overtake control from the driver either in special situations or in general for a specific function, like during autonomous driving. A driver assist system may intervene semi-autonomously or autonomously into the drivetrain—brake or acceleration, or another system control, or alert the driver through a human machine interface in safety critical situations.

The driving characteristic value can as well be used as mechanical stress indicator for specific vehicle parts, at least one mechanical compound of the vehicle. In this way the determination of the driving characteristic value is a helpful method for determining a long term mechanical stress of the vehicle, or of one or more of its mechanical components. Further, the driving characteristic value can be used to assess specific stressful driving characteristics of a particular driver relevant to for example pricing road side repair, warranty extension, or UBI liability coverage, respectively.

The invention is based on the consideration that autonomous driving or usage of individual safety assist features, like lane change vehicle sensing, each will lead to specific stress profiles and wearout of vehicle components which can be studied and partly prevented by design and construction of vehicle parts. On the other hand, individual driving will be much more difficult to foresee with respect to stress and wear behavior of vehicle components. Such individual influence wear progress is easier to understand and to prevent if individual driving characteristic is known better—both as general statistic and as individual behavior. The same is true for mixed autonomous and manual driving, especially in concert with various degrees and modes of driving with safety assist systems that support safe driving. In general: Three categories of driving are present: a) Manual driving, b) safety assist system supported driving, and c) autonomous driving. These respective modes of driving are referred to in the industry as: Level 2, Level 3 and Level 4. The three categories can be combined in any relation, like a+b, b+c, even a+c if during autonomous driving certain tasks are performed manually, like a decision to overtake a slower vehicle, or a+b+c.

Individual driving characteristic is reflected by certain driving behavior parameters which, for example, influence the long term wearout of vehicle components. Such driving behavior is, for example, inattentive driving, low anticipatory driving, or highly emotional driving. With respect to autonomous driving such behavior can to a certain degree be detected by monitoring driver interaction with a vehicle component, especially with a vehicle autonomous driving system. If, for example, a vehicle is driven more often autonomously, the wearout and the collision risk profile will be different than in a vehicle which is driven manually most of the times.

Each driving style causes different stress pattern resulting in different wearout symptoms of characteristic components of the vehicle are all so complicated and interrelated with driver human factors and vehicles co-occupying the road, that a priori determination of wearout and collision risk profiles are not possible nor is analytic modeling. Accordingly, the driving style or driving characteristics of individual drivers is difficult to simulate or replicate in test phases of a new vehicle, the determination of driving characteristics of a vehicle is a valuable method for determining a long term mechanical stress of the vehicle and/or providing statistical inference to related projections such as those related to road side repair and UBI pricing. Even further, the warranty period of a vehicle can be made dependent on the components wear or the driving characteristics of a driver or a vehicle. If the driving characteristics value indicates a driving with potentially low wear of mechanical components of the vehicle the warranty can be prolonged. Since this is an attractive incentive for the vehicle owner he may want to change his driving behavior leading to better driving safety—and in general: traffic safety for surrounding vehicles. Accordingly, determining the driving characteristics of a driver or vehicle involves many advantages for vehicle construction, wearout prediction and vehicle repair, UBI risk assessment, warranty adaptation, and general traffic safety.

In a preferred embodiment of the invention the interaction is a decision of the driver which travel section is driven manually and which travel section is driven autonomously. Usually manual driving involves a higher accident risk than autonomous driving, but this may vary. Further, manual driving in most cases leads to higher wear of vehicle components due to irregular acceleration and steering movements. Thus, the choice for manual driving will lead to a different driving characteristic than a choice for autonomous driving. This different driving characteristic will be respectively influenced and affected by road, other vehicle presence and their autonomous, safety assist system and/or manual driving management. In reality, a safety assist system and an autonomous driving modes will control said vehicles differently and hence incur varying levels of vehicle stress or accident risk based on qualifiers such as:

Road category (urban, highway etc.)
Specifics of road and traffic conditions
Number of adjacent vehicles under driver Manual, Safety Assist or Autonomous control
Safety Record of vehicles within a given adjacency
Vehicle mix (percentage): cars, vans, light trucks, heavy trucks
Heavy vehicles under autonomous control
Weather conditions
Time of day To quantify a degree of wear or accident risk, it is advantageous if the driving characteristics value is derived as a function of a relation between manually, autonomously, and safety assist system supported driven travel sections. A travel section can be a complete vehicle journey from a starting location to an ending location or a part thereof, a predefined distance, like 5 km, or a predefined travel time.

The relation may span over a plurality of journeys, preferably over all journeys over a predefined period of time, like a plurality of days, weeks or months. Preferably, the relation is a driving time relation and/or driving distance relation of the manually and autonomously driven travel sections.

Per a preferred embodiment of the invention, Level 2, Level 3 and Level 4 characteristics will be derived relative to a posteriori determined driving stress measurements known in the state of the art as Driving Quality Metrics namely:

Speed Quality Metric
Acceleration Quality Metric
Deceleration Quality Metric
Erratic Driving Quality Metric In concert, the above Quality Metrics and their cardinal (base 10) number index values they yield are derived from vehicle dynamic measurements. These measurements capture the innate dynamic characteristics emanating from the vehicle control auspices—whether it be human or varying degrees of AI, and in response to the degree of turbulence in the immediately surrounding traffic. The above Driving Quality Metrics hence capture, as relative, comparable cardinal value indices, the vehicles dynamics in a holistic sense whether under Level 2, Level 3 or Level 4 control. A further common denominator between the Quality Metrics is that they are all accumulated on a mileage basis.

Although the invention disclosure is predicated on the relationship of Driving Quality Metrics, it is important that we understand the multiplicity of factors influencing the vehicle dynamics whether under Level 2, Level 3, Level 4 control—as discussed briefly below.

Further, the driving characteristics value can be derived as a function of predetermined categories of travel sections where the vehicle is driven manually, safety system supported and/or autonomously. The categories can be road categories, like urban streets, rural roads, urban highways, and/or interstate highways. Alternatively or additionally the categorization can include a historic accident rate specific to the roadway being traversed per distance and/or per time or specific to the vehicle per time. Another categorization considers predetermined travel situations where the vehicle is driven manually or autonomously, like current vehicle density per distance and preferably per driving lane, and/or an average travel speed of vehicles in a predefined vicinity of the subject vehicle. This in particular may also include special driving interaction consideration based on surrounding vehicle types spanning passenger cars, versus light and heavy trucks as well as the specifics of the safety feature active in said and surrounding vehicles and the specifics of the autonomous technology being used. Autonomous driving effects on the vehicle will differ by the sophistication (e.g. manufacturer and release number) and the degree of active networking; monitoring and instant interconnection/communication between vehicles.

Another valuable parameter of the driving characteristic is a manual data input of the driver into a user interface, especially a user interface of the vehicle, during autonomous driving of the vehicle. Manual data input will distract the vehicle driver significantly, and although this is less dangerous during autonomous driving than during manual driving, it still is an indicator for safe driving if the driver cares for little or no distraction during driving. The data input may be choosing music, infotainment input, touch screen input, telephony, speech response via recognition, or the like.

A further valuable parameter of the driving characteristic is a manual driving control intervention during autonomous driving of the vehicle. Not only the number of interventions per driving time or driving distance reflects driving characteristic, but the situations during which the interventions take place is an important parameter as well. Component wear or driving risk is different it a driver often overtakes in heavy traffic or during evening hours on empty roads for fast and emotional driving. Preferably driving situations are categorized into different categories, and each intervention is assigned to one or more categories.

Besides direct factors which influence driving behavior and thus accident risk and components wear, like emotional driving, fast driving, or distraction during driving, secondary factors influence driving as well. Such factors may be properties of the driver, like driving habits, and/or average reaction time. Reaction time can easily be measured if the reaction provoking event is controlled by a vehicle control, like an autonomous driving control. Thus, preferably, the driving characteristics value of the vehicle is derived as a function of a reaction time between an input prompt of the vehicle component, like a control unit, and a manual input of the driver as a reaction of the input prompt. The input prompt can be an alarm signal for manual intervention into the autonomous driving process, a test signal for finding out the driver's consciousness level, and/or a signal from a safety assist system, like a lane keeping system.

Preferably the input prompt is—during autonomous driving and during stable autonomous driving conditions—a pseudo alert for manual intervention into driving control. Now, the driving characteristics value of the vehicle can be derived as a function of a reaction time between the alert and a manual input of the driver as a reaction of the alert.

In contrast to such testing alerts for finding out a reaction time or more general: a consciousness or distraction of the driver, real alarm situations may be used as well. If during autonomous driving an alert for manual intervention into driving control is released, the driving characteristic value of the vehicle can be derived as a function of the reaction time. If during manual or autonomous driving a safety assist system outputs an alert, again, the driving characteristic value of the vehicle can be derived as a function of the reaction time. The quantification of response time characteristics can be analogously quantified with respect to automated safety feature where this mode of assisted manual driving is in effect.

A more specific evaluation is possible if a category of the situation which triggered the alert is considered when deriving the driving characteristic. Preferably, during autonomous driving an alert for manual intervention into driving control is released, and the driving characteristic value of the vehicle is derived as a function of a reaction category of the driver as a reaction of the alert.

Further, the driving characteristic value can be derived as a function of data of past reactions of the driver in a predetermined driving situation, like a predetermined time of the day, a driving time over a predetermined driving time, a location of the sun in relation to the vehicle, and/or a predetermined weather condition.

Another valuable driving characteristic is the frequency of alerts for manual intervention into driving control. Thus, the driving characteristic value can be derived as a function of frequency of alerts for manual intervention into driving control.

Usually, the better a road is known to a driver the safer he drives due to his knowledge of dangerous locations on the route, of best driving speeds in bends, or specific traffic flow during special situations, like rush hour or evening hours with only a few but fast driving cars around. The same is true for autonomous driving systems which have the ability of learning from current or past driving situations which are assigned to their geographic locations. Accordingly, driving will be safer and more uniform, thus causing less component wear or driving risk, if the same road is travelled often. Thus, if the driving characteristic value is derived as a function of driving on travel sections which have been travelled beforehand, a valuable parameter for driving characteristic determination is used. Another useful parameter is how often the travel sections have been travelled and/or how long the driving on the known travel sections is dated back. With the same advantage, the driving characteristic value can be derived as a function of a route learning level of an autonomous driving system of the vehicle.

Further, the invention is directed to a method for autonomous driving and/or safe assist system supported driving of a vehicle on a public road. The method may be based on the method as described before, wherein an accident risk is determined from the driving characteristic of the vehicle, however, this is not mandatory.

The driving safety can be increased if during autonomous driving or driver assist system supported driving a driving control action is performed dependent on an accident risk of a travel section where the vehicle is driving. The control action can be an alert for manual intervention into driving control and/or a safe assist system alert/warning.

The accident risk of the travel section can be derived as a function of historic accident data of the travel section. Thus, the control action can be independent from the current traffic situation around the subject vehicle, but can be generated from historic data. If, for example, on a specific road section, like a road bend, a number of accidents have taken place, especially with autonomous driving vehicles, the driver can be prompted beforehand to overtake manual control, and to increase safety herewith.

Further the accident risk of the travel section can be derived as a function of vehicle conditions of vehicles surrounding the subject vehicle. The parameters that now affect autonomous or safely feature assisted driving are not or not only those of the driver, but are parameters of vehicles in a predetermined vicinity of the subject vehicle, which preferably communicate with the subject vehicle. The stress or wear profile does not only depend on parameters of the subject vehicle or its driver but are related to other vehicles in their environs.

The accident risk of the travel section can be derived as a function of state of the travel section, like weather condition, and/or road condition. Additionally or alternatively the accident risk of the travel section can be derived as a function of the current driving situation or a calculated future driving situation of the vehicle in relation to a character of the travel section. If, for example, a long truck will foreseeably be in a narrow passage or a sharp bend of a road at the same moment where the subject vehicle passes this location, the driving control action can be performed, like autonomous deceleration of the subject vehicle, like for letting the truck pass the location first, or a prompt for manual intervention. A further driving situation may be passing a passage which historically is a dangerous place.

Not only the behavior of the vehicle driver and the autonomous driving system have influence on component wear and accident risk of a vehicle, the vehicle in the vicinity of the subject vehicle and their behavior have a significant influence as well. If driving information or information about properties of such vicinity vehicles is present in the subject vehicle or in a remote server connected to the subject vehicle such information can be used as relevant parameter for the determination of driving characteristics.

Accordingly, the driving characteristic value can be derived or the driving control action can be performed as a function of a property of vehicles in a predetermined vicinity of the subject vehicle. Such property may be the current status of the vehicles as autonomous or manual driving vehicles, the kind and number of automated safety assist systems of these vehicles, and/or a software status of automated safety assist systems of the vehicles. Preferably, the property is a stored safety record of current drivers of the vehicles and/or a stored safety statistic of automated safety assist systems of the vehicles. The statistic can be stored in an autonomous driving system and/or safety assist system of the vicinity vehicle.

Human factors may as well be used as a relevant property, like a safety record of current drivers of the vehicles, the driving time of vicinity drivers, or the like. Preferably a certain level of privacy is maintained by not associating said individual data with a specifically identifiable vehicle but rather as an element in the vicinity, in putting together a driving stress environment around the subject vehicle as it progresses through the transit.

The safety record can be derived in the same way as described above for the driving characteristic of the subject driver or subject vehicle, respectively. If, for instance, a driver in the vicinity drives manually and seems to be very distracted, this information can be used to slow down the subject vehicle, or perform other useful action. Further, the driving characteristic can be derived from the property, reflecting the accident risk of the subject vehicle.

The invention relates further to a system for determining a driving characteristic of a vehicle. The determination can be done according to the invention method as described above.

According to the invention the system comprising in the vehicle an autonomous driving control unit being prepared to perform a driving control action dependent on an accident risk of a travel section where the vehicle is driving.

Alternatively or additionally the system comprises in the vehicle an evaluation unit prepared to record an interaction between a driver of the vehicle and a vehicle component, and within or outside the vehicle a further evaluation unit, especially in a server remote from the vehicle, which is prepared to derive the driving characteristic value of the vehicle as a function of said interaction.

The invention further relates to a method for driving route planning for a vehicle, wherein from a beginning location and an ending location of a vehicle journey a plurality of driving routes between beginning location and ending location are determined.

Autonomous vehicle driving on public roads involves many different driving assistant systems that are active during a journey of a vehicle. A typical example is a braking assistant, measuring the vehicle speed and a distance to an obstacle located in the front of the vehicle. Depending on the speed and the distance of the vehicle to the obstacle the braking assistant initiates a braking to maintain a safe driving of the vehicle.

It is an object of the invention to provide an enhanced method for a driving route planning for a vehicle.

This object is solved by a method for driving route planning for a vehicle, wherein from a beginning location and an ending location of a vehicle journey a plurality of driving routes between beginning location and ending location are determined, and to each of the driving routes a driving danger parameter is determined.

While manual driving involves more or less careful driving depending on the density of the traffic, weather conditions, road conditions or other parameter, autonomous driving is lacking of such initial control parameters. It is useful, therefore, to determine a driving danger parameter for specific route sections to be able to adapt an autonomous driving control parameter to the danger parameter of these sections. By this autonomous driving can be performed more safely. Further, a driving danger parameter is an important parameter to determine the best driving route to a given destination, which is of interest for most vehicle drivers.

The driving danger parameter may quantify the relative safety of driving of a vehicle under autonomous driving control. The determination of the driving danger parameter may be related to aspects of route planning integral to autonomous vehicle control and navigation of a given transit. This aspect of route planning discretion involves a further advantage of the invention. The driving danger parameter can be used as new factors in the Usage Based Insurance (UBI) formulation specific to the insured drivers and their vehicle. The determination of the driving danger parameter may allow more specifically the inclusion in the UBI rating formulation of the insured parties exercise of discretion from a beginning location to an ending location of a vehicle journey related to a plurality of driving routes between beginning location and ending location.

From the basis of conventional route planning, with the driving danger parameter new routing factors may be involved, especially under the aspect of autonomous driving considerations which then can be reflected in the vehicles and driver's UBI rating based on both conditions encountered while in transit and driver discretion in choosing from routing alternatives. An analogous schema can also be expanded to current state of the art manual driving UBI to integrally incorporate prompting routing alternatives based on relative safety and the insured driver's final choice of routing for a given transit.

Another aspect is an intelligent traffic control by proposing driving routes which involve less traffic, for example, and are safer to drive, therefore. Further, insurance companies may want to propose safe driving routes to their customers to reduce the number of accidents, and to be able to reduce their insurance rate with the aim to be more competitive. Some routes may involve less traffic or have a higher percentage of drivers under respective varying levels and sophistication of autonomous control thereby reflecting route safety from both human and automated driving perspectives.

The risk of accidents during driving emanates on one hand from the behavior of the driver, and on the other hand from other vehicles in the close vicinity. While the driver behavior can be monitored and rated, the behavior and action of other vehicles is not known and usually cannot be included into driving risk control, monitoring and rating. This situation will eventually change in the future when autonomous driving becomes more common. Autonomous driving requires detailed data about the current road and traffic situation along the route driven by the vehicle. Such data are ascertained by the autonomous vehicles themselves while driving a road. Cameras monitor the road, and road data, driving data, and vehicle data are sent to remote servers for investigation and traffic control purposes.

The data available from autonomous vehicles will allow not only to forecast traffic situations and guidance of traffic for optimal traffic control, but further supply detailed information about future driving routes and future locations of vehicles, along with their future driving speed and traffic behavior, especially in heavy traffic situations. Those data will allow for a more faithful driving danger analysis, and will facilitate proper danger predictions for alternative routes to a journey destination. Such predictions may be considered when proposing and choosing a low danger driving route when planning a vehicle trip. Safe driving routes may be chosen, and the risk for accidents may be lowered significantly.

However, even if autonomous driving will give the chance to reduce driving risk, the driver behavior will influence his driving risk significantly since the driver chooses what route to take and when to drive hands off or manually. This behavior can considerable factor insurance rating and will thus be an important parameter for insurance rate determination. Further, the survey of driver behavior with respect to route election and manual/autonomous driving will provide the driver with a more inclusive concept of "good driving". In this regard factors for autonomous driving may span not only what goes on in the vehicle cockpit but also dynamic current measurements and statistical extrapolation of safety of the currently planned roadway transit versus alternative potentially safer road networks and immediate driving environment. These alternative routings with tradeoffs: e.g., travel time, fuel consumption, insurance impact etc. can then be prompted to the insured driver for re-routing decisions by an autonomous driving network.

Such alternative routing may also reflect the number of vehicles under autonomous driving control on alternative routes—and the safety rating of the drivers—in addition to other safety statistics. Decision options proposed may also consist of even just slowing the subject vehicle down so that it remains on the same route but clustered within safer autonomous driving controlled vehicles.

In general, it is advantageous, if the driving danger parameter describes a risk of an accident involving the subject vehicle and occurring during driving on the respective driving route. The accident risk may be an accident probability per route distance, like per kilometer or mile, and may be summed up to an accident probability of the complete route, so that the accident probabilities of all routes can be compared and the routes can be rated.

One parameter for deriving the driving danger parameter can be an accident history of the driving route, like accidents per time on one or a plurality of route segments. The past accidents can be weighted according to their severity. So that to each segment an accident likelihood parameter resulting from past accidents in this segment can be derived.

An accident risk strongly depends on the driving characteristics of a vehicle driver. Since normally the driving characteristics of manual driving and autonomous driving is different the accident risk is thus dependent on the fact whether the driver chooses to drive manually or leaves the driving to the vehicle autonomous driving control unit. The driving danger parameter can, therefore, be determined as a function of choice of the vehicle driver to drive manually or let the vehicle drive autonomously on at least a part of the driving route, as well as the routing alternatives chosen.

The fact whether driving on a specific route is more or less dangerous further depends on the vehicles in the vicinity of the subject vehicle, and especially of their driving behavior. The driving behavior depends on the fact whether the vehicle is driven manually or autonomously. Therefore, the characteristics of vehicles on the driving route may comprise the number of autonomously driving vehicles and/or the number of manually driving vehicles, like the ratio or total numbers of such vehicles per route section.

Further, the driving behavior of vehicles can be statistically matched to vehicle characteristics, like type of car and engine power as more general characteristics, and driving destination, duration of driving until the moment where the vehicles will meet the subject vehicle and/or driving speed during a predefined driving segment before the foregathering of the vehicles, as more special vehicle characteristics. It is, therefore, advantageous, if the driving danger parameter is determined as a function of characteristics of vehicles on the driving route. Preferably, only those vehicles are considered which will foreseeably be in a predefined vicinity of the vehicle while driving on the driving route. Alternatively or additionally a statistical value or function can be used which quantifies characteristics of surrounding vehicles statistically.

For some driver a driving characteristics is known, like a characteristics value, which may depend on one or more further parameters, like the time of the day, or a situation relevant parameter. Such driving characteristic, which is known anyway for drivers taking part in an UBI program, influences the driving safety of surrounding drivers. Accordingly, it is advantageous, if the characteristic comprises driving characteristics of drivers associated with the vehicles on the driving route, like driving habits or a safety record of drivers associated with the vehicles on the driving route.

Further, the more often a driver drives a specific route, the more the driving safety increases usually since the segment is known to the driver who then has experience to handle dangerous situations better. Therefore, the characteristics may comprise the number of times the driver of the subject vehicle has driven the respective driving route. Also it is fundamental to autonomous driving algorithms that repetitive driving allowing for self-learning to improve the autonomous handling of critical route autonomous driving obstacles.

Not only the surrounding drivers influence the safety of a subject driver or subject vehicle, but of course the driving characteristics of the driver of the vehicle as well. Such driving characteristics can thus be used for determination of a driving danger parameter of a route. Such driving characteristics can be a known UBI characteristics, driving experience and/or past reactions in specific situations. If, for example, a driver drives safely on interstates but tends to overestimate the own abilities on rural roads, such specific characteristics are an important parameter to higher rank routes with a high interstate proportion over routs with higher rural route proportion.

And again, the driving characteristics may comprise the likelihood of manually influencing or terminating an autonomous driving of the vehicle. Hence routing alternative may include suggested portions of the route to be manually driven or where the driver will be pre-warned that at certain time interval of the transit they may be required to be "ready and on-call" to take vehicle control.

Preferably, the driving danger parameter is determined as a function of driving break accommodations along the driving route.

Advantageous further parameters from which the driving danger parameters can be derived either alone or in combination with other parameters are technical details of the vehicle. The technical details may be a road holding of the vehicle, braking distance as function of driving speed and especially road quality, size and/or weight of the vehicle, a crash safety factor of the driver and a other passengers, and/or the like.

Preferably the technical details comprise driving assistance systems present in the subject vehicle, since such systems may increase the driving safety, like a lane guiding or lane change control, a breaking assistant, electronic stability control, and/or dead angle detection control. Further, the technical details may comprise tire characteristics of the tires of the vehicle. Further, the technical details may comprise driving assistance systems present in the surrounding vehicles on a given route that—while not providing full autonomous driving management, may all the same increase the driving safety.

A further important parameter for deriving driving danger is a route characteristics of the driving route. Such can comprise a technical condition of roads of the driving route, weather conditions during driving of the driving route, and/or traffic conditions of the driving route.

When the driving danger parameter of a plurality of driving routes is determined, the driving routes may be ranked as a function on the driving danger parameter, to find the best route or routes for route proposal to the driver. Now, at least one of the driving routes can be presented to the vehicle driver together, preferably together with information about differences of the presented route to another driving route between the same beginning location and ending location of the vehicle journey. Such differences may comprise a quantified difference in driving risk, a driving time difference, a fuel consumption difference, and/or a user based insurance credit when choosing the driving route with a lower driving danger.

To give an incentive for using a safe route, even if it is longer or takes longer to drive than a shorter or faster route, the vehicle and/or vehicle driver may be credited according to the driving route. The credit may be determined as a function of time delay, safety gain, and/or vehicle cost disadvantage caused by a safer driving route.

When presenting one or more driving routes to the vehicle driver, such presentation will influence the route choice of the driver. Therefore, the method can then be more than just a method for driving route planning for a vehicle but be a method for controlling traffic flow.

If further the vehicle drives autonomously along the driving route under usage of a planned route for which a driving danger parameter was derived, the method can then be a method for controlling a driving of a vehicle on a driving route.

Preferably, the driving is controlled in such a way that the driving speed is adjusted to surrounding vehicles according to their status of autonomously or manually driving. If the driving speed is adjusted so that the subject vehicle will remain in a cluster of autonomously driving vehicles, safety can be increased due to lower accidental risk coming from the surrounding vehicles.

The invention is further directed to a system for driving route planning for a vehicle.

To allow enhanced driving route planning for a vehicle, the system comprise a route planner being prepared to plan a plurality of driving routes between a beginning location and an ending location of a journey, and an evaluation unit prepared to determine to each of the driving routes a driving danger parameter.

The previously given description of advantageous embodiments of the invention contains numerous features which are partially combined with one another in the dependent claims. Expediently, these features can also be considered individually and be combined with one another into further suitable combinations. More particularly, any method features can be combined with any method and device according to any independent claim individually as well as in any suitable combination. Furthermore, features of any method, comprehendible as apparatus features, can be considered as features of the corresponding device and, accordingly, features of the device, comprehendible as process features, can be considered as features of any method.

Furthermore, the invention relates to a method for associating a journey of a vehicle to a driver who drives the vehicle during the journey.

The way how people drive a vehicle, like a car, a motorcycle, a bicycle, a quad or other vehicles, influences many aspects of life, like traffic safety, vehicle construction, traffic density and disturbances, insurance terms and conditions related to personalization of liability and warranty premium computation, and many more. To improve those aspects driving data are collected and evaluated, and results are achieved which relate to the respective aspect and are useful for improvements.

In many of those cases it is useful to assign a specific driver to the driving data. By this driving data of many vehicle journeys of this driver can be consolidated to superior data leading to more reliable results. Those results can be used for adjusting a parameter of a safety assist system of the vehicle to the driver's behavior, and to determine a tear and wear parameter of components of the vehicle which is influenced by driving characteristics of this specific driver. In the field of User Based Insurance (UBI) or Telematic Tariffs the information to which of a plurality of drivers registered on the insured vehicle the collected data belong is essential to evaluate a degree of safe or risky driving with respect to the respective driver.

It is, therefore, an object of the invention to provide an enhanced method for associating a journey of a vehicle to a driver who drives the vehicle during the journey.

This problem is solved by a method for associating a journey of a vehicle to a driver who drives the vehicle during the journey, wherein an on-board system present in the vehicle measures a driving parameter, like an interaction of the driver with a mechanical unit of the vehicle or a parameter history, like vehicle speed or engine speed, and a measurement result is associated to the driver. This assignment can on one hand be done by means of additional information, like the communication unit's identification code. The data may then be used to build up a database related to this specific driver. On the other hand the assignment can be done by means of the measurement result or data derived from it by comparison with previous data. Such previous data preferably originate from registered vehicle drivers and especially from the same kind of interaction. If the current data show a predetermined degree of correlation with data of one driver the current data can be assigned to the previous data, or the current journey can be assigned to the person related to those previous data, respectively.

Interactions of a person driving a vehicle with a mechanical unit of the vehicle, like a foot pedal, a gear shift, or a steering wheel, strongly depend on external parameters and situations, like the course of the road or the traffic around the vehicle. The same is true, albeit not as distinct, for a driving parameter which stands in direct dependency to an interaction of the driver with a parameter controlling unit, like the throttle.

However, more individual interaction takes place during standstill of the vehicle and/or in a low speed range, especially when the vehicle is started to move, i.e. during an acceleration from 0 mph to a predefined speed value, like 10 mph, 15 mph or 20 mph, to give some examples. In this respect, it is advantageous, if the measurement result derived from the measurement of interaction with the mechanical unit is determined only from interactions within a predefined speed band, preferably from 0 mph to a predefined maximum speed value. A suitable maximum speed value is in the range between 10 mph and 25 mph, preferably between 10 mph and 15 mph.

Driver identification by means of comparison of driver behavior requires current data and previous data. The current data are compared with the previous data, and a congruence of at least a predefined limit allows the assignment of current data to previous data, and from there to the driver to which the previous data belong. The data can be the parameter values as such or values or other data derived from the parameter values. While current data are limited, preferably, to data of one vehicle journey, previous data—also called driver's data or superdata in the following—may span over data of one or a plurality of earlier journeys, wherein all of those journeys are preferably assigned to the same person. Both data, current and previous, preferably result from the same kind of interaction of one or more drivers with the same mechanical unit of the vehicle.

In general, if during a later journey the same parameter of interaction is measured, a measurement result from this later measurement can be compared with a measurement result from an earlier journey, i.e. previous data, and upon a match of at least a predefined degree the later measurement is associated to the driver.

Further, if during a later journey the same parameter of interaction is measured, a measurement result from this later measurement can be compared with driver's data of a plurality of drivers derived from earlier journeys of those drivers, and in case the comparison is positive or accepted, the measurement result can be associated to the driver, and thus the driver can be identified for this later journey.

The on-board system preferably is at least partly fixed in the vehicle. I can contain at least a part of an on-board diagnose system of the vehicle, a device plugged into a data interface of such on-board diagnose system and/or a device just placed in the vehicle but not fixed to it, like a smart phone or any other portable computer.

To enhance the identification from comparison, an a priori probability of comparison reliability can further be used to determine the current driver from the plurality of drivers. The a priori probability of comparison reliability can be a probability that—if the driver identification is performed successfully—the identification of the driver really is correct.

This probability can be derived from journeys where the driver can be identified by means of his mobile unit identifier, and redundantly be identified by mechanical unit interaction monitoring. In other words: If a mobile communication device of the driver is the only registered mobile device in the vehicle the journey can be associated to the driver via an identification code of the mobile device. Then, the later measurement result can be compared with driver's data of the driver derived from earlier journeys of the same driver, and a probability of correct driver identification can derived from this comparison.

As mentioned before, if the mobile communication device of the driver is the only registered mobile device in the vehicle the journey can be associated to the driver via the identification code. The journey is called clear journey or clear situation in the following. In other cases the journey or situation is unclear, a direct assignment by means of identification code is unreliable or impossible. However, the journey can be associated to a driver via a comparison of the later measurement result with an earlier measurement result.

If the mobile communication device of the driver is the only registered mobile device in the vehicle the journey can be associated to the driver via the identification code, and a historic database containing previous data can be fed with the measurement results or data derived from it. This database can be used for driver identification in later unclear situations. If a later measurement result of a clear journey is present, the measurement values derived from it can be used to extend the historic database. Such clear result can, on the other hand, be used to enhance, amend or correct the historic database, and thus enhance the statistical discrimination power of the data base. The later result is compared with an earlier measurement result of the driver, i.e. previous data of the database, and the earlier measurement result or the database, is corrected using the later measurement result.

In a preferred further embodiment of the invention, during a journey of the vehicle, the system repeatedly measures the parameter of the driver's interaction with the mechanical unit at predefined time intervals, and determines the measurement result from the plurality of parameter values received from the measurement. A measurement result can be determined from the measured parameter values—or other values derived from them—of a single journey.

If such measurement results are present from a plurality of journeys, a supervalue or superresult can be determined from the plurality of measurement results or journey results in other words. Preferably, a supervalue or superresult is determined from a plurality of measurement results which all are associated to a single driver, e.g. by means of the identification code from the mobile communication device of this driver.

The mechanical unit which is operated by the driver can be a seat, a mirror or a set of mirrors which is positioned by the driver. A seat position as well as the position of one or more mirrors reflects personal habits and body size of the driver and thus are a valuable hint of who is currently driving the vehicle. The interaction is thus an operation or adjustment of seat or mirror, respectively. Not only the position of the mechanical unit as such, like seat or mirror, contains valuable information, but the process of operation or adjustment may reflect as well individual habits, like the speed or sequence of a handling of one or more operation buttons of the respective mechanical unit.

Preferably, the mechanical unit is a unit which is adjustable infinitely variable. Here the individuality of operation is reproduced in great detail and provides many possibilities for mathematical analysis to find the operating driver with a high degree of reliability.

In a preferred embodiment of the invention the mechanical unit is a foot pedal of the vehicle, like the throttle foot pedal. A foot pedal is often operated individually different, so that a driver discrimination by means of foot pedal movement evaluation may lead to reliable results.

Parameter values of the interaction of the driver with the mechanical unit of the vehicle can be taken as such, like a pedal position as a function over time or measures regularly in time. However, more valuable information reflecting individual behavior can be derived from the speed of operation or speed of movement of the mechanical unit. While, if a foot pedal is pushed, it passes all positions, the passing speed is a more individual parameter reflecting individual behavior even better. Accordingly, in a further preferred embodiment of the invention the system determines a derivative in time of the interaction of the driver with the mechanical unit of the vehicle to determine the measurement results. The derivative in time can be the movement speed of the mechanical unit arising from its operation by the current driver.

A valuable measurement result can be the mean and/or variance of the parameter values of the interaction of the driver with the mechanical unit, or of values derived from the parameter values, like the derivatives in time. Accordingly, it is preferable if the system determines the mean and variance of the parameter values of the interaction of the driver with the mechanical unit—or values derived from it—to derive the measurement results.

A current measurement result, which can be the measurement result of the last journey of the vehicle, can be compared to driver data which arose from measurement results of past journeys which were associated to this specific driver, like by means of the identification code from the mobile communication device of this driver. The relevant question will be whether the current measurement result matches with driver data of a specific driver. This match can be performed for every driver for which evaluable driver data is present.

The decision, if a current measurement result matches with driver data of a driver, can be rendered using the statistical tool of Null hypothesis. Accordingly, the system may use parameter values of the interaction of the driver with the mechanical unit of the vehicle to perform Null hypothesis testing to associate the measurement result to the driver.

With Null hypothesis testing the current measurement result or other data derived from values of the interaction of the driver with the mechanical unit can be compared with data derived from values of the interaction of the driver with the mechanical unit with previous data of a plurality of drivers, and driver data are discarded if the Null hypothesis fails, and an association of the journey to a driver is performed only if the Null hypothesis is positive.

To preclude statistical doubtful comparison results, a chi-squared test of F-test can be performed, and an association of the journey to a driver is performed only if the chi-squared test or F-test, respectively, is positive, i.e. indicates that the Null Hypothesis is accepted.

Additionally to statistical evaluation further data can be taken into account to associate the correct driver to the current journey. Seat data, mirror data and/or infotainment data, like a radio channel listened to or a telephone number used during the current journey, can be a useful supplementation which preferably enters a statistical evaluation of the parameter values to find the current driver. Such useful parameter can be the driving proportion of each of a plurality of drivers of the vehicle. The driving proportion can be a percentage of journeys, miles or driving time which was driven in the past by a driver. The driving proportion of each of a plurality of drivers of the vehicle can be used in a calculation of likelihood that one of these drivers has been a driver in a specific journey.

To find the current driver by means of the identification code from the mobile communication device of the driver, a communication unit can be used which is located in the vehicle. Such communication unit can be inside a dongle at a data interface of a vehicle communication system. Thus, the vehicle, especially the on-board system, may comprise a dongle at a data interface of a vehicle communication system, wherein the interface may be in the passenger compartment of the vehicle. The dongle may comprises a communication unit which communicates with the mobile communication device of the driver, like for receiving the identification code from the mobile communication device.

The evaluation of the measurement result and its comparison with driver data can be performed by the on-board device of the vehicle. A high flexibility in evaluation can be achieved if the evaluation is performed in a stationary remote server. To bring journey data to the server, the dongle may send a measurement result of the current journey to the mobile communication device of the driver, and the mobile communication device forwards the data to a remote server. The server can then associate the measurement result to one of a plurality of drivers recorded in the server. Alternatively a communication device in or of the vehicle can communicate directly with the mobile device or the vehicle computer or the dongle can communicated directly via GSM or other wireless means with a server.

The above mention is solved in a different manner by a method for associating a journey of a vehicle to a driver who drives the vehicle during the journey, wherein before or at a journey of the vehicle an on-board system present in the vehicle communicates with a mobile communication device of the driver which is within the vehicle and receives an identification code from the mobile communication device, and the journey is associated to the driver. The identification code of the mobile communication device can directly be linked to a driver to which the journey may then be associated. This method and its details can be combined with the method as described above.

If the on-board system is able to communicate with the mobile communication device to receive its identification code this can be strong evidence that the mobile communication device is within the vehicle, especially if the vehicle moves. Since a mobile communication device during normal operation usually is not lent to other people the presence of a mobile communication device of a driver is very strong evidence that the driver is in the vehicle. In case the mobile device is the only mobile device in the vehicle the current journey can be associated to the person or driver to which the mobile device belongs.

This identification of the current driver is important for UBI purposes where driving characteristics of a journey are acquired. It is verifiable if the current driver is a UBI registered driver. Further, the current journey and its driving characteristics can be associated to the identified insured person driving the vehicle.

In another aspect, the identification of the current driver makes it possible to adjust the operation of a vehicle system to individual driver behavior. Such vehicle system may be a start-stop system of the vehicle, a brake assistant system of the vehicle, or another similar system of the vehicle.

In a further aspect, the identification of the current driver may enhance vehicle component design and replacement. Many aspects of vehicles require exact knowledge of mechanical stress which is applied on components of the vehicle, like a car or motorbike, during its operation. One aspect is cost efficient construction and design of a vehicle and its parts exposed to wear during driving. Usually, in vehicle testing vehicle manufacturers gather huge amounts of data regarding wear and tear of vehicle components. However, it happens from time to time that first vehicle versions sold in the marked feature component defects resulting from wrong wearout estimations of the manufacturer. On the other end, it happens during repair of vehicles that damaged components are replaced prompting the question what kind of long term driving characteristics caused such wearout or damage of the component. One answer to such question is individual driving characteristics of different vehicle drivers which are difficult to simulate or imitate during long term testing periods by test drivers. To enhance mechanical properties of components of vehicles it would, therefore, be helpful to learn more about individual driving characteristics. Further, a comparison of wearout on components of a vehicle and measured individual driving characteristics of the vehicle driver would provide the manufacturer with detailed mechanical stress information with regard to specific components. Such information is valuable during redesign of the component for future versions of the vehicle. In an analogous manner such quantification of driver induced stress on the vehicle can be entered into telematics risk management as used in User Based Insurance.

If a plurality of journeys during which driving characteristics was monitored can be associated to a vehicle driver, the vehicle manufacturer supplied with those data may associate specific wear characteristics to specific persons. With these data vehicle components for a specific category of drivers or use can be enhanced significantly.

To preclude a continuing communication with remote devices outside the moving vehicle the communication can be restricted to a short distance communication method like WiFi (Wireless Local Area Network) and/or the even shorter ranging Bluetooth communication (Wireless Personal Area Network). The on-board system may search for communication systems within the communication range, and may thus start communication with all mobile communication units available within the range of the respective communication mode.

To each mobile communication unit communicating with the on-board system one person is assigned. The persons can be registered vehicle drivers which are assigned each to one mobile communication unit, and which are registered on one hand as a driver authorized to drive the vehicle, and on the other hand are assigned to the mobile communication unit. This assignment can be done beforehand by the person or by means of information given by the person and transformed into the assignment by an assigning system. If a mobile communication unit is found which is not assigned to a person authorized to drive the vehicle or is not assigned to any person at all the journey information can be stored under other general information, like a number assigned to the mobile communication unit or directly under its identification code.

If only one mobile communication unit answers to the search request originating from the on-board system then the situation is set as clear and the journey data can be assigned to this mobile communication unit or the respective vehicle driver. Preferably, in either the on-board system or a remote server the mobile communication unit is assigned to a registered driver, wherein the registration relates to the vehicle or an insurance police. By this it becomes clear by the mobile device identifier if a registered or unregistered driver currently drives the vehicle.

If, on the other hand, no mobile communication unit answers to the search request originating from the on-board system then the situation is set as unclear and the journey data can be assigned to a code indicating that the data are not assigned to a mobile communication unit. The same can be done if a mobile communication unit answers which is not registered either in a memory of the on-board system or of a remote server. The journey data can be assigned to a code indicating that the data are assigned to an unregistered mobile communication unit. Preferably, the code contains a mobile device identifier, like the SIM code or IMEI code. Then this code can be associated to a driver, which—even if not registered—becomes an individual driver status, so that any future journey can be associated to this driver.

If more than one—preferably registered—mobile communication unit answers to the search request originating from the on-board system then the situation can be set as unclear as well, preferably in a higher degree of clarity, since a plurality of drivers are found and the ambiguity only correlates to the question of who is the currently driving person. The journey data can be assigned to a code indicating that the data are not assigned to a mobile communication unit or that the data are assigned to more than one mobile communication units.

In a preferred embodiment of the invention the communication device of the driver is a smart phone of the driver, or any other personal communication unit using GSM or another standard, like HSCSD, GPRS or EDGE. The identification code from the mobile communication device, like the phone number, IMEI, or SIM number, can be registered at a remote server and assigned to the driver, so that by this bridging information the driver can be identified as person currently driving the vehicle.

The driver of the vehicle may change, even within a current journey, like if a first driver becomes tired and a second driver takes the first driver's place. Such change of driver will nevertheless not take place during the movement of the vehicle but only if the vehicle comes to a stop. Further, even if one driver slips from one vehicle seat to another, at least one person will leave the vehicle temporarily, to let the other person slip to his seat, and opening the driver's door to leave or enter the vehicle. Accordingly, it is advantageous, if the start of the journey is set to the time point where the driver's door is shut after being open for more than a predefined time span during a stop of the vehicle, and the end of the journey is set to the time point where the driver's door is reopened for more than a predefined time span during a stop of the vehicle for the first time after the start of the journey. An alternative or additional parameter is the manual ignition of the vehicle, so that a journey starts with ignition and ends when the engine is stopped manually or the ignition phase comes to an end manually. If the ignition is used, the door parameter is preferably added as necessary parameter.

The methods as described above may advantageously be used to adjust the operation of a system of a vehicle, like a driver assist system, to individual driver behavior.

It is, therefore, another object of the invention to provide an enhanced method for adjusting the operation of a system of a vehicle to individual driver behavior.

This object is solved by a method for adjusting the operation of a system of a vehicle to individual driver behavior, wherein during a plurality of journeys a plurality of drivers interact with a mechanical unit of the vehicle, during each journey the interaction of the driver is monitored by an on-board system of the vehicle, for each journey one of a plurality of drivers is associated to the journey, especially with a method as described above, measurement results are determined for each driver from the interactions associated to the driver, and the vehicle system is adjusted using the measurement results.

The vehicle system can be adjusted for each journey according to the measurement results for this specific driver. The operation of the vehicle system can be individualized to the driver and thus operated very efficiently.

For adjusting the vehicle system to a driver the identification of the current driver is necessary. This is, preferably, done by means of the mobile device identifier in clear situations. However, even in unclear situations the driver identification is possible, if during an early section of the journey an interaction of the driver with a mechanical unit is so clear that, like due to statistical reasons, the driver can be seen as identified. For this, during a journey the interaction parameter is monitored and measurement results or journey data are evaluated to identify the driver during the journey. Here journey data or measurement results do not necessarily relate to the whole journey, but only to a section of the journey, preferably a beginning section of the journey from the start of the journey to an evaluation time point.

If the driver identification remains ambiguous the system can default to "best guessing" their identity using a priori data on respective driver percentage of use or if ambiguous between multiple drivers averaged values parameters can be used where said average can further be computed to reflect percentage of usage. However it is recognized that such parameter estimates lead to non-optimal performance of engine and safety features.

The vehicle system can be a driver assist system, like a start-stop system of the vehicle, a lane keeping system, a speed controlling system or the like. Depending on the system, the mechanical unit can be a pedal of the vehicle, like the brake pedal or the throttle pedal of the vehicle, or the steering wheel. A start-stop system can, for instance, be adjusted to the use or habit of operation of the brake pedal by the respective driver.

The start-stop system can adjusted in a way that the engine is stopped at a higher pedal elevation for a driver who during a stop of the vehicle is used to push the pedal less than for a driver who is used to push the pedal deeper. Independent of individual driver behavior the start-stop system can be run efficiently, so that the fuel consumption of the vehicle can be kept at a low level independent of different driving habits.

In another preferred embodiment of the invention the vehicle system is a brake assistant system of the vehicle and the mechanical unit is the brake pedal of the vehicle.

The brake assistant system can be adjusted in a way that a braking process support is automatically started at a closer distance to an obstacle for a driver who is used to stop closer to obstacles than for a driver who is used to stop further away to obstacles. Safe driving can be achieved even for drivers which are used to decelerate rather late before an obstacle without the start-stop system interfering much with on purpose driver actions.

Further, the invention is directed to a system for associating a journey of a vehicle to a driver who drives the vehicle during the journey. According to the invention, the system comprises an on-board system present in the vehicle and prepared to communicate with a mobile communication device of the driver which is within the vehicle and to receive and store an identification code from the mobile communication device which is associated with the driver, and a unit which is prepared to use the identification code to associate the journey is to the driver. The unit which is prepared to use the identification code to associate the journey is to the driver can be part of the on-board system or of a remote server to which data from the vehicle are forwarded.

Further, the invention is directed to a system for adjusting the operation of a vehicle system to individual driver behavior. According to the invention, the system comprises a mechanical unit of the vehicle, an on-board system to monitor the interaction of the driver, and a system to associate one of a plurality of drivers to the journey, to determine measurement results for each driver from the interactions associated to the driver, and to adjust the vehicle system using the measurement results. Such respective vehicle driver identification may play an important role in networked vehicles as associated with affecting safer autonomous vehicle navigation.

The invention further relates to a method for adapting a control parameter of a driver assist system of a vehicle to a current driving situation of the vehicle.

Vehicle driving on a public road involves many different driving assistant systems active during the vehicle journey. A typical example is a braking assistant, measuring the vehicle speed and a distance to an obstacle located in the front of the vehicle. Depending on the speed and the distance of the vehicle to the obstacle the braking assistant initiates an emergency braking to prevent a collision of the vehicle with the obstacle. Although these intelligent assists should vest a vehicle with a degree of proactive control of it dynamics and component wear, fundamentally they all filter back to the driver/operator whose human attributes can nullify or distort the intended driving aids potential impacts. Still having a driver dependency implies the driver's responsiveness to safety aids determines their effectiveness, not the technology itself. Talking on phone, or radio turned up high or conversation can blot out warnings and similar human distractions can affect the efficacy of most other Aids.

Furthermore, depending on the driving habits of different drivers, some drivers tend to react early to an obstacle becoming visible in front of the vehicle, thus an early assistant induced emergency braking is very useful since a failure of early braking of the driver is evidence of distraction or other dangerous reason. Other drivers, however, tend to a rougher driving style and are used to brake later and more suddenly. An early intervention of the braking assistant might then be annoying to the driver with the risk that the driver deactivates the braking assistant. It would be desirable, therefore, if a more individual driving characteristic would be used to control a driving assistant system, so that the system could be adapted to the current driving situation.

It is, therefore, an object of the invention to provide an enhanced method for adapting a control parameter of a driver assist system of a vehicle to a current driving situation of the vehicle.

This object is solved by a method for adapting a control parameter of a driver assist system of a vehicle to a current driving situation of the vehicle, wherein a driving characteristic is determined by a vehicle on-board diagnosis system, the driving characteristic is categorized, and the control parameter is adjusted according to a predefined relation to past driving characteristics, especially according to a predefined relation to a driving quality metric of the same category derived from past determinations of driving characteristics.

The driving characteristic can be a driver behavior, like an emotional way of driving or a way of interacting with a driver assist system or a mechanical unit of the vehicle. In another aspect, the driving characteristic can be an accident risk of the vehicle, like over a driving timespan, driving distance or road section. In a further aspect the driving characteristic can be a driving situation of the vehicle, like the density of the surrounding traffic, the current vehicle speed or road or weather conditions.

The control parameter is adjusted according to a predefined relation to past driving characteristics, or driving quality metric respectively. That means that a relation between the past driving characteristics or metric is established, like by empirical and/or simulative test or steps. If the past driving characteristics or quality metric QM of the same category is known, the parameter value P may easily result from the past driving characteristics or quality metric QM and the known relation f, i.e. P=f(QM).

A driving characteristic value can be a quantification of the driving characteristic, either a single numerical value, a multidimensional value, like a vector, or a function dependent on a one or more independent parameters. The value can be used for controlling a driving assist system.

A driving assist system is an electronic system in the vehicle for supporting the driver in specific driving situations, like safety critical situations, or situations where the driving comfort or driving economy can be enhanced by the system. In the following driver assist systems include those systems which leave the final control to the driver and those which overtake control from the driver either in special situations or in general for a specific function, like during autonomous driving. A driver assist system may intervene semi-autonomously or autonomously into the drivetrain—brake or acceleration, or another system control, or alert the driver through a human machine interface in safety critical situations.

The driving characteristic value can as well be used as mechanical stress indicator for specific vehicle parts, at least one mechanical compound of the vehicle. In this way the determination of the driving characteristic value is a helpful method for determining a long term mechanical stress of the vehicle, or of one or more of its mechanical components. Further, the driving characteristic value can be used to assess specific stressful driving characteristics of a particular driver relevant to for example pricing road side repair, warranty extension, or UBI liability coverage, respectively.

In a preferred embodiment of the invention the driving characteristic and the driving quality metric are categorized in a multidimensional category space with at least one of the dimensions: emotional driving, level of driving assistance and/or geographical location of the vehicle. By this different driving situations can be treated differently, and an assist control parameter can be adjusted to the category assigned to the current driving situation.

The categories can be continuously spread along their dimension or discontinuously. In a continuous way the control parameter may be varied continuously along the dimension according to the current driving situation. The dimension can then be seen as parameter with continuous parameter values. If discontinuous, each dimension contains a plurality of distinct categories.

Each dimension may comprise a plurality of categories. The dimension of emotional driving comprises one or more of the categories: speeding acceleration, emotional deceleration, erratic driving, and distracted driving. The dimension of level of driving assistance may comprise one or more of the categories: manual driving, semiautonomous driving, and autonomous driving. The dimension of geographical location of the vehicle may comprise one or more of the categories: urban, rural, and highway.

With regard to the dimension of level of driving assistance, the categories may be set in accordance with regular driving assist levels. Here, level 0 is the basic manual driving category. The human driver controls the driving completely: steering, brakes, throttle, power, and so on. Level 1 is a basic driver-assistance level where most functions are still controlled by the driver, but a specific function (like steering or accelerating) can be done automatically by the car. In level 2 at least one driver assistance system of "both steering and acceleration/deceleration using information about the driving environment" is automated, like cruise control and lane-centering. It means that the driver is disengaged from physically operating the vehicle by having his or her hands off the steering wheel and foot off pedal at the same time, according to the SAE. The driver must still always be ready to take control of the vehicle, however. In level 3 the driver is still necessary, but is able to completely shift "safety-critical functions" to the vehicle, under certain traffic or environmental conditions. It means that the driver is still present and will intervene if necessary, but is not required to monitor the situation in the same way it does for the previous levels. This level, however, still involves transferring control from car to human, which can often pose difficulties. Level 4 stands for fully autonomous driving. Level 4 vehicles are designed to perform all safety-critical driving functions and monitor roadway conditions for an entire trip. However, this does not cover every driving scenario. Every driving scenario is covered only by level 5 which refers to a fully-autonomous system that expects the vehicle's performance to equal that of a human driver, in every driving scenario, including extreme environments like dirt roads. In general, a categorization in manual driving, semiautonomous driving, and autonomous driving could be a categorization in level 0, level 1 to 3, and level 4 and 5.

Preferably, If treated continuously, each category can be seen as dimension or parameter, the current driving situation being categorized with parameter values, like 14% emotional speeding, 3% emotional deceleration, and 45% distraction, or the like. The driving characteristic can then be a multidimensional vector. A driving quality metric is then, preferably, not only an exact vector length and direction, but spans over a predefined multidimensional volume, with would span a bandwidth within each parameter, like 20% for one dimension and 33% for another dimension, for example.

It could happen, that a driving quality metric, for short: driving metric, does not have a sufficient data quality to server for proper evaluation purposes. To prevent a bad or inappropriate evaluation result and thus a bad or even dangerous control value, it is recommended to test the driving quality metric, preferably with a statistically tool, for its validity. The validity may be seen as sufficient data quality to achieve sufficiently satisfying results, which can be testes empirically, for example, during vehicle testing.

An insufficient data quality may become apparent from a high variance of metric values which constitute the driving metric. Accordingly, it is advantageous to use the variance of metric values of the driving quality metric as test parameter.

A simple testing method can be achieved, if the driving quality metric is tested against a reference driving quality metric of the same category dimension. Usually, manual driving leads to the highest data variance when measuring a driving parameter. The variance of the driving quality metric representing manual driving, may thus be used as reference metric. If the variance of the tested metric is higher than the variance of the manual driving metric this would be evidence that the data quality of the tested metric might be rather poor. Since a complete manual driving is replaced more and more by partly assisted driving, it would be sufficient, if the reference quality metric is the metric with the most manual driving influence within this category dimension.

When a vehicle journey is completed, thus terminated, or at least a journey section with predefined section boundaries, the journey (section) driving characteristics data may be used to enhance the driving quality metric of the same category. It would be advantageous, therefore, if the driving quality metric is updated with driving characteristic data of the current journey of the vehicle.

In other words, the driving quality metric can be part of a set of a plurality driving quality metrics categorized into different driving situations, wherein the vehicle journey is categorized into one of the categories. An update of a driving quality metric with driving characteristics data of the current journey section can be performed. Preferably, the update, i.e. the implementation of the current data into the existing metric, is weighted according to mileage of the current journey section. The longer the current section is, the higher is the weight given to the update data.

The invention is useful not only for setting or adjusting a control parameter of a driver assist system but may serve as basis for many other applications, especially related to vehicle driving. The invention thus may be related to a Method for determining a wearout of a vehicle component. Here, a driving characteristic of a current driving section of the vehicle is determined by a vehicle on-board diagnosis system, the driving characteristic is categorized, a driving quality metric of the same category derived from past determinations of driving characteristics is updated with current driving characteristics data, and the wearout of the component is determined according to a predefined empirical relation to the driving quality metric.

Another application can be the determination of a driving accident risk of a current driving situation of the vehicle. The invention is thus directed to a method for determination of a driving accident risk of a current driving situation of the vehicle. According to the invention, a driving characteristic is determined by a vehicle on-board diagnosis system, the driving characteristic is categorized, and the risk is determined from a predefined relation to past driving characteristics, especially from a predefined relation to a driving quality metric of the same category derived from past determinations of driving characteristics.

With regard to the driving risk, the result of the determination may be used for UBI rate determination, for example. In such a case it would be appropriate to derive an insurance rate from the driving risk or the driving quality metric and a driving distance the vehicle drove in a risk category of that driving quality metric.

Of course, all of the mentioned applications of the invention can be enhanced by means of introducing one or more of the above described details.

The previously given description of advantageous details to which the invention is directed or related to are combinable with one another. They contains numerous features which are partially combined with one another in the dependent claims. Expediently, these features can also be considered individually and be combined with one another into further suitable combinations. More particularly, any method features can be combined with any method or device according to any independent claim individually as well as in any suitable combination. An independent formulation of a claim in the description only equals an explicit independent claim in this regard. Furthermore, features of any method, comprehendible as apparatus features, can be considered as features of the corresponding device and, accordingly, features of the device, comprehendible as process features, can be considered as features of any method.

The above-described characteristics, features and advantages of the invention and the manner in which they are achieved can be understood more clearly in connection with the following description of exemplary embodiments which will be explained with reference to the drawings. The exemplary embodiments are intended to illustrate the invention, but are not supposed to restrict the scope of the invention to combinations of features given therein, neither with regard to functional features. Furthermore, suitable features of each of the exemplary embodiments can also be explicitly considered in isolation, be removed from one exemplary embodiment, be introduced into another exemplary embodiment for supplementation and/or be combined with any of the appended claims.

A more complete appreciation of the invention and many of the attendant advantages thereof will be readily obtained as the same becomes better understood by reference to the following detailed description when considered in connection with the accompanying drawings.

BRIEF DESCRIPTION OF THE DRAWINGS

FIG. 11 shows a flow diagram of a route planning method wherein the dangerousness of a plurality of routes is involved, FIG. 16 shows a multidimensional driving character space, and FIG. 17 shows a flow diagram of a method for testing a driving quality metric and weighting their meaningful information for application.

DETAILED DESCRIPTION OF PREFERRED EMBODIMENTS

Figure 1:
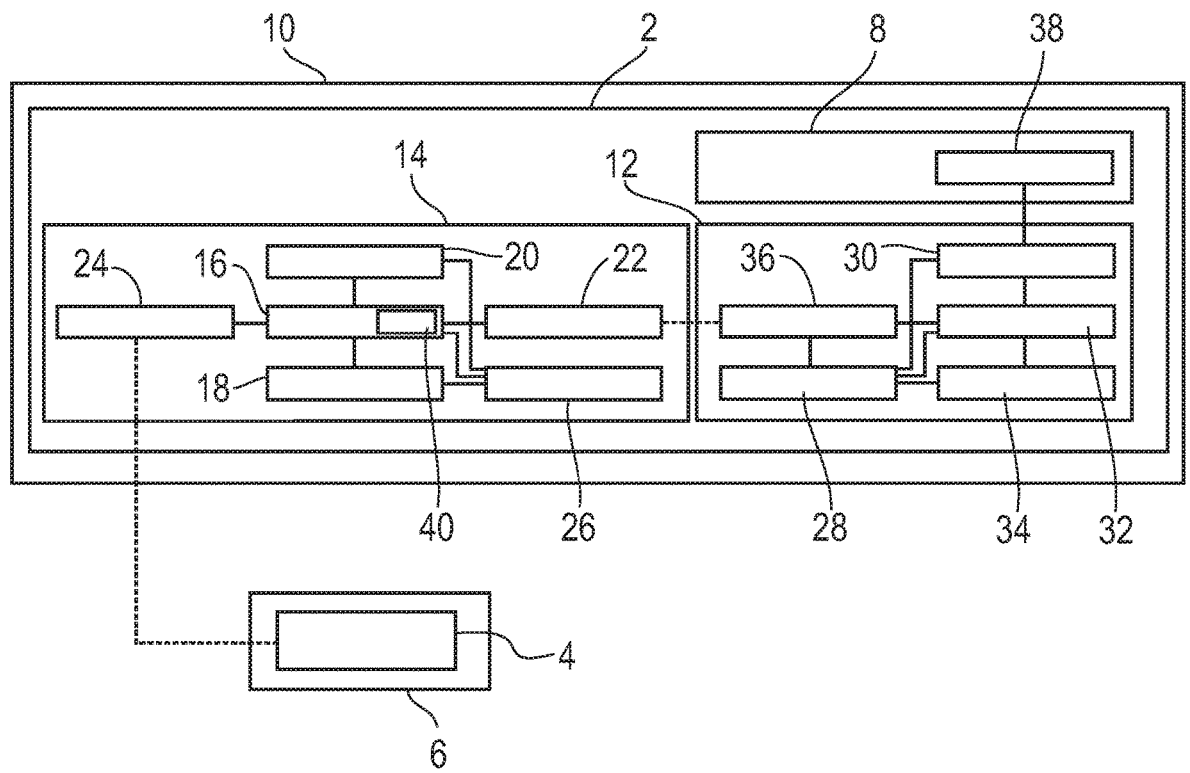
FIG. 1 shows a schematic drawing of an analyzing system with a device fixed in a vehicle, a mobile device and a stationary processing unit.

FIG. 1 shows a schematic drawing of a vehicle analyzing system 2 and a remote and stationary server 4 in a building 6. The vehicle analyzing system 2 contains an on board diagnose device 8 fixed to a vehicle 10 and an additional hardware unit 12 connected with an interface of the on-board diagnose device 8, preferably mechanically connected, like plugged into the interface. The hardware unit 12 and the on board diagnose device 8 are in a wired communication contact with one another. Further, the vehicle analyzing system 2 contains a mobile device 14, which is a portable computer, in this embodiment a smart phone.

The mobile device 14 contains at least a processor 16, a memory 18, a location unit 20, like a GPS unit, a communication means 22 to communicate with the hardware unit 12, preferably a short range communication unit, like a Bluetooth or WiFi unit, and a long range communication means 24, like a GSM, UMTS, internet or other long distance communication standard unit, to communicate with the stationary server 4, and an energy source, like a battery 26.

The fixed hardware unit 12 contains an energy source, like a battery 28, a communication unit 30 to communicate with the on board diagnose device 8, a processor 32 with attached memory 34, and a communication means 36 to communicate with the mobile device 14, and which is adapted to the communication means 22. The hardware unit 12 could also be configured to hold the mobile device 14 so both devices would be in immediate vicinity if not in surface contact with one another.

The on board diagnose device 8 contains an accelerometer or other motion detector 38 with an acceleration sensor for quantitatively measuring the current acceleration of the vehicle 10. A motion detector identical or similar to the motion detector 38 could be present additionally or alternatively in the hardware unit 12 and/or in the mobile device 14.

In the following, a plurality of processes is described. Key processes are:
Measuring acceleration with an acceleration unit, and the determination that the measured acceleration is above a predetermined threshold.
Determination of position data with a location unit, like geo-coordinates of the vehicle 10, at least during acceleration events.
Determination of vehicle speed by a speed unit at least during acceleration events, wherein the speed is preferably calculated from the determined position data by the mobile device 14, preferably outside the location unit 20, especially by the application 40.
Determination of driving characteristics with an evaluation unit.
Determination of driving induced stress of a vehicle component by the evaluation unit using the driving characteristics.

In FIG. 1 the acceleration unit is the motion sensor 38, the location unit is the location unit 20 in the mobile device 14, the speed unit is the processor 16 with a software application 40, and the evaluation unit is the remote server 4. However, although this allocation is described in the following for better understanding, the invention is not restricted to this allocation. To the contrary, all four units may be bundled in the vehicle analyzing system 2, e.g. distributed between fixed device 12 and mobile device 14, rendering the server 4 needless, or even located in the mobile device 14 or the on board diagnose device 8 alone.

The further processes and units are useful:
Tracking the vehicle path and clustering a plurality of location data in a travel trend line, preferably a straight line, with a trend line unit.
Assigning acceleration event data to a trend line covering the path where the respective acceleration event occurred in the trend line unit.
Determination of a driving metric from a plurality of acceleration event values by an evaluation unit, and preferably assigning the driving metric to a trend line.
Comparing position data of an acceleration event and/or the trend line with road data and assigning a geostationary parameter to the acceleration event and/or the trend line, like a geostationary speed and/or a geostationary category, like urban, rural, highway.

In FIG. 1 the tracking and assigning is performed by the application 40, while the metric process is done either in the application 40 or in the server 4, depending on the kind of metric. All evaluations in relation with geostationary data are performed by the server 2. However again, although this allocation is described in the following for better understanding, the invention is not restricted to this allocation. To the contrary, all processes can take place in the mobile device 14 being performed by the application 40. On the other hand, while in the following the acceleration data are collected in the fixed device 12, and the speed data are collected in the mobile device 14, and both data are processed in the mobile device to obtain the acceleration event value, it would be useful, alternatively, if only raw data, like x,y,z coordinates with concurrent accelerometer readings, is collected in the vehicle analyzing system 2 and shipped to the server 4 where the analysis would be done.

In case the motion detector 38 is located in the mobile device 14, or a supplemental motion detector of the mobile device 14 is used as acceleration sensor the application 40 contains an acceleration threshold to classify an acceleration as acceleration event in which the acceleration exceeds or falls below the acceleration threshold. It is not uncommon, however, that the acceleration sensors mounted in mobile devices, like a smart phone, have not sufficient accuracy to be used for reliable driving characteristics determination.

To overcome this problem, the app 40 contains a list of common acceleration sensors mounted in a variety of mobile devices and/or vehicle, wherein to each acceleration sensor a correction value, correction table, or correction function of acceleration values outputted by the sensor is present. At least one correction value for each acceleration threshold used in the process of determining as driving characteristic value is present, so that the threshold acceleration used by the sensor or the app 40 is corrected to a common threshold. By this measure the variety of sensors can be like calibrated to a common output result, and measuring inaccuracies of different sensors can be compensated at least partly.

A few examples for determining driving characteristics values are given in the following. In a first embodiment of the invention an acceleration metric or acceleration quality metric is determined. This process is described with FIG. 2 which shows a flow diagram of the process. In a first embodiment an acceleration event is defined as positive acceleration over a given acceleration threshold. Highly emotional driving results in specific mechanical stress of the vehicle. Such driving characteristics can be detected, if the acceleration under observation is a speedup of the vehicle, and the driving parameter used to determine the driving characteristics of the driver is a maximum speed during the acceleration event. In this case a plurality of different determinations of the driving characteristics value exist.

In step 50 the motion sensor 38 permanently monitors acceleration A of the vehicle 10. The monitoring may be permanently day and night, or only upon vehicle movement, or other vehicle activity indicating that the vehicle is in action, like the start of the engine. The vehicle activity is monitored by the fixed device 12 and reported to the mobile device 14 which starts its monitoring. If the acceleration A is below a threshold acceleration $A_T$ which is stored in the motion sensor 38 control unit, the examination taking place in step 52, the acceleration is further monitored but not forwarded to the mobile device 14.

Alternatively, the measured acceleration values A may be forwarded permanently from the motion sensor 38 to the mobile device 14, especially to the application 14. The application 14 may set the threshold acceleration $A_T$ itself either additionally or alternatively to the setting in the motion sensor 38. With this there would be no need to imply the threshold acceleration $A_T$ into the motion detector 38.

Parallel to this monitoring of acceleration the position of the vehicle 10 is permanently monitored by the location unit 20 in step 54. This monitoring includes the association of a time point to each position i.e. a two-dimensional set of coordinates. The monitoring can be triggered, for example by an occurrence of an activation acceleration of the vehicle 10 which is above an activation threshold which is lower than the acceleration event threshold $A_T$, of course. If, for example, the vehicle 10 starts moving the acceleration is above the lower threshold and a start of a position monitoring is triggered.

The position data are stored in step 56 in a buffer of the location unit 20. If no acceleration event occurs as storing trigger, as is determined in step 58, the data exceeding the buffer capacity are deleted and are lost. If, however, the acceleration A exceeds the threshold acceleration $A_T$ in step 52 this event triggers in step 62 a readout of the buffer which is done in step 64. This trigger marks the beginning of an acceleration event in which the vehicle acceleration exceeds the predetermined threshold $A_T$.

Now a plurality of position data are present reaching from a time span before the beginning of the acceleration event to the beginning. From those position data—together with the associated time points—speed values are calculated in step 66 indicating the driving speed of the vehicle 10 at the respective location points. The speed values are stored in a memory.

This process of calculation of the speed values is performed on and on until the trigger signal from the motion unit control unit stops, indicating the end of the acceleration event, i.e. the acceleration of the vehicle 10 dropped below the threshold $A_T$. At that point all speed values of the acceleration event are present, and the highest speed value is determined in step 70. This speed value is in step 72 assigned to its position data, e.g. the position data from which the highest speed value was determined. Speed value and geographic position of this value form a data couple. The process up to this point is preferably performed in the vehicle 10.

In this method all speed values fall within the acceleration event where the acceleration A is above the threshold acceleration $A_T$. The acceleration event is thus existent in the time window where $A>A_T$, or in other words from $t_1$ to $t_2$, where $t_1$ is the time when A exceeds $A_T$, and $t_2$ is the time when A falls below $A_T$.

In some situations this time window is too narrow resulting in a maximum speed value without high expressiveness. If the speed of the vehicle 10 is increased in great extend after the acceleration event already ended, the final maximum speed may have higher meaning for driving behavior and components wear. To enclose maximum speed occurring after the end of an acceleration event, in an alternative $t_2$ is set differently, for example the time point where A falls to zero, thus the time window reaches to the end of the acceleration. The time window can even be extended if in a further alternative, the time window is fixed in time with the time $t_1$ when A exceeds $A_T$, and $t_2$ is a fixed time span later, like 1 minute. Higher maximum speeds after a short intermediate deceleration period are captured as well.

In the next step 74 the position where the maximum speed occurred is compared with geographic data, preferably including road data, and a geostationary value is joined with the speed value. This geostationary value can be a statutory speed limit at the speed value location, a general traffic speed value, like an average traffic speed at this location at the respective time of day, or determined by passive tracking like practiced by WAZE®, a common traffic speed at roads like the one on which the speed location is situated, or the like.

In the next step 76 a relation of the maximum speed to the geostationary value is determined, like the difference between the maximum speed and the geostationary value. This relation is stored in step 78 as acceleration event value. In a simplified method the acceleration event value is used calculating the acceleration event value only if the vehicle speed is in a predetermined relation to the geostationary speed value, like above the geostationary speed value. The speed value can be erased from the memory before the any use in a calculation of the driving characteristics value if the vehicle speed is outside the predetermined relation to the geostationary speed value, like below the geostationary speed value.

An acceleration event value is a value characterizing the acceleration event at the end of an evaluation process of the acceleration event. If the acceleration event value is determined the detailed acceleration event data, like maximum speed, location and time of the day of the acceleration event, can be deleted from the memory, so that the acceleration event value is the only remaining value, except a number of the acceleration event, or other data not describing a character of the acceleration event as such.

The process of determining acceleration event values is continued until a travel unit is finished. Such unit can be a travel time, like one hour travel time, a mileage, like 10 km travel distance, a day time period, like 7:30 am to 9:00 am as rush hour period, a vehicle journey after which the engine of the vehicle 10 is stopped for over 10 minutes, or the like. The travel unit is determined in step 82, like by the on board diagnose device 8, the hardware unit 12, or the mobile device 14. If the travel unit is not finished, the process jumps back to step 54, and the next acceleration event value is determined.

If the travel unit is terminated an acceleration metric is determined from a plurality of acceleration event values, like all acceleration event values determined in the respective travel unit. The metric can be the average of all acceleration event values, or another synoptic value, eventually weighted by a factor or a parameter value dependent on day time, location, vehicle 10, past driver behavior, or others. With this metric detailed data from which the metric was generated can be deleted from the memory, so that those data are no longer present in any memory. In detail, any driving speed data, time data and/or location data can be erased.

Figure 2:
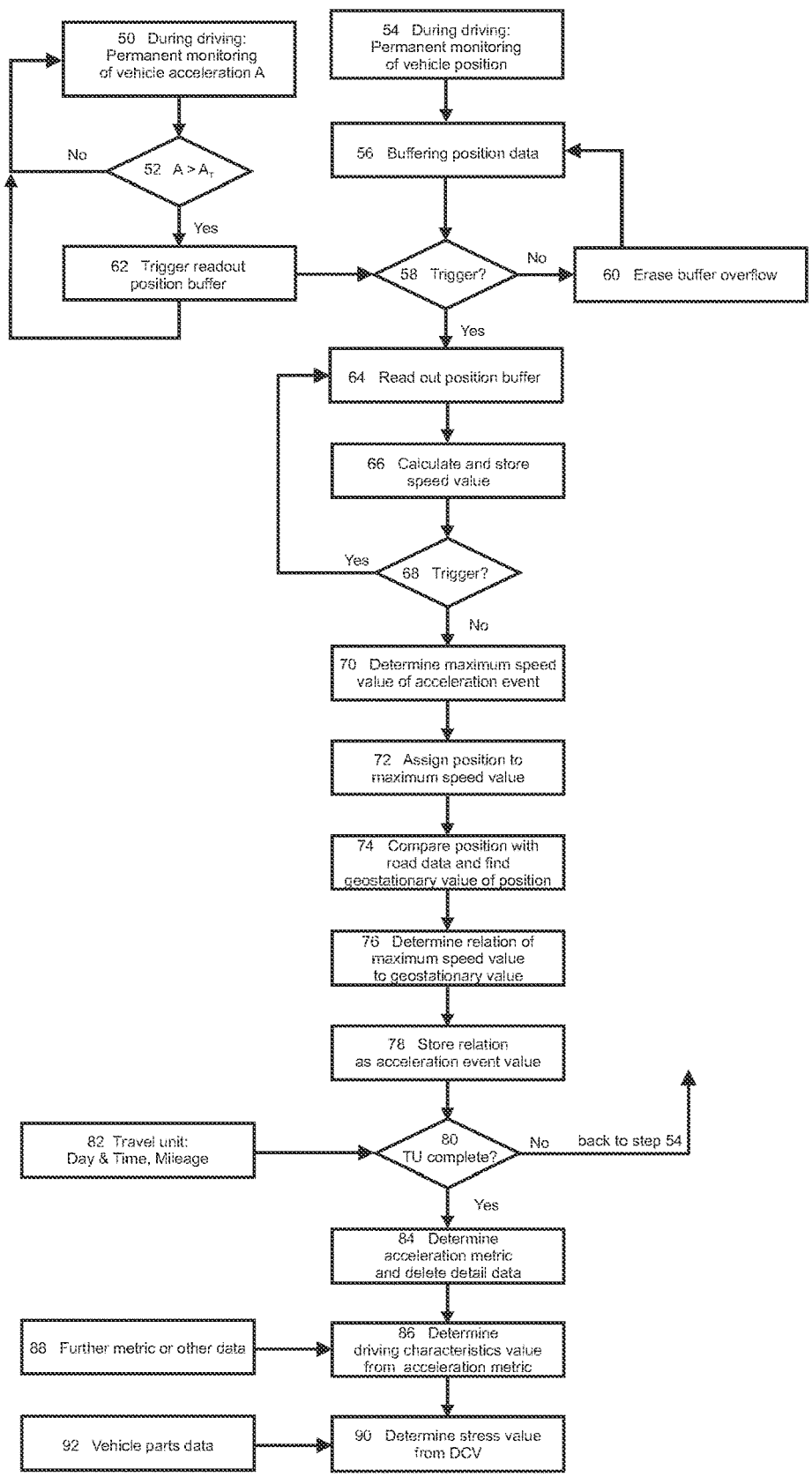
FIG. 2 shows a flow diagram for a method to determine an acceleration metric.

Instead of the maximum speed as indicated in FIG. 2 any other value, especially speed value, of the acceleration event can be taken, like a median speed, a speed at the beginning of the acceleration event, an acceleration value, or the like.

The acceleration metric is highly valuable data for determine a driving characteristics value or directly a stress value, like mechanical stress of a vehicle part, or a driver behavior for a UBI pricing profile. However, it could be useful to combine the acceleration metric in step 86 with other data

88, preferably other driving data, like another metric as described above or in the following.

The resulting driving characteristics value, function or metric can then be used to determine in step 90 a stress value like mechanical stress of a vehicle part, or a driver behavior for a UBI pricing profile. In case of wearout prediction vehicle parts data 92 are merged with the driving characteristics value. In general, a value can be a one-dimensional or more-dimensional value, like a vector containing a plurality of values.

Figure 3:
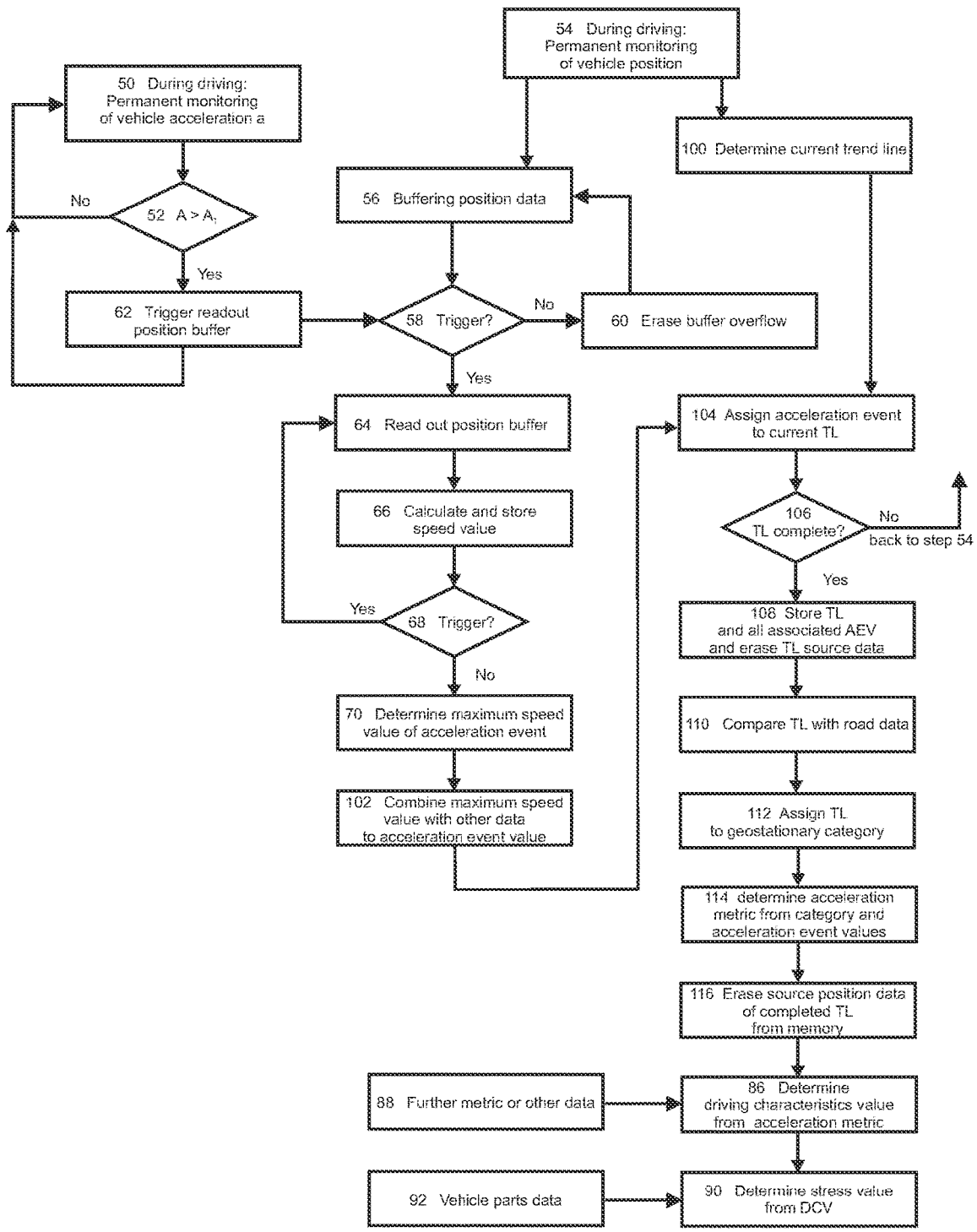
FIG. 3 shows a flow diagram of a method to determine an acceleration metric under special data privacy keeping.

Any elicitation of personal driving data raises the question of data protection and privacy. In case that the data couple of vehicle speed and vehicle speed location leaves the vehicle 10 and arrives at a remote server, the demand of data privacy may be compromised or even violated. To keep data privacy to a high degree, a trend line categorization may be used as depicted in FIG. 3. An alternative camouflaging of the relation of seed data to geographical data is described thereafter.

FIG. 3 shows a flow diagram of a further method for determining a driving characteristics value. Steps which are identical with steps of FIG. 2 are marked with the same reference numeral. In step 54 the location data are not only used for speed determination but further to determine a current trend line of vehicle travel.

The mobile device 26 comprises a trend line generation software, preferably integrated into the application 40, which calculates travel trend lines from the position data in step 100. For calculating the travel trend lines, the location data, as the position of the vehicle, are preferably camouflaged by a position error, especially a random position error. For this, to each location point a random error in the area up to 50 around the location is added to the respective two dimensional coordinates. Each trend line is calculated from position coordinates, especially from camouflaged position coordinates. The travel trend line represent a travel trend. The trend lines can be straight direction trend lines separated by a predefined travel parameter of the vehicle, like direction change of the travelling route. Travel segments instead of exact location data do not mirror the actual route taken by a vehicle but represent directional tendencies, preferably not highly resolved enough to reconstruct a route but sufficient to relate them to areas of special interest, like geographic area, specifically actuarial areas. Trend lines may be $1^{st}$ order polynomial fits to positional coordinates, preferably to positional coordinates camouflaged by coordinate errors. The travel trend lines which can be calculated via a series of least squares error first order polynomial fit of the general form, ($Y=a+bX$), or higher order polynomial, for example, although other line and trend fitting methods can be used. When a plurality of camouflaged location points is present, the current trend line is calculated in the mobile device 26. When the route driven changes in direction the current trend line is terminated and a new trend line is calculated. The transition from one trend line to the next following trend line can be determined by a nominally monotonic decrease in b below a predefined threshold. For instance, if the least squares are increasing over two, three or more successive points this is considered as indicator to end the present trend line and start a new one. The actual movement of the vehicle is thus transformed via coordinate camouflaging and least squares fitting into a series of trend lines, each trend line being defined by a start coordinate point and a termination coordinate point. The start/termination coordinate point can be the cross point of two trend lines or one of the positional coordinates or coordinate points in other words. The respective coordinate point can be the point where the second, third or following successive decrease of b happened, this point belonging to both trend lines.

In general, the process of FIG. 3 is similar to the one of FIG. 2 up to step 70, where the maximum speed of the acceleration event is determined. This speed is then directly used as acceleration event value in step 102 or the acceleration event value is derived from the speed in combination with other data. The acceleration event value is then assigned in step 104 to the current travel trend line on which the vehicle travels at the moment.

This process is repeated until the trend line is completed, probably due to a direction change of the vehicle journey. By this a plurality of acceleration event values may be assigned to the trend line until it is completed in step 106. Then in step 108 the trend line and all associated acceleration event values are stored whereas the source data of the trend line, like position data, are deleted from the memory.

Next, the trend line is compared with geostationary data, preferably with road data. For this the trend line and its acceleration event values can be sent to a remote server 4 for evaluation, so that no map data need to be transferred to the mobile device 14 which generates the trend lines and acceleration event values. On the other hand, the server 6 does not receive any data pairs of speed and speed location, and data privacy is maintained to a high degree.

In step 112 the trend line is assigned to a geostationary category, like urban, rural or highway. An acceleration metric can then be derived in step 114 from the category and the acceleration event values, like an average of the acceleration event values weighted by a category factor or put into relation to a general category speed. The source data of the metric, including trend line data and category can then be deleted in step 116. The further steps from the acceleration metric to the driving characteristics value or further to a stress value can be the same as described with regard to FIG. 2.

If the upload of GIS data to the mobile device 14 is not wanted, the comparison of the trend lines with geo-data, like a road map, can be done by the server 4. To preserver privacy speed data and location data are sent to the server 4 in two different files. To render impossible a combination of data pairs of speed and location, the entries in the files are randomized. The server 4 determines from the randomized location data the trend lines position in the landscape. The randomization has no effect on this, since the location points all together form a travel route which can be partitioned into sections, like the trend lines. Since the speed values are randomized as well, an allocation to exact location is not possible. But an allocation to trend line is possible if the trend lines—without knowledge of their position in the country—is done by the vehicle analyzing system 2, as in the mobile device 14, and the speed data are either each or in a bundle, like a file, assigned to a trend line. The geostationary speed value can eventually derived or estimated from the geo-category of the trend line, so that a comparison of driving speed with geo-speed is possible, even if not in the strict sense as would be necessary for law enforcement, but sufficient for statistics purposed like evaluation of stress of UBI relevant driving behavior.

For an alternative camouflaging of the relation of speed data to location data both data may be gathered separately and stored in two separate files or buffers. Both data sets in the files or buffers are randomized, like randomized in constant time spans, so the direct correlation of the speed data to the geostationary data is destroyed. Then, the speed data are averaged to an average speed, wherein the time section over which the data are averaged equals the acceleration event time and time span. Alternatively, the average can be determined from all data in the file or buffer or from a travel section. Only this average speed is forwarded from the mobile unit 14 to the server 4, together with all location data related to the respective travel section or file/buffer data. From the location data the server 4 may then derive the geostationary speed value, like the statutory speed at the place of the location data. These speed data are then compared to the average speed data, and the acceleration event value is derived from this comparison, like a delta between both speeds.

It should be noted that the camouflaging, either by trend lines or by averaging the speed data, is not obligatory and may be omitted if data privacy is kept by other measures or is not an issue.

Figure 4:
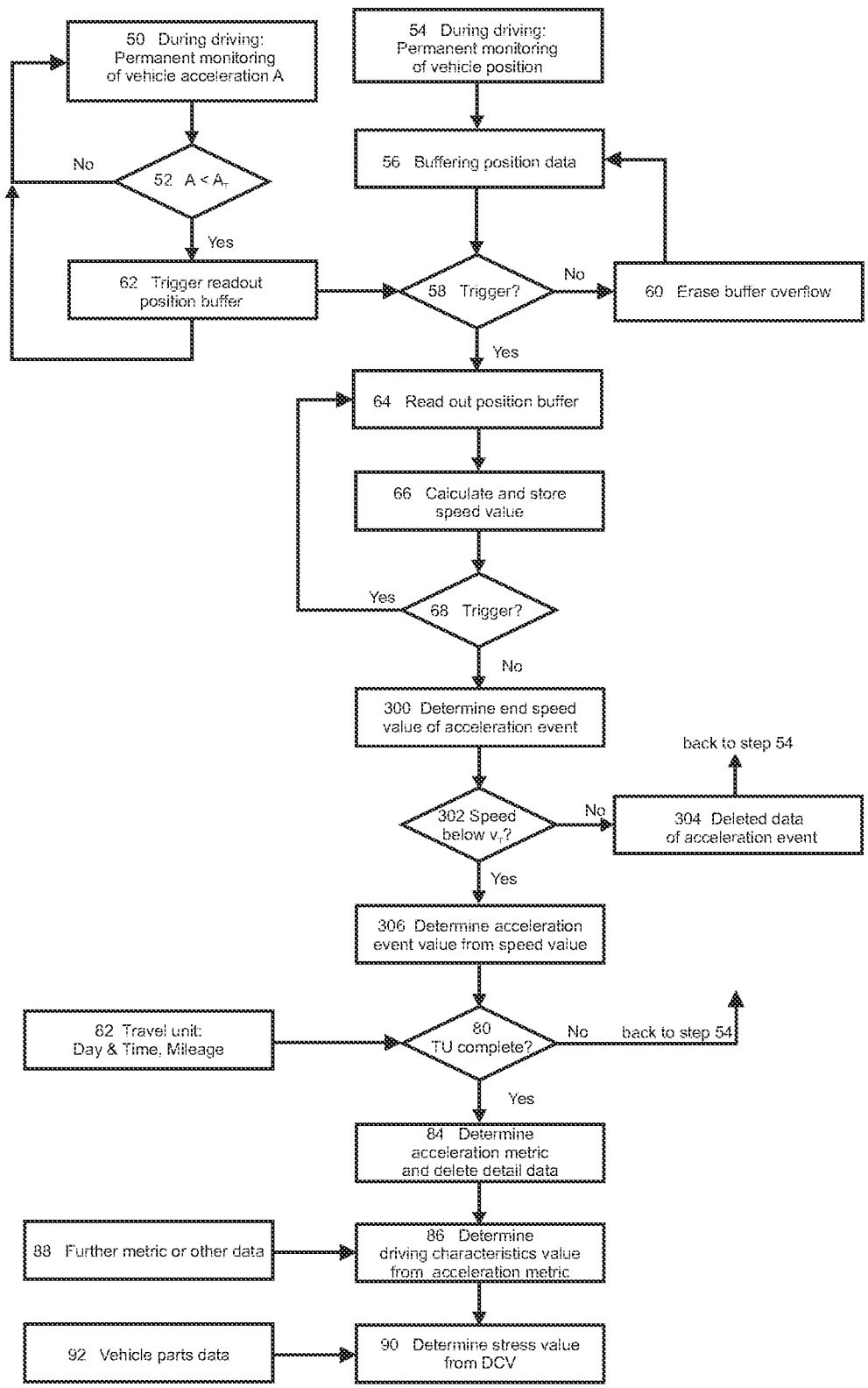
FIG. 4 shows a flow diagram for a method to determine a deceleration metric.

A further method for determining driving characteristics data is described with FIG. 4. FIG. 4 shows a flow diagram of a method for deriving a deceleration metric. Up to step 68 the process proceeds as described before with the difference, that the acceleration threshold of step 52 is negative. The check in step 52 is only positive, therefore, if the acceleration is strong and negative, thus is a strong deceleration.

In step 300 the end speed of the acceleration event is determined. The end speed is used as driving parameter for determining the driving characteristics value. In an alternative the end speed is not the speed at the end of the acceleration event, but the speed of the next time point where the deceleration is zero, thus the lowest speed directly after the deceleration period.

Now it is checked in step 302 whether the end speed fall below a threshold speed $v_T$. The threshold speed $v_T$ can be zero, or below 10 km/h, for example. If the end speed is above the threshold speed $v_T$, the acceleration event is discarded and the data of the acceleration event are deleted from any memory. An evaluable acceleration event is thus all deceleration where the vehicle 10 stops or almost stops.

Next, the acceleration event value is determined in step 306. The acceleration event value can be the speed difference between the vehicle speed at the beginning and at the end of the acceleration event. In a more sophisticated acceleration event value the speed at the beginning and/or a maximum acceleration value is factored in. If an acceleration value of the acceleration event is used in any step of any process of the FIGures, in step 62 not only the a readout of the position buffer is triggered but a readout of an acceleration value buffer as well in which the acceleration values monitored in step 50 are buffered.

Once the acceleration event value is known, the process may proceed as before, and the driving characteristics value can be derived in steps 80-86. The whole process may further be modified with the trend line process as described along with FIG. 3 which is applicable with the method of FIG. 4 as well.

Figure 5:
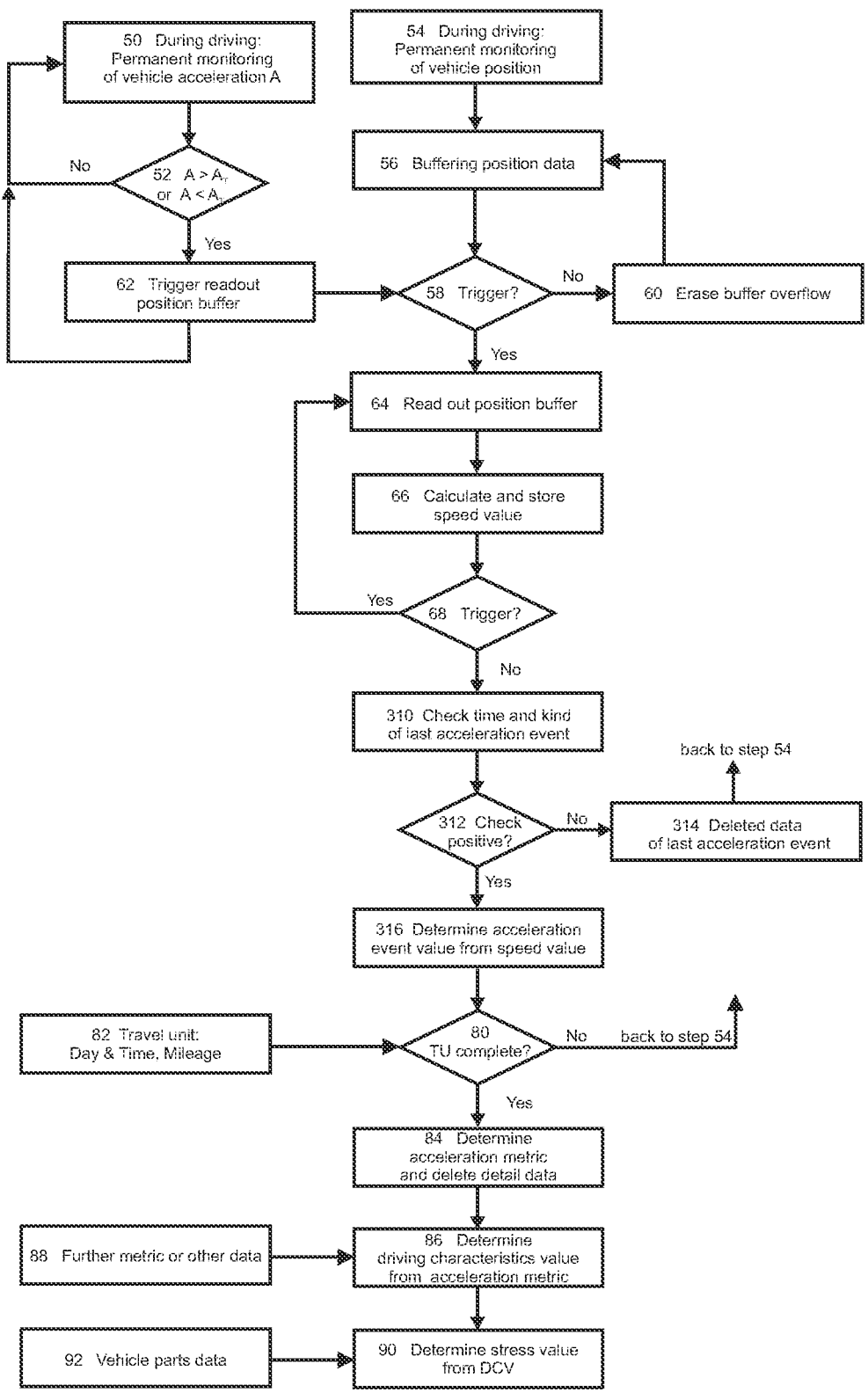
FIG. 5 shows a flow diagram for a method to determine a metric of erratic driving.

An advantageous method for determining erratic driving is described with FIG. 5 which shows a modified flow diagram. Again, up to step 68 the process proceeds as described before with the difference, that the acceleration thresholds $A_{T1}$ and $A_{T2}$ of step 52 are positive ($A_{T1}$) and negative ($A_{T2}$). Thus, an acceleration event occurs, if the positive acceleration is above $A_{T1}$ and an opposite acceleration event occurs if the acceleration is below $A_{T2}$. In general, both values $A_{T1}$, $A_{T2}$ can be seen as absolute values, wherein if during deceleration of the vehicle the absolute acceleration value rises above $A_{T2}$, an acceleration event is present. The check in step 52 is positive, therefore, if the acceleration is a strong positive or negative acceleration.

In step 310 if an acceleration event is detected, the time of the last acceleration event is checked. If the time lies within a predetermined time window, like 10 seconds, the first step of the check is positive. In the second step the kind of the previous acceleration event is checked. If the kind is opposite the check is positive, thus all together, if the previous acceleration event is opposite in algebraic sign and happened not for back in time, the check 312 is positive. If the erratic driving metric is restricted to only those cases where a strong positive acceleration is quickly followed by a strong negative acceleration, the threshold in step 52 is a positive acceleration and the check 312 goes for negative acceleration. Whereas in the processes before an acceleration event is caused by an acceleration over the respective threshold, in the erratic driving detection the acceleration event is caused only by two opposite accelerations quickly following each other.

If the test 312 is negative, the data of the previous acceleration event are deleted from any memory in step 314. If, however, an acceleration event is detected its driving parameter is determined in step 316 which in this case is the acceleration event value. The acceleration event value can be the time span between the two succeeding and opposite accelerations, the maximum acceleration of one or two of the opposite accelerations and/or a speed, like the maximum speed during the two of the opposite accelerations. In a more complex calculation one or more of these values are used to determine the acceleration event value.

Once the acceleration event value is known, the process may proceed as before, and the driving characteristics value can be derived in steps 80-86. The whole process may further be modified with the trend line process as described along with FIG. 3 which is applicable with the method of FIG. 5 as well.

While the above described processes leave open in what device the method steps are performed, it is advantageous that the acceleration event value is determined in the vehicle 10, as by the fixed device 12 or the mobile device 14. In a special embodiment the vehicle analyzing system 2 lacks the fixed hardware unit 12 and the mobile device 14, wherein the on board diagnose device 8 comprises a communication means to communicate with the stationary server 4, and a location unit, like a GPS unit. The motion detector 38 registers acceleration events and the position coordinates of the location points where the acceleration events occurred. Further, the on board diagnose device 8 calculates speed values from the location points/location data determined, and derives speed values of the acceleration events, acceleration event values and/or trend lines. Those data can be sent to the stationary server 4, or be evaluated by another evaluation unit in the vehicle 10. The server 4 or another remote server determines from the driving characteristics value and component data of vehicle components mechanical stress data and wearout data of components of the vehicle or other vehicle stress extrapolations as UBI risk management.

In the embodiment as shown in FIG. 1 the motion detector 38 in the on board diagnose device 8, in the hardware unit 12, and/or in the mobile device 14, registers acceleration events and sends acceleration event data to the mobile device 14 which registers the position coordinates of the location points where the acceleration events occurred. The mobile device 14 calculates vehicle speed values from position coordinates and assigns them to the acceleration event data for determining acceleration event values. Acceleration event values are sent to the server 4 by the mobile device 14. The server 4 determines a driving characteristics value from the received data.

The data path over the mobile device 14 opens the possibility to camouflage driving data before sending them to the server 4 and to keep privacy therewith. To enable the mobile device 14 to camouflage driving data a vehicle driver can download a copy of the analyzing software application 40 to his mobile device 14. This app 40 is made for generating and processing parameter data. The app 40 is stored or installed in said driver's mobile device 10 which preferably is specified and identified during a driver's registration at the server 4 of another registration unit. Preferably, each copy of the app 40 comes with a unique identification code (mobile ID) that refers to the customer files/profile on the server 4. Each mobile ID is encoded to distinguish between a mobile ID of the primary driver or of a secondary driver. Any driver sharing the vehicle with the primary driver has its own copy of the app 40 which he can download from the stationary processing unit which will also carry a unique mobile ID. By this a personalized driving profile of each driver can be prepared to facilitate the creation of personalized stress or wearout data.

Each vehicle 10 registered in the server 4 as participating vehicle 10 is equipped with a hardware unit 12 that also carries a unique ID, called base ID in this context. The base ID can be stored in the hardware unit 12, preferably before mounting in the vehicle 10.

Figure 6:
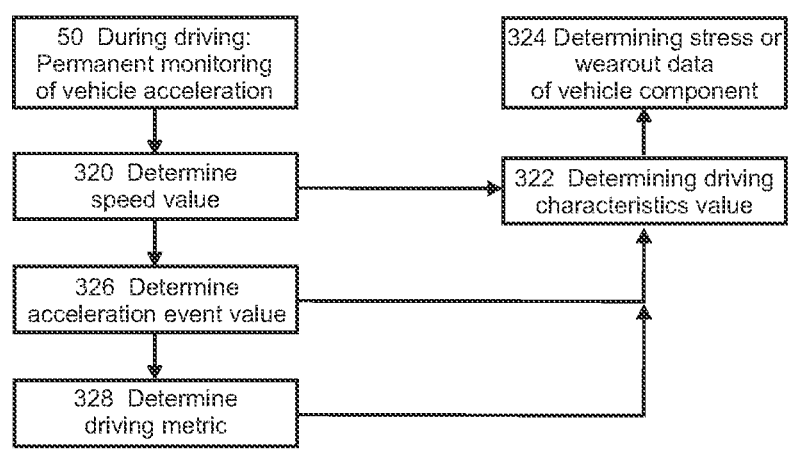
FIG. 6 shows a simplified flowchart of a method for calculating a driving characteristics value.

FIG. 6 shows a simplified flowchart of a process to calculate a driving characteristics value from which mechanical stress data or wearout data of vehicle components can be determined. This process may cover the processes of the previous FIGures which contain more details.

In step 50 the current acceleration of the vehicle is determined, as described above, preferably continuously, and an acceleration event is registered if acceleration grows higher than a predetermined acceleration threshold, like 0.3 g for acceleration and/or deceleration events and 0.15 g for erratic driving. A time of the acceleration event is associated to the event.

In step 320 a vehicle speed value of the acceleration event is determined. This is done, for example, by a location unit in the vehicle 10, like the location unit 20 in the mobile device 14, or a location unit in the on board diagnostics device 8. In the embodiment shown in FIG. 1, the time of the acceleration event is forwarded from the on board diagnostics device 8 to the hardware unit 12 and from there to the mobile device 14. The mobile device 14 determines the vehicle speed of the received time point, e.g. by looking up the speed in a speed table of a past time window.

The speed value may be forwarded to the server 4 for determination of the driving characteristics value in step 322, as indicated by the arrow from step 320 to step 322. It is important to notice that the vehicle speed value is sufficient to determine a driving characteristics value, and that a privacy problem can be kept small if only the speed value is passed to the server 4 without any location data, time data or possibly even without any acceleration data. In this very simple embodiment no data transfer via mobile device 14 is necessary, and the data can be sent without camouflaging to the server 4, preferably directly by the on board diagnostics device 8 or the hardware unit 12.

Next, in step 324, mechanical stress data and/or wearout data or a wearout property of one or more components of the vehicle are determined by the server 4 from the driving characteristics value. These data or property are useful for a modification design of those components to achieve components with long lasting properties even under adverse driving conditions caused by specific individual driving of the vehicle.

If further data are combined with the speed data camouflaging for keeping privacy becomes more important. In step 326 the speed value is combined with other data to form an acceleration event value. This can be done by combining or assigning a plurality of vehicle speed values to another, by combining one or more speed values with one or more acceleration characteristics, or by combining one or more speed values with one or more further parameters, like the time of the day of the acceleration event, a geographical place or region where the event took place, and/or a characteristics of the place or region, like an urban or rural place or a driving on a highway or expressway.

The acceleration event value can be determined by the server 4 which is supplied with preferably camouflaged raw data from the vehicle analyzing system 2. The server 4 then determines the driving characteristics value from the acceleration event value as indicated by the arrow from step 326 to step 322. This can also be done in the mobile device 14 by uploading GIS data on demand.

The acceleration event value can be further developed to a more sophisticated value, like a driving metric as indicated by step 328. Again, this value or values can be determined by the server 4 which for this is supplied with preferably camouflaged raw data from the vehicle analyzing system 2. The server 4 then determines the driving characteristics value from the driving metric as indicated by the arrow from step 328 to step 322.

It is important to note that the different methods for deriving an acceleration event value and especially a metric are combinable with one another. Such combination of acceleration event values and metrics of different kind may lead to even better wearout prediction or explanation or UBI pricing models. As described above, step 88 is a suitable position to merge two or more different metrics to a super metric from which the driving characteristics value is derived. The same advantage can be achieved if two or more acceleration event values of different kind are merged to form a super acceleration event value from which a super metric can be derived or which is used directly to determine the driving characteristics value.

Figure 7:
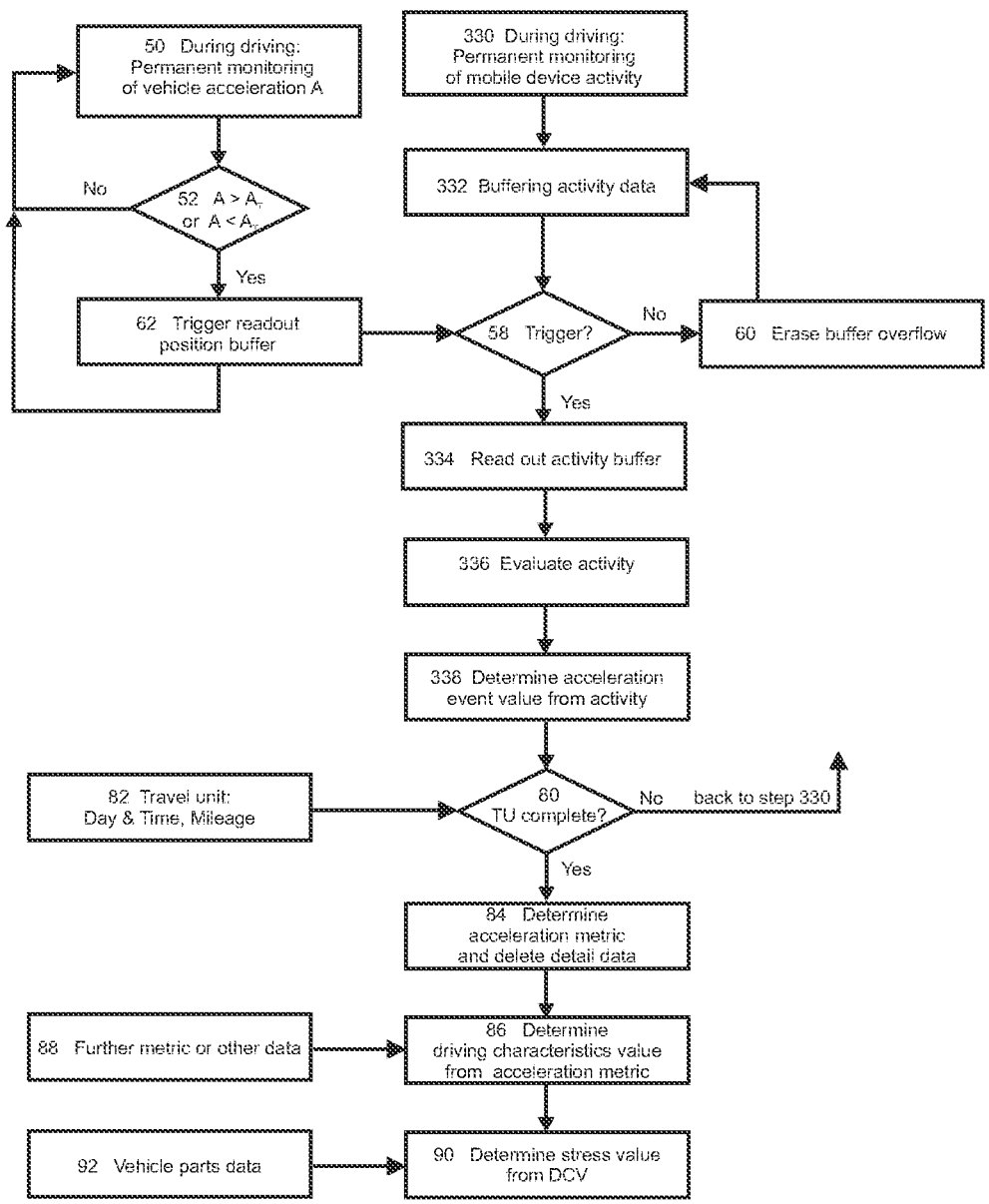
FIG. 7 shows a flow diagram for a method to determine a telephony distraction metric.

A further method to determine a driver characteristics value is described in the following along with FIG. 7. FIG. 7 shows a flow chart of a process to determine a telephony metric. The process starts as the processes mentioned above with the monitoring of the occurrence of an acceleration event. Parallel the activity of the mobile device 14 is permanently monitored as long as the mobile device 14 is on. This monitoring of online and offline activity is done by the application 40 which writes all activity in a data buffer in step 332 which involve or call for a user interaction, like incoming or outgoing telephone calls and text messages, user input via keypad, screen and voice, gaming, and output of video or audio signals and information.

If an acceleration event occurs it triggers in step 58 the readout of the activity data from the buffer in step 334. Then in step 334 the activity data are evaluated. The evaluation can be a sorting of mobile phone activity into categories, like telephone activity, manual data input activity, audio data input activity, visual data output activity, and audio data output activity.

Next, in step 338 a driving parameter, which in this case is an acceleration event value, is derived from the activity evaluation. Here each category may have a value, wherein acceleration event value can be calculated from the category or activity value and an acceleration value, like the maximum acceleration during the acceleration event.

The next steps may proceed as before, wherein the acceleration metric is derived from one or more acceleration event values, the driving characteristics value is generated, and with this value the stress value.

If within the travel unit a plurality of acceleration events occur it is advantageous if, preferably by the mobile device 14, a pattern of use of the mobile device is generated over the plurality of acceleration events. This will smooth analysis errors of the method and centers single dangerous uses of the mobile phone to a more meaningful pattern with regard to mechanical wear of vehicle components and UBI evaluations. The pattern may comprise information at how many acceleration events the mobile device 14 was used during a driving unit, and further it may comprises information about the kind of use of the mobile device.

To achieve better data privacy the data of single uses related to those acceleration events can be erased from any memory. The data privacy will also be enhanced if this process is done by the vehicle analyzing system 2, and the pattern is transmitted to a remote server 4 without the mobile device usage data. Instead of generating the pattern from data of only one travel unit, usage data of a plurality of travel units may be bundled to determine the pattern of use.

Another possibility to achieve data privacy to a certain degree is outlined in the following. Each communication action/telephony event is associated with a time point or time slot, like 1 minute or 10 minutes. With the aid of the time the communication action is associated to a travel trend line. The driving parameter, i.e. the communication action as such with its driving parameter value, like derived from telephony metadata of this communication action, and the association to a trend line may then be sent to the server 4. No location where the communication action occurred is sent to the server 4. The server 4 determines the geographical category from the trend line, like urban, rural or highway. The data of the communication actions occurring during a vehicle journey—except the trend line—are stored in a memory, like a buffer, and randomized in their order to further camouflage their rough location association. Other data associated with the communication action, like a further driving parameter, like a vehicle speed, or the acceleration event value, may be associated to their trend line as well and sent to the server 4. The server 4 associates the geographic category to the data, stores them in the memory—again without the trend line association—and randomizes them in the file. From the stored data the telephony usage, like all telephony usage during a journey, a day or another pre-defined time period, is associated to the geographic category to which—as a whole—speed and/or acceleration event value data are associated. No detailed association of single events to single event data is present anymore.

It may happen that the mobile phone of the driver is used by another person sitting in the vehicle, so that such mobile device activity has little influence on the way of driving the vehicle 10. To distinguish telephone activity of the driver from those of a passenger it is advantageous if the mobile device 14 groups addresses, like telephone numbers, internet addresses, and so on, targeted by the mobile device 14 into address groups and associates at least one of those groups to the owner of the mobile device. By this the pattern can distinguishes between mobile device activity associated to the mobile device owner and mobile device activity associated not to the mobile device owner.

A more reliably user differentiation is possible if the association uses voice sampling of persons using the mobile device for telephony.

Since telephony or smart phone activity by the driver often leads to distraction and potentially dangerous situations, the mobile device may buffer mobile device usage data. If an accident is recognized, like from an acceleration event with extreme acceleration, the mobile device preferably stores usage data spanning from a predetermined time span before the accidental event at least to the accidental event from the buffer to a long term memory. By this measure valuable data about the occurrence of the accident can be saved.

Figure 8:
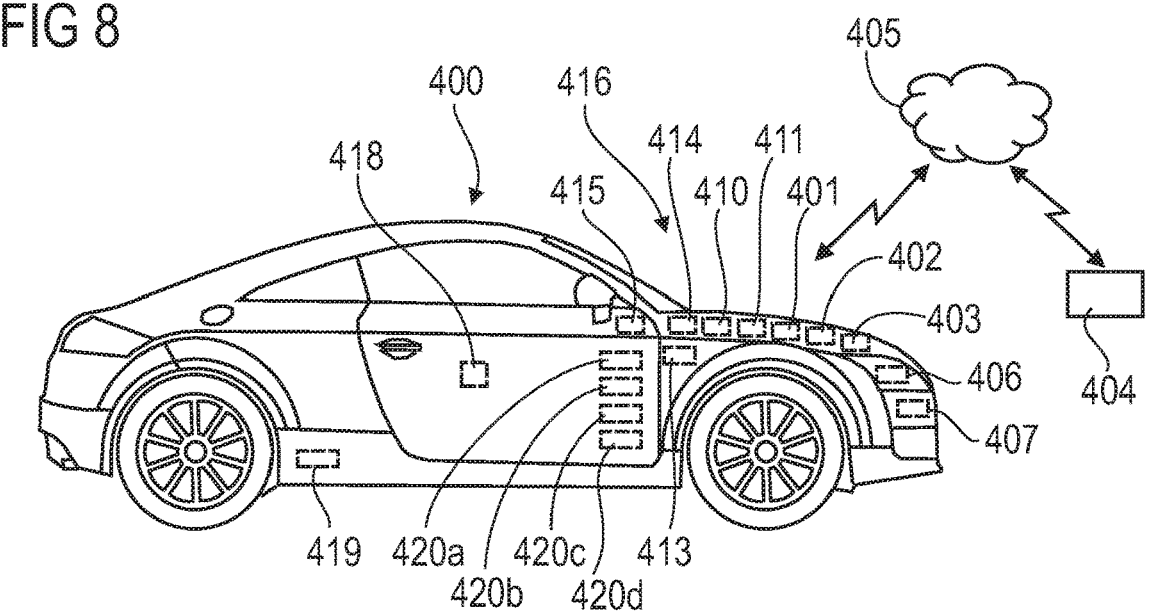
FIG. 8 shows a vehicle with an autonomous driving system.

In general, a short description of the steps performed by the methods shown in FIGS. 2-7 is given in the following:
- 50 During driving: Permanent monitoring of vehicle acceleration A
- 52 A>AT?
- 54 During driving: Permanent monitoring of vehicle position
- 56 Buffering position data
- 58 Trigger?
- 60 Erase buffer overflow
- 62 Trigger readout position buffer
- 64 Read out position buffer
- 66 Calculate and store speed value
- 68 Trigger?
- 70 Determine maximum speed value of acceleration event
- 72 Assign position to maximum speed value
- 74 Compare position with road data and find geostationary value of position
- 76 Determine relation of maximum speed value to geostationary value
- 78 Store relation as acceleration event value
- 80 TU complete?
- 82 Travel unit: Day & Time, Mileage
- 84 Determine acceleration metric and delete detail data
- 86 Determine driving characteristics value from acceleration metric
- 88 Further metric or other data
- 90 Determine stress value from DCV
- 92 Vehicle parts data
- 100 Determine current trend line
- 102 Combine maximum speed value with other data to acceleration event value
- 104 Assign acceleration event value to current TL
- 106 TL complete?
- 108 Store TL and all associated AEV and erase TL source data
- 110 Compare TL with road data
- 112 Assign TL to geostationary category
- 114 determine acceleration metric from category and acceleration event values
- 116 Erase source position data of completed TL from memory
- 300 Determine end speed value of acceleration event
- 302 Speed below $v_T$?
- 304 Deleted data of acceleration event
- 306 Determine acceleration event value from speed value
- 310 Check time and kind of last acceleration event
- 312 Check positive?
- 314 Deleted data of last acceleration event
- 316 Determine acceleration event value from speed value
- 320 Determine speed value
- 322 Determining driving characteristics value
- 324 Determining stress or wearout data of vehicle component 326 Determine acceleration event value
328 Determine driving metric
330 During driving: Permanent monitoring of vehicle position
332 Buffering position data
334 Read out buffer activity
336 Evaluate activity
338 Determine acceleration event value from activity FIG. 8 shows a vehicle 400 being a passenger car with a plurality of components, as an evaluation unit 401, a local area communication unit 402 for direct communication with similar units of vehicles 423 (FIG. 9) in a vicinity of the subject vehicle 400, and a long distance communication unit 403 for GSM or other telephone or internet communication with a remote server 404 through a network 405, like the internet. The vehicle 400 contains further components as an autonomous driving control unit 406 and a plurality of driving assist systems 407, like a lane guiding or lane change control, a breaking assistant, electronic stability control, and/or dead angle detection control.

Figure 9:
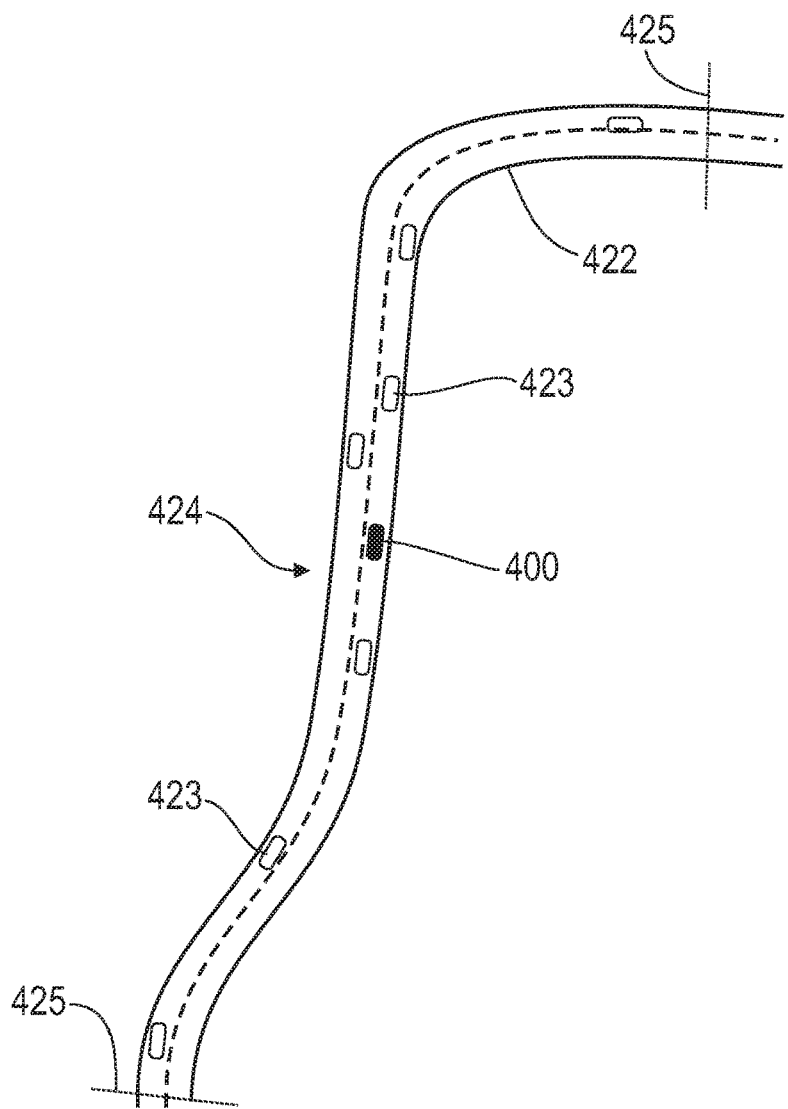
FIG. 9 shows a route section in which the vehicle is driving together with other vehicles.

FIG. 9 shows the vehicle 400 driving on a road 422 together with a plurality of other vehicles 423. The road 422 is part of a route section 424 with is limited by section boundaries 425. The route section 424 is part of a driving route which was chosen by the vehicle driver before the beginning of the journey. During the journey the vehicle 400 is driven and controlled by the autonomous driving control unit 406, or it is manually driven if the driver has chosen this option. Further, the driving assist systems 407 are active—if not deactivated by the driver—and guide the vehicle 400 as well according to their ability spectrum, like keeping the vehicle 400 inside the lane, or braking the vehicle 400 automatically if approaches an obstacle too fast.

The local area communication units 402 of the vehicles 400, 423—if present in the vehicles 423—exchange driving data, like planned route, position, speed, acceleration, and/or steering degree, and status data, like active driving assist systems 407, control status of driving, like manual or autonomous driving, and/or manufacturer and software version of the autonomous driving control unit 406 and the of driving assist systems 407.

Figure 10:
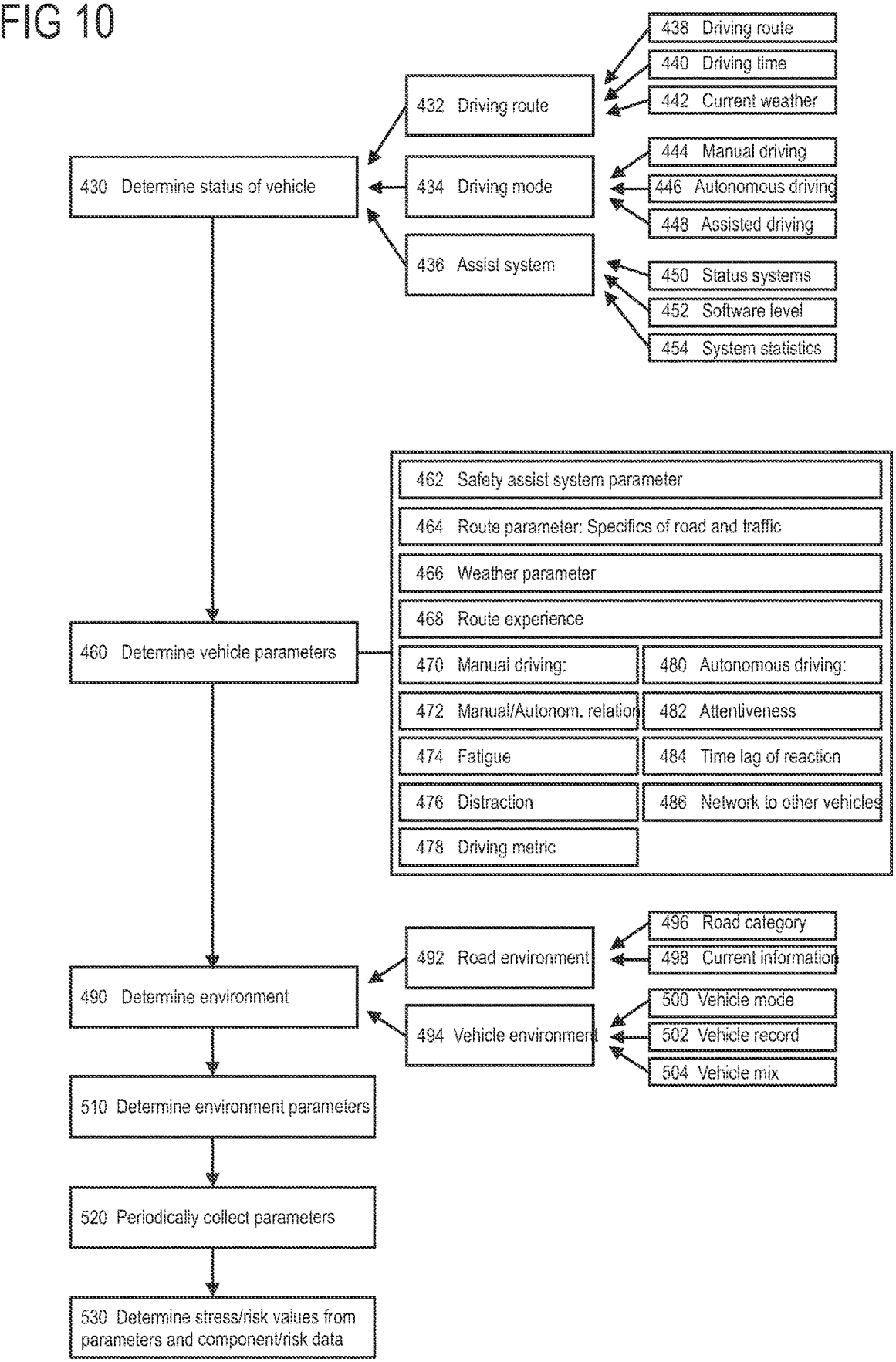
FIG. 10 shows a flow diagram of a method for determining a driving characteristic.

FIG. 10 shows a flowchart of a method for determining a driving characteristic of the vehicle 400. In a first step 430 the evaluation unit 401 determines a status of the vehicle 400. This status comprises a driving route status 431, a driving mode status 432, and/or an assist system status 433. The driving route status 431 comprises the driving route 434 planned by a route planning unit with a GPS unit, and the current position of the vehicle 400 within this route, the driving time 435 of the vehicle 400 on the journey, including coffee breaks during the journey, and the day time, and/or the current weather conditions 436. The status of the driving mode 432 comprises manual driving 437, autonomous driving 438, and/or assist system supported driving 439. The status of the driving assist systems 407 comprises the status 440 of each system 407 present in the vehicle 400, like deactivated, active determining, or active in alert mode, speed, and/or acceleration of the vehicle 400, the software level 441 of each system 407, and/or the individual safety statistics 442 of the systems 407, which can be collected by a manufacturers routine of the respective system 407, and may reflect a safety history, like numbers and kind/gravity of system alerts in the past.

Most of these status data are a result of driver input into a component of the vehicle 400 and reflect interactions between the driver, either presently or in the past, and the respective vehicle component as listed above, or more general: The status data are data of driver interaction with a vehicle component.

In the next step 450 the evaluation unit 401 determines one or more of the following vehicle driving parameters from the status information. Each driving parameter quantifies the status information to a value. The value can be a one dimensional value, i.e. a single value, or more dimensional value comprising a single value for each dimension.

One of these parameters is the safety assist system parameter 451 which indicates a gain in safety and/or the influence on the driving due to the currently active system(s) 407. This parameter 451 is evaluated when driving manually as well as when driving autonomously, since each system 407 supports both driving modes. The gain in safety is relevant for UBI purposes, while the influence on the driving is relevant for determining a mechanical stress factor on certain vehicle components.

A further parameter is the route parameter 452. It quantifies specifics of the current road, like road width, condition, bend, incline and/or the like. Further it may quantify traffic conditions, like traffic speed, traffic density, general speed fluctuation of surrounding vehicles 423, general statistics about kinds of vehicles 423 in the vicinity like cars, light trucks, heavy trucks, and busses. Again, parameter 64 indicates a driving safety value and/or an influence on the driving due road and traffic conditions.

A third parameter is the weather parameter 453 reflecting weather conditions, like precipitation, temperature, likelihood or slippery road due to ice or snow, wind, angle and brightness of the sun, and the like. Further, since driving a road more often leads to road experience, the route experience parameter 68 reflects safer and more uniform driving the higher this parameter 454 is. The parameter 454 can then be derived as a function of a route learning level of an autonomous driving system of the vehicle 400.

Further parameters are dependent on the driving mode. When the vehicle 400 is driven manually the parameter group 455—459 is relevant. When driven autonomously the parameter group 461—463 is relevant. The mode relation parameter 456 reflects the relation between manual and autonomous driving of the vehicle 400 dependent on the choice of the driver. Usually the higher the percentage of autonomous driving is the higher is the safety level/value or uniform driving level/value reflecting UBI relevant accident risk or components wear, respectively.

The fatigue parameter 457 resulting from driving time, time of the day, eye sensor data, lane keeping data, and the like is more relevant for accident risk determination, but has influence on components wear as well, since if a road shoulder is hit and the vehicle 400 drives with high speed through soft ground or gravel this will have impact on certain vehicle components. Similar is the distraction parameter 458 resulting on infotainment input for instance during manual driving.

The driving metric parameter 459 is an important parameter resulting from emotional driving, for example. Such driving behavior is, for example, inattentive driving, low anticipatory driving, or highly emotional driving. Such behavior can fairly well be detected by monitoring specific acceleration events occurring during driving. If, for example, a vehicle is decelerated disproportionately often from a speed value to zero with a high deceleration value, this can be evidence for inattentive driving. If, to give another example, a vehicle shows high acceleration values during high speed driving, or a high deceleration shortly after a high acceleration, this is evidence for low anticipatory driving, or highly emotional driving, respectively. Each driving style causes different stress pattern resulting in different wearout symptoms of characteristic components of the vehicle. Since the driving style or driving characteristics of individual drivers is difficult to simulate or replicate in test phases of a new vehicle, the determination of driving characteristics of a vehicle is a valuable method for determining a long term mechanical stress of the vehicle and/or providing statistical inference to related projections such as those related to road side repair and UBI pricing. Even further, the warranty period of a vehicle can be made dependent on the components wear or the driving characteristics of a driver or a vehicle. If the driving characteristics value indicates a driving with potentially low wear of mechanical components of the vehicle the warranty can be prolonged. Since this is an attractive incentive for the vehicle owner he may want to change his driving behavior leading to better driving safety—and in general: traffic safety for surrounding vehicles. Accordingly, determining the driving characteristics of a driver or vehicle involves many advantages for vehicle construction, wearout prediction and vehicle repair, UBI risk assessment, warranty adaptation, and traffic safety.

In general, the evaluation of the driving characteristic, long term mechanical stress or driver induced stress on of a vehicle, respectively, may comprise the evaluation of acceleration events which have occurred in the past. The evaluation can comprise the determination of a driving metric, however, a single or a plurality of acceleration events can be sufficient to be used as driving metric parameter 459 in the determination of the driving characteristic value.

The driving metric can be derived from: an average of a plurality of acceleration event values, a variance of a plurality of acceleration event values, and/or a quotient of any of the values mentioned in this paragraph or before. An example of a driving metric is an average speed difference between the speed at the beginning and the end of the acceleration event divided by an average speed of the vehicle prior or at the beginning of the acceleration event. The driving characteristics value can be—or derived from—a vehicle speed value directly, an acceleration event value, or a driving metric. The mechanical stress of a component of the vehicle can be calculated from the driving characteristics value and vehicle component parameters.

When driving autonomously the attentiveness parameter 461 is relevant. If an alert or a prompt for manual driving is sent from the autonomous driving control system 406 the kind of reaction of the driver is the relevant input for this parameter. The time the driver needs for reaction is subsumed in the time lag parameter 462.

Driving safety and uniform driving can significantly be increased if the subject vehicle 400 is networked with surrounding vehicles 423 in a predefined vicinity 424. The network parameter reflect this intercommunication between vehicles 400, 423, and includes the number of vehicles 423 integrated in this intercommunication and the percentage of intercommunicating vehicles 423 among all vehicles 423 in the vicinity 424, as well as their degree of intercommunication.

Before, during or after the steps 430 and 450 the evaluation unit 401 determines the environment in step 470. This step 470 is independent from the steps 430, 450 and may be an additional step 470 or an alternative step 470. For reason of simplicity, in the following step 470 is an additional step after step 470.

The environment comprises data which are gathered from short range communication, like from intercommunication with vicinity vehicles 423 and/or sensors/sender placed at the roadside, like fog sensors, traffic sensors and/or information senders, like for presetting a current speed limit for the autonomous driving control unit 406 or other driving or traffic information.

The environment comprises the road environment 471 and/or the vehicle environment 472. The road environment 471 comprises the road category 473 of the road driven by the vehicle 400, like urban, rural, highway/interstate, and/or current information 474 about road specifics and/or traffic conditions, preferably gathered from short range communication.

The vehicle environment 472 comprises one or more of the following data:
Number and/or percentage of vicinity vehicles 423 under manual or autonomous driving mode 475,
safety assist systems present and active in vicinity vehicles 423,
safety record 476 of vicinity vehicles 423 as far as these records are intercommunicated between vehicles 400, 423, and may comprise a safety score/value of the current driving and/or historic driving of the driver, and/or a safety score/value of the vehicle due to construction and/or safety assist systems,
vehicle mix 477 of cars, vans, light trucks, heavy trucks and busses in the vicinity, outputted in absolute and/or relative figures, each vehicle category may be split into driving mode (manual or autonomous).

From the environment data one or more environmental parameters are derived in step 480 as a function of environmental data. As before, each driving parameter quantifies the environmental status information to a value. The value can be a one dimensional value, i.e. a single value, or more dimensional value comprising a single value for each dimension.

Both, the vehicle parameters and the environment parameters use the vehicle data and environment data respectively and may use further information as additional factors. These information/factors can be component specific for wear determination and/or risk specific for risk assessment for UBI pricing purposes. Since the vehicle and environment parameter is preferably derived in the vehicle 400 the access to specific component data or risk data respectively might be limited. The parameters can therefore be individually stored and later transmitted to a remote server 404 for combination with component or risk data.

Steps 450 and 480 are snapshots of the current situation providing current parameter. In step 482, therefore, those parameter are periodically determined from then current vehicle and/or environment data and collected over a predetermined time span, like a journey, a day, a week, or any other practical time span.

During a vehicle journey an interaction of the driver with the autonomous driving control unit 406 may occur, like a manual driving control intervention during autonomous driving of the vehicle. This will then be reflected as next status which switched from autonomous to manual or semi-autonomous. Further, the interaction as such is reflected in the next vehicle parameter 456 which further may include the kind or category of situation in which the intervention occurred.

To observe the driver reaction, like kind of reaction and/or reaction time, the autonomous driving control unit 406 may output one or more prompts to the driver, like for manually overtake control or other intervention. The parameter 461 or 462 then contains the reaction kind or reaction time, respectively. The prompt can be a pseudo alert, preferably during stable autonomous driving conditions. In certain situations an alert for manual intervention into driving control may be released, like in a dangerous driving situation or a situation in which the autonomous driving control unit 406 senses difficulty in autonomous control. Now, the parameter 461 and/or 462 can be derived as a function of a category of the situation which triggered the alert.

Depending on the driving routes and traffic situation the frequency of alerts for manual intervention into driving control can vary significantly. This is reflected by the collection of a plurality of parameters 461—463 over a time span. The same is true for a frequency or number of manually overtaking driving control from autonomous driving, if, for example, the driver is unsatisfied with autonomous driving.

In case the evaluation unit 401 finds as a result of the status 430 of the vehicle 400, the status 470 of the environment and/or one or more of the parameters 450—480, that a travel situation is present which falls under a predefined situation class, like if an accident risk of a travel section of a travel route is above a threshold, especially during autonomous driving, then a driving control action can be performed dependent on the situation class. Such driving control action can be an alert for manual intervention into driving control.

In case the situation class is an accident risk of the travel section such risk can be derived as a function of historic accident data of the travel section, as a function of state of the travel section and/or a function of the current driving situation or a future driving situation of the vehicle in relation to a character of the travel section.

The parameters 450-480 may serve as driving characteristic value, however, a link to vehicle component data or driving risk data is advantageous. With these data the stress of a vehicle component or a current driving risk resulting from the driving characteristic value is derived, which is done in step 486. Step 486 may be performed outside the vehicle 400, like in a remote server 404 to which the collected parameter values are sent from the vehicle 400. The collected parameters may be taken as factors as such or be bundled, like averaged over a time span, and then taken as a function in stress/risk value determination.

In case of current driving risk assessment, in step 488 a driver assist system control is influenced dependent on the risk data. An example of this is an automatic braking of the vehicle or steering of the vehicle 400 to escape from a risky situation.

These stress/risk values are valuable driving characteristic values for determining mechanical stress and/or wear of components of the vehicle 400 and may as well or alternatively be used, for example, for pricing road side repair, warranty extension, or UBI liability coverage, respectively. If a driver drives careful and uniformly, like by choosing autonomous driving very often, this can effect warranty positively so that the manufacturer may grant a warranty extension to the driver or/vehicle 400.

Figure 12A:
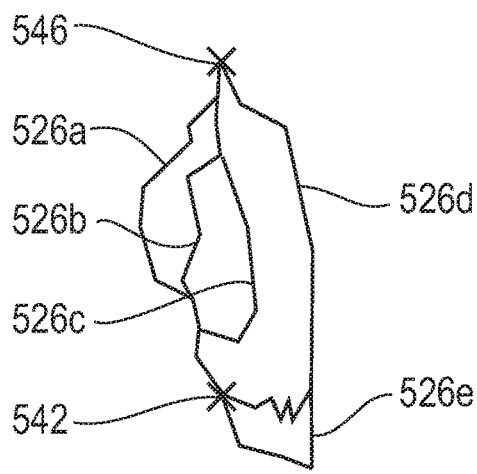
FIG. 12a shows the plurality of routes as determined from geographical data.
Figure 12B:
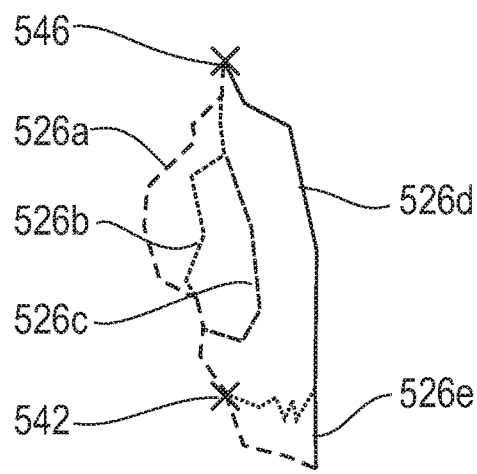
FIG. 12b shows the plurality of routes wherein the dangerousness of the routes is involved with regard to route, weather and vehicle characteristics.
Figure 12C:
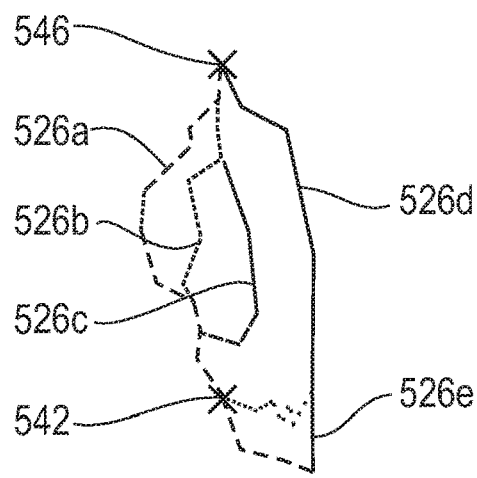
FIG. 12c shows the plurality of routes wherein the dangerousness of the routes includes vehicle characteristics of other vehicles which will probably be in the vicinity of the subject vehicle during driving along the routes.

In general, a short description of the steps performed by the methods shown in FIG. 10 is given in the following:
 430 Determine status of vehicle
 431 Driving route
 432 Driving mode
 433 Assist system
 434 Driving route
 435 Driving time
 436 Current weather
 437 Manual driving
 438 Autonomous driving
 439 Assisted driving
 440 Status systems
 441 Software level
 442 System statistics
 450 Determine vehicle parameters
 451 Safety assist system parameter
 452 Route parameter: Specifics of road and traffic
 453 Weather parameter
 454 Route experience
 455 Manual driving
 456 Manual/Autonomous relation
 457 Fatigue
 458 Distraction
 459 Driving metric
 460 Autonomous driving
 461 Attentiveness
 462 Time lag of reaction
 463 Network to other vehicles
 470 Determine environment
 471 Road environment
 472 Vehicle environment
 473 Road category
 474 Current information
 475 Vehicle mode
 476 Vehicle record
 477 Vehicle mix
 480 Determine environment parameters
 482 Periodically collect parameters
 486 Determine stress/risk values from parameters and component/risk data
 488 Control driver assist system dependent on risk data As shown in FIG. 8, the vehicle 400 further comprises a navigation system 410, like a GPS route planner and a unit 411 for determining a driving danger parameter for routes which are developed by the navigation system 410. The route 526e, which was chosen by the vehicle driver before the beginning of the journey, is depicted in FIG. 12a-12c, wherein FIG. 11 shows a flow diagram of a method for planning the route 526e.

Before the journey the vehicle driver in step 540 enters a journey destination 542 into the navigation system 404 which uses the current position of the vehicle 400 and the destination 542 to determine in step 544 a plurality of suitable routes 526a-526e spanning from the current position 546 as a beginning location to the journey destination 542 as the ending location. In the following the reference numeral 526 is used without letter if any route 526 is mentioned without reference to a special route 526a-e.

The routes 526 are determined from a geographical data base containing a road map. One of the routes 526 is the fastest route 526a, and another route 526b is the shortest route 526b. The other routes 526c-e are alternative routes, wherein only three further routes 526c-e are shown in FIG. 12a, whereas it will be useful to define a lot more routes for proper route planning. Normally some of the determined routes 526 will be presented to the driver to choose one, along which the navigation system 410 will guide the driver during his journey.

Instead of presenting the routes 526 to the driver the unit 411 named as journey control in the following accesses a remote route risk data base in step 548 which is stored in the remote server 404 and enters the routes 526 to the server 404. The route risk data base partitions all roads of the routes 526 into segments, like segment 424, and associates to each segment a segment danger parameter which can be a coefficient or a multi-dimensional vector showing a coefficient for each vector dimension. Each vector dimension may characterize a specific danger along this section. Such dangers can be technical condition of roads of the sections, an accident history of the sections, preferably including reasons for the recorded accidents, weather conditions during driving of the sections, and/or traffic conditions of the sections. For each section the respective danger parameter is transmitted to the journey control unit 411 in step 549.

Said vector can be further expanded to reflect characteristics and driving accident history of other vehicles on alternative routes that the route management can predicate the UBI insured vehicle's transit being clustered in their proximity for added vehicle predictability and driving safety.

Similarly route planning and their corresponding vector weighting can purposely reflect routing via frequently traversed route segment where we infer automatic learning facilities in the autonomous control or better manual safety performance based on prior driving route history. In some cases such segments may reflect neither the fastest nor the most economical or other physical route optimization; but rather simply the safest practical route.

The journey control unit 411 assembles in step 550 for each route 526 the complete route danger parameter from the section danger parameters of all sections of the respective route 526. This parameter will be a matrix with n×m coefficients, wherein n is the length of the row which equals the number of sections for the respective route 26 and m the length of the columns which equals the number of dimension of the section danger vectors.

In the next step 552 the journey control unit 411 combines the coefficients of each row with technical details of the vehicle. The details can comprise details of one or more driving assistance systems 407 present in the vehicle 400, like a lane guiding or lane change control, a breaking assistant, electronic stability control, and/or dead angle detection control. Further, the technical details may comprise tire characteristics of the tires of the vehicle, like the condition of the tire profile, and tire air pressure. If, for example the route 526d comprises a steep section and the weather condition is icy and the tires are poor, a high danger factor will result, accordingly. The row coefficients can be weighted with the length of their segments and averaged, or each coefficient results in an individual outcome. This process results in a first route danger parameter which is determined by the journey control unit 411 in step 554. This parameter is a function of the geographical properties of the route 526, condition properties of the route 526, like technical state and weather conditions, and technical vehicle data.

In a further and optional process the journey control unit 411 determines a second route danger parameter which involves parameter of other vehicles 423 driving in the vicinity of the subject vehicle 400 during its journey. For this the journey control unit 411 in step 556 a probable time window in which the vehicle 400 will transit a plurality of location points in each segment 424 of all routes 526. By accessing the server 404, either in the accessing step before or in a separate access, the journey control unit 411 submits the probable time windows with the assigned locations to the server 404 which compares these data with travel data of other vehicles known so far to the server 404. Preferably, the journey control unit 411 periodically accesses the server 404 and/or the server updates the journey control unit 411 periodically or upon significant changes in vehicle travel data.

Next, in step 558 the server 404 generates danger data for each segment 424 as a function of other vehicle travel data, like characteristics of vehicles on the driving route. Such data may comprise the traffic density, traffic speed, the number of autonomously driving vehicles and the number of manually driving vehicles, driving habits, safety records, and/or current driving characteristics of the drivers associated with the vehicles on the driving route. These danger data are transmitted to the journey control unit 411, which assembles them in step 560 to a second route danger parameter for every route 526. Again, in step 562, the danger parameter may be matched or combined in any way with technical vehicle details to result in a superior value for each route 526. Both danger parameters may then be merged to one parameter for each route 526 in step 564.

Next, the routes 526 can be weighted according their accidental risk in step 566. This process is depicted in FIGS. 12a to 12c. FIG. 12b shows characteristics of the routes 526 in form of dotting of the lines. These characteristics reflect the first danger parameter of the routes. The closer the dots are the higher is the accident risk and the danger parameter.

The fastest route 526 reaches from the beginning location 546 to the journey destination 542, and involves a moderate driving risk, as is depicted by a long dotting of the line. The fastest route 526b is in the last 40% of the route identical with the fastest route, and involves in its first 60% a minor road which involves a relatively high accident risk. This is depicted by a close dotting.

Route 526c is a safer alternative to both routes. It is about as long as the fastest route 526a, but a bit slower and a bit safer, depicted by a very long dotting which is almost a drawn through line. Route 526 takes an interstate highway for its first 80% but goes then steep down a hill in serpentines to the ending location 542. Route 526d is quite long but in its first 80% very safe. The serpentine section, however, ruins this safety advantage, since the weather is icy and the serpentines are quite steep. A better alternative is reflected by route 526e which comprises the interstate part of route 526d, a further interstate part and a broad rural highway at the end to the ending location 542. Altogether, route 526e is by far the longest route, it is not the fastest, but it is the safest route.

FIG. 12c shows the routes 526 reflecting both danger parameters. It can be seen that a middle part of route 526a comprises a dangerous section, like due to heavy traffic or many manual drivers in a Friday afternoon rush hour on a rural road with many vehicle passing events. The accident history for this section is very bad during this time of the day and week. Accordingly, route 526a is ranked down in comparison with the ranking involving only the first danger parameter. On the other side, route 526c is a rural road with very low traffic at the time of probably passing of the vehicle 400. This section lead to an upranking of route 256c. The serpentine section of route 526 is ranked down heavily, since some vehicles with bad tires will travel there before or during the time window of the vehicle 400 passing this section. Route 526e remains the safest route.

The journey control unit 411 now assigns credits, like UBI payment return credits, to each route and further derives advantages and disadvantages of each route 526. Together with a proposal to the driver it lists in step 570 the length, travel duration, fuel consumption, accident risk and credits to the driver to make him choose one of the routes 26. The driver picks one of the routes 526 in step 572, and the journey control unit 411 feedbacks the chosen route 526e to the server 404 in step 574. The route 526e and driving data are fed into the traffic data base in the server 404 for evaluations for other vehicles.

Now the journey control unit 411 hands journey data over to the driving control unit 406, like preferably time windows for specific location points or sections 424. The driving control unit 406 now controls autonomous driving in step 576. During the journey the driving control unit 406 adjusts the vehicle speed in step 578, so that the vehicle 400 drives under optimal safety conditions, for instance, by bringing or keeping the vehicle 400 into a cluster of other autonomously driving vehicles 423.

In general, a short description of the steps performed by the methods shown in FIG. 11 is given in the following:
- 540 Driver enters journey destination
- 544 Journey control derives plurality of routes to destination
- 548 Journey control accesses remote route risk data base
- 549 Transmission of danger parameter to each route segment to journey control
- 550 Assemble route danger parameter for every route
- 552 Conjuction of danger parameter with vehicle details
- 554 Determination of first route danger parameter
- 556 Determination of probable transit time windows of segments
- 558 Generation of danger data reflecting characteristics of other vehicles
- 560 Assembling of danger data to second danger parameter of route
- 562 Conjuction of danger parameter with vehicle details
- 564 Merging of both danger parameters
- 566 Weighting of routes
- 568 Assignment of credits to each route
- 570 Proposal of routes
- 572 Choice of one route by driver
- 574 Journey control accesses remote traffic data base
- 576 Control of autonomous driving on chosen route
- 578 Control of speed to bring or keep vehicle within safe traffic band The vehicle 400, as shown in FIG. 8, is equipped with an on-board device 413 comprising an interface 414 to which a dongle 415 is fixed. Inside the vehicle 400 is a driver carrying a mobile communication device 418, like as smart phone. On-board device 413, interface 414 and dongle 415 form an on-board system 416. The vehicle 400 is driving from a starting point where the driver entered the vehicle 400 to a journey end point where the driver will leave the vehicle 400.

The dongle 415 and the mobile communication device 418 entered into a communication over Bluetooth, and the mobile communication device 418 from time to time communicates over long distance communication line 405, like a GSM-service, to a remote server 404. The mobile communication device 418 has communicated his identification code to the dongle 415 and/or to the server 404. The dongle 415 has given the journey a journey number and passes the journey number to the mobile communication device 418. The mobile communication device 418 forwards the journey number together with its identification code to the server 404. The server 404 associates the journey of the vehicle 400 to a driver which is present in a driver data base where a plurality of drivers data are stored together with identification codes of the mobile communication devices of the drivers, so that each driver is associated to one or more identification codes of a mobile communication device. By means of the identification codes transmitted from the mobile communication device 418 to the server 404 and the journey number the journey is associated to the driver by the server 404.

The vehicle 400 further comprises mechanical units 420a-d. The mechanical unit 420a is a mirror system comprising at least two mirrors inside and outside the vehicle 400. The mechanical unit 420b is a driver seat with a setting for adjusting the seat position. The mechanical unit 420c is the throttle pedal and the unit 420d the brake pedal.

The on-board system 416 is able to adjust the operation of a vehicle system 419 to individual driver behavior. The vehicle system 419 is a brake assistant, for example. For this, the on-board device 413 monitors the interaction of the driver with one or more of the mechanical units 420 and stores driver data derived from this monitoring. The driver data originates from a plurality of journeys. If now, a new journey is started the on-board system 416 identifies the driver by the mobile device identification code. Then it looks up driver data determined in the past and associated to the current driver. Using these data the on-board system 416 adjusts the operation of a vehicle system 419, like the brake assistant, for example in a way that a braking process support is automatically started at a closer distance to an obstacle for a driver who is used to stop closer to obstacles than for a driver who is used to stop further away from obstacles.

In a further embodiment the vehicle system 419 is a start-stop system which automatically shuts down and restarts the internal combustion engine to reduce the amount of time the engine spends idling, thereby reducing fuel consumption and emissions. To adapt the start-stop-process of the system to the personal habits of the current driver, the on-board system 416 identifies the driver, e.g. by the mobile communication unit identification code, and adapts the start-stop process to the driving of this driver.

If the mobile communication unit identification code is ambiguous, because no or more than one mobile communication unit 418 of more than one drivers is present in the vehicle, for example, the current driver still can be identified by means of his driving behavior. To identify the present driver the vehicle on-board system 416 monitors driving behavior of the present driver. The vehicle on-board system 416, as well as being integral to the vehicle motor mileage enhancement and emission control, can also be extended to manage other vehicle systems such as driver side air bag settings optimized by the specific driver as well as using driver identity—like over the parameter of driver's physical propositions and weight—to customize facets of vehicle ergonomics and vehicle insurance programs such as Usage Based Insurance and Vehicle Warranty policies.

The vehicle 400 of FOG 8 can be identical with vehicle 10 of FIG. 1. It contains the vehicle on-board system 2 which can be identical with the vehicle on-board system 416, and the remote and stationary server 4 which can be the server 404 in a building 6. The on-board system 2/416 contains an on-board diagnose device 8 fixed to the vehicle 400 which can be the on-board diagnose device 413, and is connected to the dongle 12/415 as additional hardware unit plugged into the interface 414 of the on-board diagnose device 413. Dongle 12/415 and on-board diagnose device 8/413 are in a wired communication contact with one another. Further, the on-board system 2/416 contains the mobile device 10/418, which is a portable computer, in this embodiment a smart phone. Additionally or alternatively the communication can be executed via the dongle 415 with direct wireless communication with the server 4/404.

The mobile device 10/418 contains at least a processor 16, a memory 18, a location unit 20, like a GPS unit, a communication means 22 to communicate with the hardware unit 8/413, like a Bluetooth or WiFi or GSM unit, a remote communication means 24 to communicate with the stationary server 4/404, and an energy source, like a battery 26.

The dongle 415 contains a backup energy source, like a battery 28, a communication unit 30 to communicate with the on-board diagnose device 8/413, a processor 32 with attached memory 34, and a communication means 36 to communicate with the mobile device 14/418, like a Bluetooth or WiFi or GSM unit.

The on-board diagnose device 413 contains a sensor 38 for detecting an interaction of the driver with one or more of the mechanical units 420. In one example, the sensor 38 measures the positions of the throttle pedal 420*c* regularly a plurality of times per second, like every 100 ms.

The mobile communication device 14/418 further contains a software application 40 for receiving from the dongle 12/415 a journey number together with a measurement result of the current journey derived from parameter values of the mechanical unit 420. These data—eventually together with the mobile device identification code—are transmitted via Bluetooth to the mobile device 14/418 and from there to the server 4/404 for driver identification. Alternatively the driver identification is performed by the on-board system 2/416 of the vehicle 10/400. In the following the unit which identifies the driver is called vehicle driver identification unit, which may be the on-board system 2/416, the server 4/404 or both together.

Figure 13:
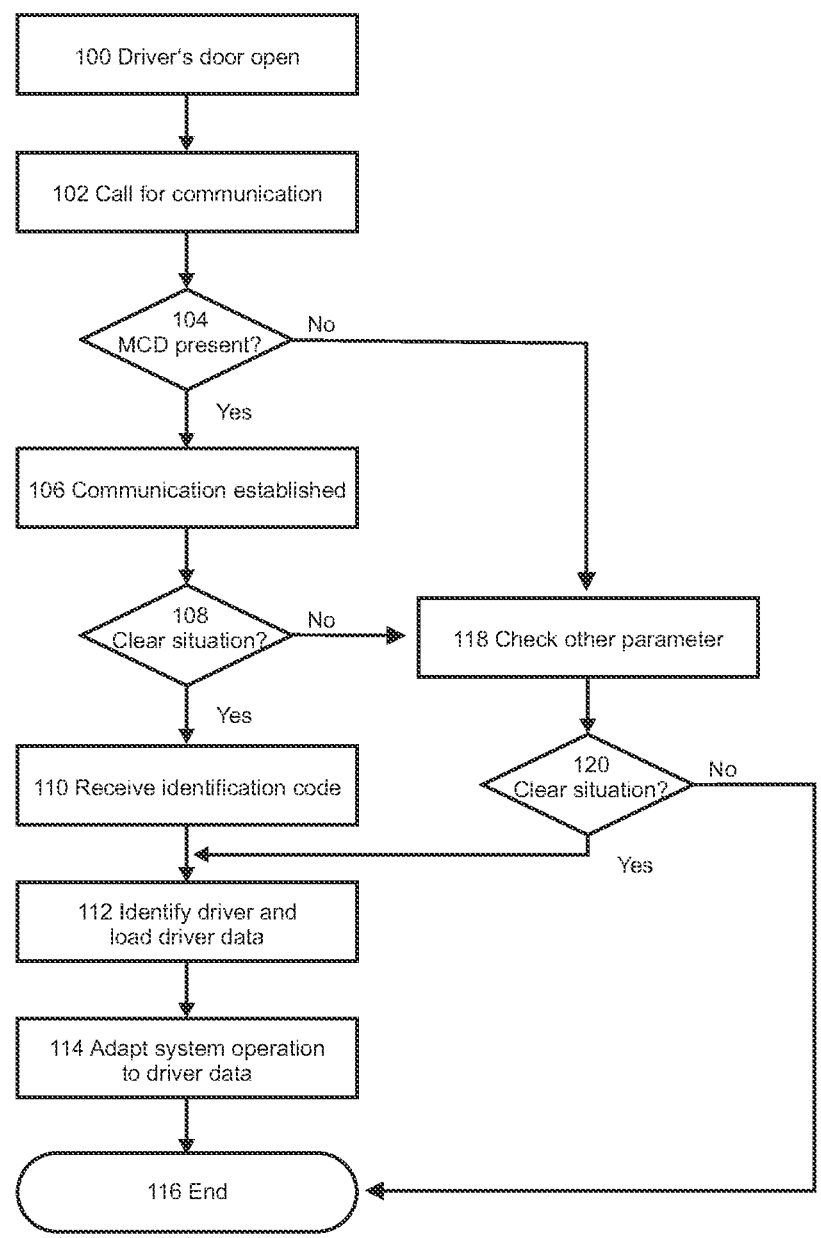
FIG. 13 shows a flow chart of a first method for associating a journey of a vehicle to a driver who drives the vehicle.

A driver identification, or assignment of a vehicle journey to a driver, is described with regard to the flow diagram of FIG. 13.

The method starts in step 600 when the motor is turned on and/or the vehicle starts to move, detected by a motion detector or the odometer registering movement. Further parameters can be taken into account, like the driver's door being opened and then closed again during a predefined time interval before the start of the motor or movement, or a period of rest of the vehicle over a predetermined time span. This triggers the dongle 415 in step 602 to call for communication with a mobile communication device 418 of the driver. In case a mobile communication device 418 answers the communication between the dongle 415 and the mobile communication device 418 is established in step 606. In step 608 it is checked if the situation is clear, i.e. if one and only one mobile communication device 418 is present or has answered to the call.

In clear situations the mobile communication device 418 sends its identifier to the dongle 415 which receives it in step 610. The dongle 415 or another unit of the vehicle on-board system 416 identifies the driver by means of the mobile communication device identifier in step 612. This can be relevant for UBI purposes it a driving characteristics of the driver is evaluated to adapt an insurance rate to it. Another useful application is the determination of wear of vehicle components if the driver of a plurality of journeys is known as well as his driving behavior. Even more useful might be an adaption of a system of the vehicle, as described in the following.

To perform a system adaption the vehicle on-board system 416 loads driver data from a memory. In step 614 a vehicle system 419 is adapted to the driver, i.e. to driver data which was derive from past journeys driven by this specific driver. The adaption method then ends in step 616 after the respective adaption or at the end of the journey.

In case that in step 604 no mobile communication device is present or turned on (direction "No" in step 104) the vehicle on-board system 416 monitors an interaction of the driver with a mechanical unit 420 in step 618. If, for example, due to clear mirror movement and/or position the driver can be unambiguously recognized, which is checked in step 620, the driver is identified by means of characteristics of this mechanical unit 420 and the method jumps to step 612. In case the situation in step 620 is not clear the method ends in step 616. As an alternative the method could jump to step 712*c* of FIG. 14 which is described later.

Figure 14:
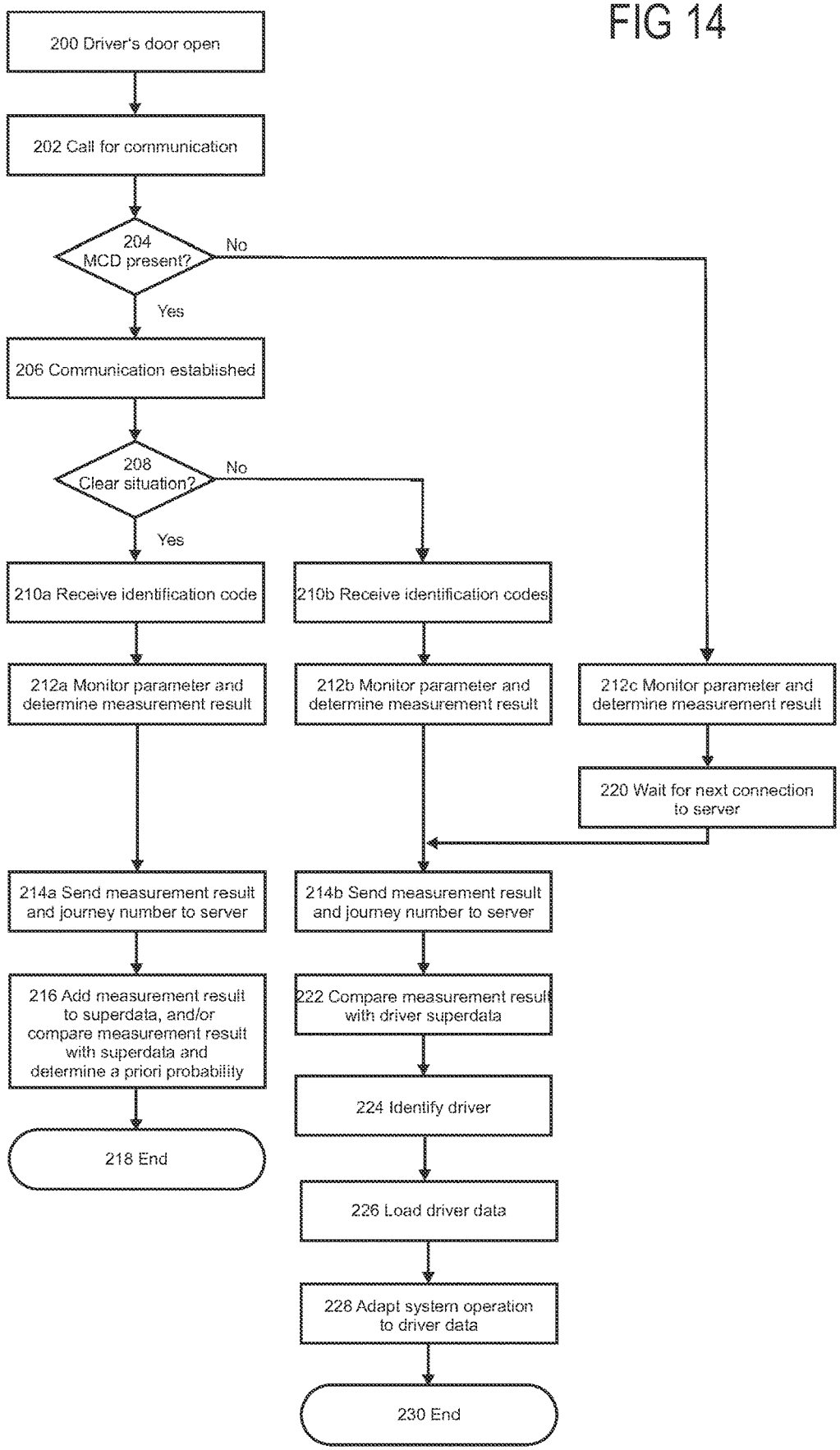
FIG. 14 shows a flow chart of a second method for associating a journey of a vehicle to a driver who drives the vehicle.

In general: The vehicle driver identification unit, which comprises the vehicle on-board system 416 and the server 404, is prepared to identify a driver by two independent methods. For this it comprises machine readable instructions that when executed, will cause the unit to perform one or both of the methods. When performing the first method the unit monitors an identification parameter which is the identification code of the mobile communication device 418, or personal unit identifier. An example of this method is depicted in FIG. 13. When performing the second method, for which an example is depicted in FIG. 14, the unit monitors driving behavior and determines a driving identification parameter from that which might be the throttle pedal position. The monitoring of the driving identification parameter outputs driving parameter values.

With regard to the first method, when a driver starts the vehicle with his smart phone turned on, the vehicle driver identification unit, especially the dongle 415, recognizes the smart phone's identifier, like the telephone number or any other identifier. In case the driver is the only person in the vehicle the driver can undoubtedly be identified from his smart phone identifier as driver $D_d$, wherein d is any positive integer.

Here it is assumed that the driver is known already. If, on the other hand, no driver has been identified before, the unit starts to set up a new Driver set $D_i$. Each time a further unknown driver drives the vehicle and is a priori identifiable by his personal unit, like smartphone, the unit sets up a new Driver set $D_i$.

In case the number of potential drivers is clear a priori, like if an insured vehicle has three registered drivers $D_1$, $D_2$ and $D_3$ for which the driving has to be monitored to identify the current driver, the identification unit contains three data sets with the identifier of each registered personal unit of each driver $D_d$. This, of course, does not preclude detection of driver(s) $D_7$ which are not one of the vehicle's insured drivers.

With regard to vehicle system adaption, in the following an adaption of a start-stop system of the vehicle is described. Once the driver is identified the start-stop system adjusts the start-stop proceeding of the vehicle to the driver's start-stop data contained in the driver's data set. The start-stop data of each registered or previously identified driver have been collected during previous driving sessions of previous clear journeys, i.e. those journeys where the driver was unambiguously identified from the first method by means of the personal unit identifier.

In one embodiment of the invention the start-stop system stops the idling of the engine if the vehicle has come to a full stop and if the brake pedal is pressed to a predefined point. If now, for example, a driver is used to press down the brake pedal during full stop of the vehicle only smoothly, so that the predefined point is not reached, the start-stop system will not stop the idling of the engine independently of how long the vehicle completely rests without moving. Since this is an inefficient and fuel consuming operation of the vehicle, the start-stop system analyzes how far the brake pedal is usually pressed down during longer stops of the vehicle. For each driver the system derives such a personal "traffic light position" of the brake pedal, which is, for example, the median brake pedal position during full stops longer than a predefined period of time, like 20 seconds, for example. Now the stop position of the brake pedal at which the idling of the engine is stopped during full stops is set higher than his traffic light or median position, so that the engine stops if the brake is pressed down to the median position.

If, on the other hand, a driver is used to press the brake down vigorously even for short stops, the start-stop system will shut down the engine for short moments before the engine has to start again. This is inefficient as well. Accordingly, the system derives a lower median position for this driver, and the stop position of the brake pedal at which the idling of the engine is stopped during full stops is set lower than for the previous driver.

For adjusting the traffic light position or median position of the brake pedal a sensor is present to record the pedal positions continuously or regularly. Such data can be used for deriving the driver identification parameter as well, or in other words: For identifying the driver by means of the second method the driver identification parameter is derived from positions of a pedal of the vehicle, like the brake pedal and/or the throttle pedal.

To quantify the pedal position the stretch of way of the pedal from completely contact-free position to full depression is partitioned into a predefined number of positions, like 256 positions, where, for instance, 0 represents 0% pedal depression and 255 represents 100% pedal depression, like brake pedal or throttle depression.

Now, turning to the second method, which is depicted in FIG. 14, the vehicle driver identification unit monitors driving behavior of the current driving, and derives a driving identification parameter from this monitoring. The monitoring period may extend over one complete journey, i.e. the unit monitors the driving during the journey and extracts from this driving the driving identification parameter. A journey in this context may be the time period from the closing of a driver's vehicle door to the re-opening of this door, especially with the motor off, since if the driver's door is open a change between drivers may occur.

Accordingly, the method starts in step 700 when the driver's door is opened and then closed again. This triggers the dongle 415 in step 702 to call for communication with a mobile communication device 418 of the driver. In case step 704 is positive and a mobile communication device 418 is present, communication between the dongle 415 and the mobile communication device 418 is established in step 706.

In clear situations where one and only one mobile communication device 418 answers the call, which is checked in step 708, a driver can directly be identified in step 710*a*, or in other words: a journey can directly be associated to the driver to which the detected mobile communication device 418 belongs. Up to this point the second method is identical to the first method.

The difference between both methods is a monitoring of the interaction of the driver with a mechanical unit 420, like the throttle pedal of the vehicle 400. While the first method relies on the mobile device identifier for driver identification, the second method takes the monitoring of the interaction as basis for the driver interaction. Of course, in the first method the driver interaction can be measured as well, and used for determining the reliability of the driver identification by means of the interaction, for example.

The vehicle on-board system 416 monitors the interaction parameter in step 712*a* and derives a measurement result from the parameter values gathered during the monitoring. Then in step 714*a* the dongle 415 sends the measurement result via the mobile communication device 418 to the server 404 for further evaluation, or the vehicle on-board system 416 sends the measurement result directly to the server 404, respectively.

In such cases of a clear situation the vehicle driver identification unit, in this special case the server 404, assigns the driving identification parameter to the data set of the respective driver which was identified from his personal unit identifier. The data set was derived from a plurality of journeys where the respective driver was driving, thus the data are called superdata of the driver in the following.

The data set or superdata can then be enhanced by the new data or measurement result of the current journey in step 716. Further, the reliability of the superdata or the statistical testing using the superdata can be determined, as is explained later. Then the method ends in step 718.

In case that in step 704 no mobile communication device is present or turned on (direction "No" in step 704) the vehicle on-board system 416 monitors the interaction parameter in step 712*c* and derives a measurement result from the parameter values gathered during the monitoring. Then the dongle 415 waits in step 720 for the next connection to a mobile communication device 418, or alternatively the vehicle on-board system 416 establishes a long distance communication with the server 404.

If, in step 708 more than one mobile communication unit 418 has answered the call more than one identification codes are received by the dongle 415 in step 710*b*. Thus the situation is unclear. But here again the vehicle on-board system 416 monitors the interaction parameter in step 712*b* and derives a measurement result from the parameter values gathered during the monitoring. The measurement result is sent to the server 404, but either without a mobile device identifier if the method comes from step 720, or with a plurality of mobile device identifiers if the method comes from step 712*b*.

Now the identification unit, in this special embodiment the server 404, in step 722 compares the current driving identification parameter with the data sets or superdata of some or all drivers $D_d$ for which a driver's data set is present. From this comparison the server 404 identifies the current driver in step 724. Alternatively, this comparison and identification can be performed by the vehicle on-board system 416.

Now, since the current driver is identified, the vehicle system 419 can be adapted to driver's driving behavior, as described with regard to the first method. If the driver identification was done by the server 404, the server 404 sends the driver identification to the vehicle on-board system 416. Then driver data are loaded in step 726 and the vehicle system 419 is adapted in step 728, and the method ends accordingly in step 730.

In general, a short description of the steps performed by the methods shown in FIG. 13 and FIG. 14 is given in the following:

600 Driver's door open
602 Call for communication
604 MCD present?
606 Communication established
608 Clear situation?
610 Receive identification code
612 Identify driver and load driver data
614 Adapt system operation to driver data
616 End
618 Check other parameter
620 Clear situation?
700 Driver's door open
702 Call for communication
704 MCD present?
706 Communication established
708 Clear situation?

710*a* Receive identification code
710*b* Receive identification codes
712*a* Monitor parameter and determine measurement result
712*b* Monitor parameter and determine measurement result
712*c* Monitor parameter and determine measurement result
714*a* Send measurement result and journey number to server
714*b* Send measurement result and journey number to server
716 Add measurement result to superdata
718 End
720 Wait for next connection to server
722 Compare measurement result with driver superdata
724 Identify driver
726 Load driver data
728 Adapt system operation to driver data
730 End To reliably identify the current driver it is preferred to determine the driver identification parameter only a predefined speed range of the vehicles driving speed is used. An advantageous speed range is such a speed range where a braking or accelerating of the vehicle is done mostly independently from the current traffic situation. This is the case in the low speed range from 0 mph to less than 25 mph, especially to 15 mph. While the severity of a braking process at high speeds mostly depends on the current traffic situation and does not properly reflect driving habits of a driver, bringing the vehicle to a full stop, like in front of a traffic light, is a more individual process which better reflects driving habits of a driver, and is, thus, more suitable for driver identification. Accordingly, if the driver identification parameter is determined from the brake pedal positions and/or throttle pedal positions the speed range under observation is set, exemplary in the following embodiment, from 15 mph to 0 mph, or from 0 mph to 15 mph, respectively.

Instead or additionally to a pedal position, other or further parameters can be used as well for driver identification, of course, like a throttle fuel dispenser which is calculated by the OBD regularly, or accelerations of the vehicle which can be determined by an acceleration sensor whose g force readings might by monitored by the OBD, a dongle, or even a personal mobile device in the vehicle, like the smart phone of the driver lying somewhere in the vehicle, or directly measured by an accelerometer in a device attached but not necessarily plugged into the vehicle which communicates it data via wireless means, or dongle via short range communication protocol, like WiFi or Bluetooth. Other suitable parameters are the seat position of the driver's seat, an infotainment parameter, like a radio station or composer a driver is listening to, and/or mirror orientation of a mirror of the vehicle. Preferably, such further parameter(s) is not used alone for driver identification, but only used supplemental to pedal positions to enhance the identification gained from the pedal positions.

Generally, instead of driver's interaction with a mechanical unit 420, readings of a driving parameter, like the accelerometer 38 embedded in the vehicle on-board system 416, the dongle 415 or mobile communication device 418 or a special standalone dongle device may be taken as parameter for associating a measurement/reading result to the Driver.

In cases the on-board device 413 is not available for the dongle 415, like on a motorcycle with no open interface 6, the dongle itself can be seen vehicle on-board system which monitors the interaction parameter. The monitored parameter could be the acceleration of the vehicle 400 as such which is measured with an acceleration sensor of the dongle 415. Of course, the acceleration is not a straight forward interaction of the driver with a mechanical unit of the vehicle, but still it results directly from the mechanical interaction of the driver with the mechanical throttle unit, like in the handle of a motorcycle. Thus, such monitoring is seen as monitoring of an interaction of the driver with a mechanical unit of the vehicle as well. The identification of the driver may result from the analysis of resulting acceleration data as measured either from an accelerometer or GPS based means or direct acquisition of speedometer readings.

In general, many parameters can be used either alone or in combination to identify the driver. For better understanding but not limiting the description, in the following example the driver identification is done by using the throttle pedal positions. Accordingly, the throttle pedal can be read as general parameter, and instead the throttle pedal the description can be read to any other parameter.

Figure 15:
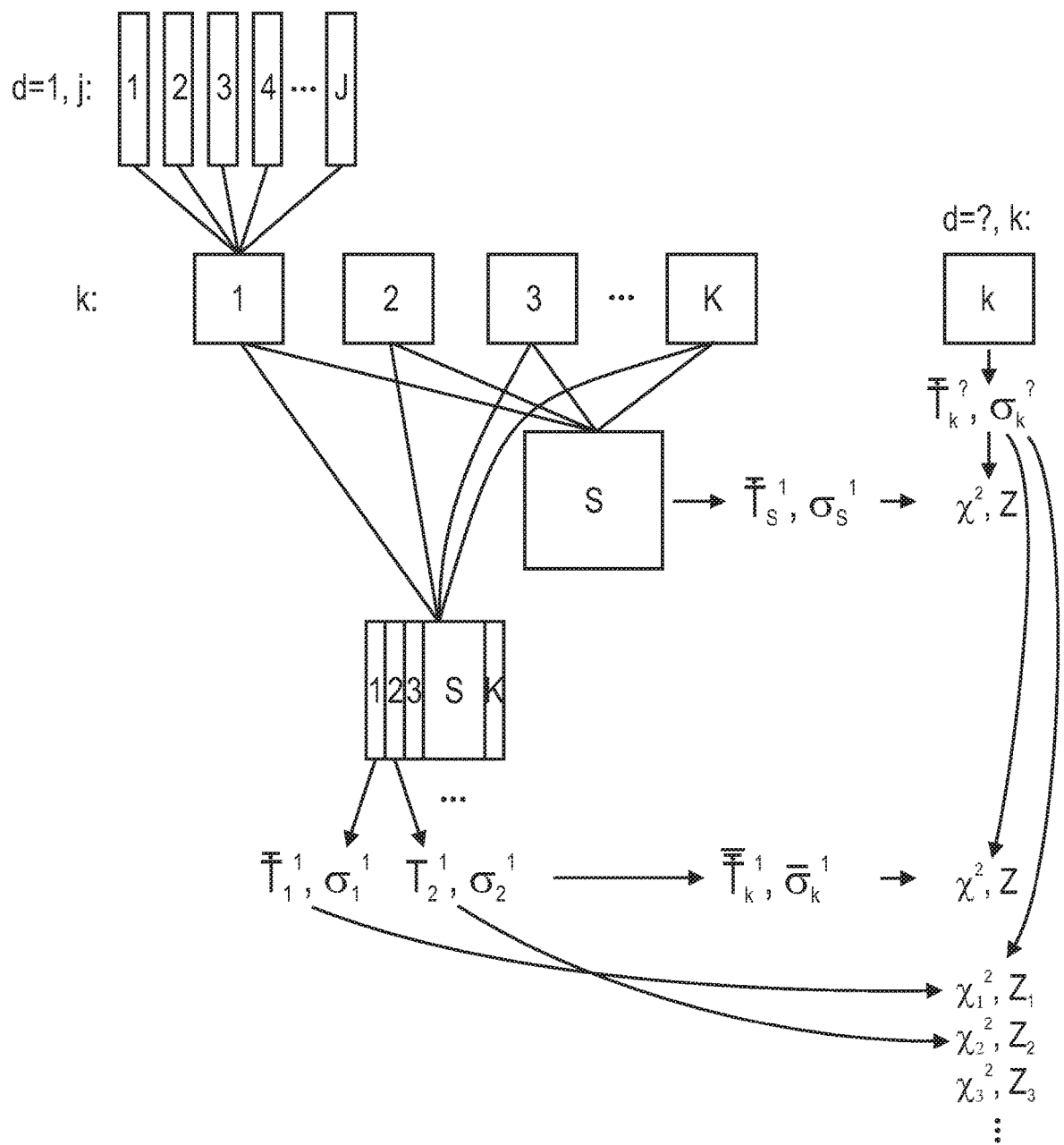
FIG. 15 shows a scheme of calculation details of the second method.

FIG. 15 shows a scheme of a method to identify the current driver. During each braking or acceleration process within the speed range under observation, in the following called "event", the parameter, like the pedal position, is determined continuously or regularly, like every 100 ms. The parameter is then determined as a continuous function or as a list of parameter values. In the following the parameter is determined regularly, and a list of parameter values is determined.

From this the first derivative in time is generated which, with a parameter list, is the difference of neighboring values in the list. This derivative list is generated for each event. Such list is given exemplarily in the following:

| i | $T^d_{ij}$ | $\dot{T}^d_{ij}$ |
|---|---|---|
| 1 | 3 | 3 |
| 2 | 7 | 4 |
| 3 | 12 | 5 |
| 4 | 21 | 9 |
| 5 | 35 | 14 |
| 6 | 48 | 23 |
| 7 | 59 | 11 |
| 8 | 65 | 6 |
| 9 | 66 | 1 |
| 10 | 63 | −3 |
| 11 | 62 | −1 |
| ... | | |
| 51 | 130 | −4 |
| 52 | 121 | −9 |
| 53 | 104 | −17 |
| ... | | |

Here i is a counter or the time starting at the starting point of the event, like the first movement of the vehicle from 0 mph upwards, and ending at the end of the event, if the vehicle reaches the border speed, like 15 mph. $T^d_{ij}$ is the throttle setting in steps from 0 to 255, and $\dot{T}^d_{ij}$ is the first derivative in time of the throttle setting, which is the difference of the regularly determined values $T^d_{ij}$. d is the index of the driver. In clear situations the driver is known beforehand and the index can be set, like $T^1_{ij}$ for the first driver. j is the event-index of the journey, so for the fifth event in a journey the nomination is $T^1_{i5}$ for the first driver.

A plurality of such lists is assembled into a journey table, like for the principle driver #1:

| i | $\dot{T}^1_{i1}$ | $\dot{T}^1_{i2} \ldots \dot{T}^1_{iJ}$ |
|---|---|---|
| 1 | 3 | 9 |
| 2 | 4 | 19 |
| 3 | 5 | 21 |
| 4 | 9 | 16 |
| 5 | 14 | 10 |
| 6 | 23 | 11 |
| 7 | 11 | 11 |
| 8 | 6 | 7 |
| 9 | 1 | −2 |
| 10 | −3 | −14 |
| 11 | −1 | −15 |
| … | | |
| 51 | −4 | — |
| 52 | −9 | — |
| 53 | −17 | — |
| … | | |
| $I_j$ | | |

Here $I_j$ is the total number of throttle measurements in event j, and J is the number of events within a journey. A scheme of such journey table is depicted on top of FIG. 15. The driver is set to d=1, in this case the driver is clear beforehand, like from the mobile phone identifier, and the journey contains J events.

The number $I_i$ of throttle measurements per event varies from event to event, since a slow acceleration results in more throttle measurements until 15 mph are reached than a fast acceleration. This can be seen from the above table. The first acceleration event j=1 is a long event with a slow start of the vehicle. The throttle values T increase slowly resulting in low derivative values T. The event j=1 is a long event accordingly, lasting longer than 5 seconds, resulting in the values with i>50. The second acceleration event j=2 is a shorter event. The derivative values T are higher, thus the acceleration is stronger, resulting in a stronger acceleration of the vehicle and faster ending of the event when the vehicle reaches 15 mph. Accordingly, the number n of the values T is below 50, which is shown at the bottom of the above table by "–", indicating that no value is present for i>50.

Each journey results in a matrix with many columns of different length. The matrices have different numbers J of columns depending of the numbers of acceleration events within each journey. These matrices are shown schematically in FIG. 15. There are K matrices present since the driver #1 has driven K journeys where he was clearly identified as current driver.

In clear situations where the driver $D_d$ is known a priori the matrices assigned to one driver $D_d$ can be added into a supermatrix S by adding each column of each matrix into the supermatrix S. Two kinds of supermatrices S are shown in FIG. 15. They are composed from the journey matrices k=1, 2, . . . , K, as shown by the lines from the matrices to the supermatrices S in FIG. 15.

If the driver $D_d$ has driven K journeys, and each journey contains $J_k$ events the supermatrix then contains M columns or events wherein $$M = \sum_{k=1}^{K} J_k.$$

To prevent that rather old driving data influence the driver identification the supermatrix can be limited to a predefined number of previous events, like the last 1,000 events, so that new events are added to the supermatrix and old events are deleted from it. In the following this predefined number, like 1000, is named with "all journeys M" as well, for easier understanding and more general description.

In unclear situations the matrix of one journey stands alone. This is depicted in FIG. 15 by the matrix k where the driver d=? is unknown.

To get a valuable decision basis for identifying the driver in unclear situations the mean and variance of the values T of the supermatrix are calculated:

$$\bar{T}^d_S = \frac{\sum_{i=1,j=1}^{i=I,j=M} \dot{T}^d_{ij}}{N};$$

$$\sigma^d_S = \sqrt{\frac{\sum_{i=1,j=1}^{j=I,j=M} (\dot{T}^d_{ij} - \bar{T}^d_S)^2}{N}}$$

Here $\dot{T}^d_{ij}$ is the time derivative of the throttle value # i of event j of driver d. In the supermatrix j runs from 1 to M since all events of all journeys are added up. $\bar{T}^d_S$ is the mean throttle derivative value of the supermatrix, i.e. of all journeys of driver d, and is called supermean of the throttle derivative values in the following. $\sigma^d_S$ is the variance of all throttle derivative values of the supermatrix of driver d, and is called supervariance in the following. N is the total number of derivative values $\dot{T}^d_{ij}$ of the supermatrix.

For each driver a supermatrix and its supermean and supervariance are generated which are assigned to this driver and result from the driving of this driver. In FIG. 15 the supermean $\bar{T}^1_S$ and supervariance $\sigma^1_S$ are depicted for driver #1.

In unclear situations where the driver is not known a priori the mean and the variance of the throttle values of one single journey are calculated from the matrix of the journey of the unknown driver, as depicted in FIG. 15, to $$\bar{T}^?_k = \frac{\sum_{i=1,j=1}^{i=I,j=J} \dot{T}^?_{ij}}{N_k};$$

$$\sigma^?_k = \sqrt{\frac{\sum_{i=1,j=1}^{j=I,j=J} (\dot{T}^?_{ij} - \bar{T}^?_k)^2}{N_k - 1}}$$

Here $\bar{T}^?_k$ is the mean throttle derivative value of the matrix of the respective journey k, wherein the "?" indicates that the driver is not known yet. $\sigma^?_k$ is the sample variance, and $N_k$ is the total number of derivative values $\dot{T}^?_{ij}$ of the matrix of this journey.

To identify the current driver in an unclear situation the sample mean $\bar{T}^?_k$ and sample variance $\sigma^?_k$ of the current driver need to be assigned to data of one or all known drivers to identify the current driver by means of these step(s). A first possibility is to compare driving data of the unknown driver with the supermean $\bar{T}^d_S$ and supervariance $\sigma^d_S$ of one or each of the known drivers d, where the mean and variance are derived from the supermatrix S.

Another possibility is to derive for each driver d another supermean of derivative values, like the throttle derivative values, and another supervariance. For this one determines the journey-mean $\overline{T}_k^d$ and journey-variance $\sigma_k^d$ for each journey k, or a predefined number of past journeys k. This is schematically shown in the lower supermatrix S in FIG. 15. Then the mean $\overline{\overline{T}}_k^d$ of all journey-means $\overline{T}_k^d$ and the mean $\overline{\sigma}_k^d$ of all journey-variances $\sigma_k^d$ are derived, as shown by the horizontal arrow in FIG. 15 exemplarily for d=1, i.e. driver #1. For simplicity, the mean $\overline{\overline{T}}_k^d$ of all journey-means $\overline{T}_k^d$ and the mean $\hat{\sigma}_j^d$ of all journey-variances are called supermean $\overline{\overline{T}}_k^d$ of the throttle derivative values and supervariance $\overline{\sigma}_k^d$ as well.

The assignment of current driver data to superdata, like supermean and/or supervariance of one or all known drivers can be done by a multiple step method. The first comprises statistical analysis based on classical normal statistics. An example described here is the use of a Chi-square test. A second step comprises Null hypothesis testing and preferably Bayesian Conditional Probability inference. Both tests are schematically depicted in FIG. 15 for both supermatrices S. With regard to the second supermatrix S there is the additional possibility to compare the journey mean and journey variance with the single journey-data of the supermatrix S instead of the supermean $\overline{\overline{T}}_k^d$ and supervariance $\overline{\sigma}_k^d$ of the supermatrix, as shown on the lower right of FIG. 15.

An optional third step uses a further parameter, like the driving proportions of the known drivers, and/or one or more of the further parameters as described above. Such parameters can be used as a weighting factor, e.g. in the Bayesian Probability, called a priori probability in the following. If, for instance, the Bayesian Probability describes the probability of correctness of an accepted Null hypotheses test having identified Driver d, which probability is the Bayesian formulation of the empirically measured effectiveness of a Null Hypothesis correctly identifying driver d, this probability can be factored by a probability derived from one or more of the further parameters. Such parameter can be, for example, how often (in percentage) in fact the Driver d actually drove the vehicle in the past with respect to the percentage of the other drivers.

First, the a priori probability is determined that a Null hypothesis test is accepted correctly for driver d. This probability is derived for each registered driver, or not registered driver if identified as such. Then the a priori probability is weighted. Such weighting is described later.

The Chi-square test is performed on the variances and is used to filter out the data sets of those drivers which are statistically less qualified to be the correct driver, i.e. from the total number d of known drivers some are screened out which do not satisfy the Chi-square test. Based on the number of events entering into the above analysis, the F-test may be substituted for Chi-square test. An alternative statistical test can be substituted without changing the essence of the invention.

The remaining driver's data sets are subjected to the Null hypothesis test, which is performed on the mean values. If one of the tests is positive, the result of the test being within the Null hypothesis acceptance, the correct driver is found and the sample data set can be assigned to the respective known data set, which means that the current driver is identified. If no Null hypothesis test is positive the current driver cannot be identified.

For the Null hypothesis test using mean values, it is assumed that the distribution of the throttle settings derivative values $\dot{T}^d_{ij}$ is a normal distribution. The Null hypothesis is the assumption that the current data of the unknown driver $D_?$ fit to the data set of a known driver $D_d$ to which the data set of the unknown driver $D_?$ is compared. This Null hypothesis test is enhanced by the Chi-square test which is used to filter out those driver sets where the variances are too different to warrant further statistical testing for attribution. The Chi-square just disqualifies some drivers before the Null hypothesis is performed—like a double hurdle checking consistency of both mean and variance.

The relation of the Chi-square function to the variances a of the data sets of the known driver and the unknown driver follows the formula:

$$\chi^2 = \frac{(N_k - 1)\sigma_k^2}{\sigma_s^d},$$

where $\chi^2$ is the Chi-square function. While usually the "population" value is demoted by the Greek letter 6, the upper variance, being the sample variance, is in literature sometimes denoted by the Latin letter s. If both variances originate from samples than the test statistic is the F test. However, here the number of present parameter values is large, so that the Chi-square test with the population value fits better.

With regard to the variances a the Chi-square test is a two-sided test where the hypothesis $H_0$ is that the variance $\sigma_k^2$ of the unknown driver during journey k is equal to the variance $\sigma_s^d$ of the known driver d during past journeys as laid down in the supermatrix s. Hence, $H_0$: $\sigma_k^2 = \sigma_s^d$, $H_1$: $\sigma_k^2 \neq \sigma_s^d$. If the variance $\sigma_k^2$ of the unknown driver is either too small or too large the hypothesis is rejected. Or in other words: $H_0$ is rejected if $\chi^2 < \chi^2_{(1-\alpha/2)}$ or $\chi^2 > \chi^2_{(1-\alpha/2)}$.

The boundary value which defines the rejections of variances $\sigma_k^2$ of the unknown driver is given by $\alpha$ which is the significance value, sometimes referred to as p value giving the probability how remote it is that—in case the Null hypothesis is correct—any deviation from expected results is due to chance only.

To give an easy numeric example, it is assumed that $N_k$=101 throttle derivative values are present in the matrix of the journey of the unknown driver, and thus the variance $\sigma_k^2$ is calculated from 101 values. Further, the following values for the supermeans $\overline{T}_s^d$ and supervariances $\sigma_s^d$ are assumed:

| | | |
|---|---|---|
| $D_1$: | $\overline{T}_s^1$ = 9.7 | $\sigma_s^1$ = 8.5 |
| $D_2$: | $\overline{T}_s^2$ = 12 | $\sigma_s^2$ = 10 |
| $D_3$: | $\overline{T}_s^3$ = 8 | $\sigma_s^3$ = 13.5 |
| $D_?$: | $\overline{T}_k^?$ = 11.2 | $\sigma_k^?$ = 9.1 |

According to the above Chi-square function, $X_{?1}^2$ for the unknown driver compared to driver 1 is:

$$\chi^2_{?1} = \frac{(101-1) \times 9.1}{8.5} = 107.06,$$

and accordingly:
$X_{?1}^2$=107.06
$X_{?2}^2$=91
$X_{?3}^2$=67.41.
Now the statistical $\alpha$ is set:
$\alpha$=0.995  $\alpha$=0.99  $\alpha$=0.975  $\alpha$=0.95  $\alpha$=0.05  $\alpha$=0.025
$\alpha$=0.01  $\alpha$=0.005
$\chi^2$=67.33  $\chi^2$=70.07  $\chi^2$=74.22  $\chi^2$=77.93  $\chi^2$=124.3
$\chi^2$=129.6  $\chi^2$=135.8  $\chi^2$=140.2

The respective $\chi^2$-values can be looked up in a common $\chi^2$-table wherein the $\chi^2$-values are listed depending on the a and the degree of freedom which in this case corresponds to the number of throttle derivative values are present in the matrix of the journey of the unknown driver, or in general: number of the sample measurements.

It can be seen that $\chi_{?1}^2$ and $\chi_{?2}^2$ are both well within all boundaries. However, $\chi_{?3}^2$ is close to $\alpha=0.995$. If $\alpha$ is set to 0.995, meaning that—on both sides—only 0.5% of $\chi^2$-values are discarded due to its statistical fluctuations, then $\chi_{?3}^2$ is barely within this boundary. If, on the other hand, a is set so that 1% of $\chi^2$-values are discarded on both sides of the $\chi^2$-function, then $\chi_{?3}^2$ is discarded because it is below 70.07. In general, 10% are marginal significant, 5% are significant, and 1% are highly significant. If we take the significant 5% value, then the boundaries will be $\alpha=0.975$ and $\alpha=0.025$, thus the $\chi^2$-values should not drop below 74.22 and rise above 129.6. Since $\chi_{?3}^2=67.41$, $H_{03}$ is rejected since $\chi_{?2}^2 < \chi^2_{(1-\alpha/2)}$.

Now the Null hypothesis is tested for the remaining drivers 1 and 2. The Null hypothesis in this case is the hypothesis, that the throttle derivative mean value of the current driver equals the throttle derivative mean value of the first driver. In other words: $H_0: \overline{T}_k^? = \overline{T}_S^1$, $H_1: \overline{T}_k^? \neq \overline{T}_S^1$.

Since on random samples statistical errors are inevitable, the probability of such error has to be determined, and all values beyond boundaries will be discarded. The Null hypothesis for normal distribution follows the formula $$Z_{?d} = \frac{\left(\overline{T}_k^? - \overline{T}_s^d\right)}{\sigma_S^d / \sqrt{N_k}}$$

In this formula $\overline{T}_k^? - \overline{T}_s^d$ is the statistical error which may occur if a sample with many values, in this case the throttle derivative values of the current driver, is taken from a larger data pool, in this case the throttle derivative values of the supermatrix. This statistical error should remain within statistical boundaries, if—and this is the Null hypothesis—the sample is taken from the data pool. Of course, here the sample is not taken from the data pool, since the throttle derivative values of the current driver is generated newly while the data pool contains old data. But, if the current driver behaves as he usually does—while accelerating his car without disturbances from other traffic participants, the speed interval is thus limited to a predetermined speed—the current sample values should be—statistically—identical with the data of the data pool.

If that is so, then the boundaries, i.e. the significance value $\alpha$ or probability value p, correctly distinguish correct data, which belong to the data pool, from incorrect data, which might come from a different driver. Here the boundaries are set rigorous: $\alpha=0.1$, so $p=90\%$, i.e. 10% of the otherwise correctly identified drivers will be discarded only due to statistical fluctuations of the sample under observation.

With the following example values $D_1: \overline{T}_s^1=9.7 \; \sigma_s^1=8.5$ $D_2: \overline{T}_s^2=12 \; \sigma_s^2=10$ $D_3: \overline{T}_s^3=8 \; \sigma_s^3=13.5$ $D_?: \overline{T}_k^?=11.2 \; N_k=101$ the following results are determined:

$Z_{?1}=1.77; \; p_{?1}=0.077$ $Z_{?2}=-0.80; \; p_{?2}=0.424$, wherein the p-values relate to the conditional probabilities that the current driver is driver 1 or driver 2, respectively.

Since the Null hypothesis states, that the throttle derivative mean value of the current driver equals the throttle derivative mean value of the first or second driver, the Z value should be low, and high positive and high negative values are conditions against the hypothesis. Thus, the p-values reflect probabilities for the correctness of the hypothesis. The p-value are a measure or the "strength" of the current, test for the ambiguous driver. If the boundaries are set at $Z=1$, all samples lying outside $1\times\sigma$ standard deviation are discarded, and thus only 68.3% of the correct values are omitted for positive hypothesis confirmation. As mentioned above, the boundaries are set to 90% and thus to $Z=1.645$. Since $Z_{?1}=1.77$ is outside the positive boundary, the Null hypothesis for driver 1 is rejected. It could only be accepted if the boundaries would be lower than $p_{?1}=0.077=7.7\%$. Accordingly, driver 2 is identified as the person driving the vehicle at the current journey.

It could be that the $\chi^2$-test and the Null hypothesis leave the correct driver open since more than one driver passes both test successfully. In this case—or in any case—a third step can use the probability of correct driver identification.

In a third testing step the p-values can be taken as definite probability values for identifying the correct driver, thus not only for accepting or rejecting the Null hypothesis according to the set boundaries, but for quantitative ranking of the drivers to find the best match.

However, instead of the p-value another value can be taken for quantitative analysis. This value is called P-value in the following and gives the statistical correctness that an accepted Null hypothesis test really determines the correct driver. For this, during a clear situation where the driver's identification unit is present, like his smart phone, the two above tests are performed as well, although the driver is identified a priori by his unit. Actually, this is the first method and second method combined, where the driver is identified by the first method by means of the mobile unit identifier, and the second method where the driver is identified by means of monitoring driver's interaction with the mechanical unit 420. Both results are compared, wherein the result coming from the mobile unit identifier is taken as stronger result, thus it serves as reference result, always seen as correct result.

If, for a plurality of clear journeys this comparison is performed, then one gets the ratio of correct second method driver identification (statistical driver identification) versus incorrect second method driver identification. Thus, the ratio of correct statistical driver identification for driver d—named $P^d_{SID}$ in the following (SID: statistical identification)—is determined as number $n^d_{SID}$ of correct statistical identifications in clear situations divided by the total number $n^d_{USID}$ of identifications of the same unit in clear situations (SUID: statistical and unit identification), where both the unit identification and the statistical identification are present and compared, thus with the aid of the driver's unit:

$$p^d_{SID} = \frac{n^d_{SID}}{n^d_{SUID}}.$$

This probability $P^d_{ID}$ can be denoted in another form as, for example, $$P_{thr}(ID_d | NH_A),$$

where $P_{thr}$ denotes the probability of correct statistical identification by the throttle parameter, $ID_d$ is the correct identification of driver d, and $NH_A$ is the testing method of Null hypothesis.

This probability $P^d_{ID}$ can be taken as further identification determination parameter to quantify the above described Null hypothesis test. If the Null hypothesis test allows more than one driver to be the correct driver, the probability $P^d_{ID}$ can be taken to find one and only one driver.

However, the probability $P^d_{ID}$ can be combined with another parameter to form an even stronger tool for driver identification. Advantageous is the p-value of the Null hypothesis test and/or one or more of the parameters described in the following.

Such a further parameter can be the driving probability $P^d_D$ of the respective driver. Not all drivers drive the vehicle to the same amount. There might be a main driver driving the vehicle most of the times, and a "sometimes-driver" and a "seldom-driver", or the like. Of course, the probability that the main driver is the current driver is higher than that the "seldom-driver" is the current driver. This probability $P^d_D$ can be set to $$p^d_D = \frac{n^d_{UID}}{n^d_{UID}},$$

wherein $n^d_{UID}$ is the number of clear journeys where driver d was identified by his unit, and $n_{UID}$ is the total number of clear journeys where any driver d was identified by his unit. Again, this parameter can be combined with any other.

In the following example both parameters are combined, and the following values are assumed:
$P^1_{SID}=95\%$; $P^1_D=70\%$
$P^2_{SID}=90\%$; $P^2_D=25\%$
$P^3_{SID}=98\%$; $P^3_D=5\%$ It can be seen that driver 1 is the main driver mostly driving the car, and driver 3 is only an occasional driver or "seldom-driver", while driver 2 is in between. The probability for correctly identifying an a priori unknown driver is thus:

$$P^?_{SID} = \frac{P^d_{SID} \times P^d_D}{\sum_d (P^d_{SID} \times P^d_D)}.$$

For the three drivers the probabilities are:

$$P^{1?}_{SID} = (95\% \times 70\%)/(95\% \times 70\%) + (90\% \times 25\%) + (98\% \times 5\%) = 71\%$$

$$P^{2?}_{SID} = 24\%$$

$$P^{3?}_{SID} = 5\%$$

These probabilities can be taken a quantifiers for all drivers accepted by Null hypothesis. However, even further, the p-values derived from statistics can be used as further probability values. The p-values for all drivers are in this example:
$Z_{?1}=1.77$; $p_{?1}=0.077$,
$Z_{?2}=-0.80$; $p_{?2}=0.424$,
$Z_{?3}=2.38$; $p_{?3}=0.017$.

In a first embodiment, the p-values are taken as straight weighting probabilities. This might not be completely correct from the point of statistics, however, it could be a proper approach to find the most probable driver in this application, as it provides a weighting to understand the relative strength of the Null hypothesis just tested specific to attribution of the current driver. The driver identification probability $P_{ID}$ can be set to:

$$P_{ID}^{d?}=P_{SID}^{d?} \times p_{?d},$$

with the following results:
$P^1_{ID}=71\% \times 0.077=0.055$
$P^2_{ID}=24\% \times 0.424=0.102$
$P^3_{ID}=5\% \times 0.017=0.001$.

Here the results are even clearer, and driver 2 is still the preferred driver although he does not use the vehicle very often.

The above example shows the disadvantage that an occasional driver with a low driving rate will not be identified very often if the usage of the throttle pedal of the drivers are similar. And even if the correct occasional driver could be identified by statistics, the low vehicle usage will corrupt the correct identification. To overcome this disadvantage, the driving probability $P^d_D$ or the product $P^d_D \times P^d_{SID}$ of the driving probability $P^d_D$ and the identification probability $P^d_{SID}$ can be scaled by a factor or a power, like $$P_{ID}^{d?}=\sqrt{P_{SID}^{d?}} \times p_{?d}.$$

The validation of the correct identification by the driver's unit in clear situations bears another useful advantage. In case a correct driver is rejected by the $\chi^2$-test, which means that this driver is driving with a highly fluctuating variance of pedal pushing velocity (throttle derivative variance). Then this test should be relaxed, or given less weight, respectively, which can be done by pushing the statistical significance value $\alpha$ further towards 0 or 1, i.e. to more extreme values which are further away from the 0.5. This amendment of the statistical significance value $\alpha$ can be limited to this specific driver. Thus, the statistical significance value $\alpha$ of the $\chi^2$-test can be adapted to the driver's behavior. The value $\alpha$ can be set, for example, to such individual values that the rejection rate for all drivers of the $\chi^2$-test is identical, essentially identical, or at least more similar than without adaption.

In case the Null hypothesis test shows to be less reliable the boundaries $\alpha$ can be adapted to the driver's behavior. Here as well the value $\alpha$ can be set, for example, to such individual values that the Null hypothesis rejection rate for all drivers is identical, essentially identical, or at least more similar than without adaption.

As mentioned, the population with which the sample is compared is the supermatrix containing data from a plurality of vehicle journeys. Each journey can be separated by an open door state where the driver's door was open. From the supermatrix the super mean and the supervariance can be calculated, and from those values the above mentioned test can be performed. The supermean can be the mean throttle derivative value $\overline{T}_s^d$ of the supermatrix, i.e. of all journeys of driver d, or the mean $\overline{\overline{T}}_s^d$ of all journey-means $\overline{T}_k^d$. The supervariance $\sigma_s^d$ can be the variance of all throttle derivative values $\overline{T}_{ij}^d$ of the supermatrix of driver d or the mean $\overline{\sigma}_k^d$ of all journey-variances $\sigma_k^d$. The above equations then have to be varied respectively.

In the above equations the sample-mean and the sample-variance are compared with the superdata. In a further embodiment instead of the superdata the data of each clear journey, called journey data set of clear journey k, can be kept separate, and the sample data are compare with some or all journey data sets one after the other. This can be done by mean of the F-test, as mentioned above. For each comparison of the current sample with a journey set a result or score is achieved, thus a plurality of scores are present. As above, the tests are performed for every known driver, so for each driver such a set of scores is determined.

The driver with the best set score, or a driver with a set result above a predefined set score is identified as the current driver driving the vehicle. In case of similar results or no sufficient result the comparison of the journey data of the unknown driver with the superdata of the known drivers can be discarded, and the journey cannot be assigned to a known driver, i.e. the current driver is not identifiable.

In another embodiment of the invention, the section boundaries 425 of FIG. 9 are set by starting a journey or leaving a driving characteristic category or driving metric category. The section boundaries 425 mark the geographic place of category change. The section boundaries 425 can be set by the driver, for example, by changing the level of assisted driving and thus changing a category. Or the vehicle leaves an urban zone and enters a rural region or a highway which again marks a category change and thus sets a section boundary 425. Or the time of the day changes from normal traffic period to rush hour, the respective time points are deposited in the on-board device 8 or come from the server 404.

The route section 424 is part of a driving route which was chosen by the vehicle driver before the beginning of the journey. During the journey the vehicle 400 is driven and controlled by the autonomous driving control unit 406, or it is manually driven if the driver has chosen this option. Further, the driving assist systems 407 are active—if not deactivated by the driver—and guide the vehicle 400 as well according to their ability spectrum, like keeping the vehicle 400 inside the lane, or braking the vehicle 400 automatically if approaches an obstacle too fast.

FIG. 3 shows a multidimensional space with a plurality of dimensions, from which only three are shown for reasons of clarity and comprehensibility: The dimension of emotional driving, of driver assist technique, and driving location of the vehicle. Each dimension is partitioned into classes, wherein the partitioning can be discrete, like in the geographical or technical dimension, or continuous, like in dimensions covering specifics of road and traffic conditions, number of adjacent vehicles under driver manual, safety assist or autonomous control, weather conditions or time of day.

In the embodiment of FIG. 3 the multidimensional space is divided into 4×3×3=36 space volumes. In general, each volume of the parameter space defines a category and is covered by a driving quality metric, wherein a driving quality metric may cover only a single category or a plurality of categories. In the embodiment shown in FIG. 3 driving quality metrics and categories are identical, thus, 36 driving quality metrics are present.

A driving quality metric is assembled during a plurality of vehicle journeys. During each of these journeys the current driving is categorized into one of the categories, and driving characteristics data as assigned to this category. A journey may comprise one or more sections 424, as described to FIG. 2 above, each section 424 corresponding to a single category or a single metric.

FIG. 4 shows the three metrics $QM_0$, $QM_1$ and $QM_4$ of the technical dimension with regard to manual driving (level 0), semi-autonomous driving (level 1-3), and autonomous driving (level 4-5). In a first step, during a plurality of vehicle journeys, their sections 424 are evaluated with regard to a driving characteristic resulting in a single value $m_{ij}$ for each section 424, in this embodiment, i representing the category or metric and j representing the number of the value in this metric. In the second step the values $m_{ij}$ are assembled into their associated driving quality metric $QM_i$, the ensemble of values $m_{ij}$ forming the respective metric $QM_i$. In another definition, the driving quality metric $QM_i$ is a value or function derived from the ensemble of values $m_{ij}$, like the mean $\overline{M}_j$ of all values $m_{ij}$, the median, or the like. This value or function serves for a later application. In the following the term driving quality metric $QM_i$ covers both, the ensemble of values $m_{ij}$ forming the respective metric $QM_i$ and the value or function derived from the ensemble of values $m_{ij}$. In the third step the variances $\sigma_i$ of the resulting metrics $QM_i$ are determined. The variance $\sigma_i$ of each metric $QM_i$ is used for validity evaluation of the respective metric $QM_i$.

This test is performed in step 4. Depending on the kind of values $m_{ij}$ of the m metrics $QM_i$ the appropriate statistical test is used. In the embodiment of FIG. 4 the F-test is used, testing the variance $\alpha_j$ of the metric $QM_i$ under investigation. The variance $\sigma_i$ is tested versus the variance $\sigma_0$ of a reference metric $QM_0$, which is the metric representing the manual driving, in this case metric $QM_0$. In general, it could happen, that no metric is present in the respective dimension which purely results from manual driving. In that case the reference metric is the metric resulting from the most manual driving of all metrics in the dimension. This metric $QM_0$ should show a higher variance $\sigma_0$ than the metric $QM_i$ under investigation since manual driving usually comes with higher driving parameter fluctuations.

If the metric $QM_i$ or variance $\sigma_i$ passes the test, the method proceeds to step 6. If it does not pass the statistical test as supplemental test may be performed in step 5. In this embodiment it is the simple test whether the variance $\sigma_i$ of the metric under investigation is smaller than the variance $\sigma_0$ of the reference metric $QM_0$. If this is the case, the metric $QM_i$ is classified as reliable and the test is passed. Based on operational experience one may actually reflect this indication of salutary driving by some judgment based adjustment of the value of the $QM_j$ driving metric value which is used for further application. Accordingly, the metric $QM_i$ seen as a value or function may be adjusted, the adjustment being dependent on the variance $\sigma_i$ of the values $m_{ij}$ of the metric $QM_i$.

If the variance $\sigma_i$ of the metric under investigation is higher than the variance $\sigma_0$ of the reference metric $QM_0$, the metric $QM_i$ is classified as unreliable. Two ways of handling are useful in this case: Either the metric $QM_i$ value or function is adjusted, like towards a more dangerous, emotional, faster and/or busier road driving, or the metric $QM_i$ is discarded. In this case, since a current falling into this unreliable class needs to be treated as well, like adapting a controlling parameter to the current driving characteristics, it should be assigned to the most suitable metric $QM_j$. This could be the manual metric $QM_0$, leading to the most conservative or careful parameter rate among the metrics $QM_i$ present in this dimension. Accordingly, for application, the unreliable metric $QM_i$ value or function, like the mean $\overline{M}_j$ of the unreliable metric $QM_i$, is substituted by the metric $QM_0$, as shown in step 5 of FIG. 4.

In step 6 the value of the reliable metric $QM_i$ is weighted with a weighting factor $W_i$, like with a travelling distance weighting, if used for actuarial purposes, or with a weighting resulting from other driving characteristics or circumstances, if used for adapting a driver assist control parameter, for example. In step 7, the weighted value $W_i \times QM_i$ is applied to a function $f(M_i)$ characterizing the adaptation of the control parameter or any other use. The weighting factor $W_i$ may be a single value for each metric/category.

If the goal is a derivation of a driving danger value D for a driven journey or all driven sections during a predefined time period, like an actuarial period, the weighting factors $W_i$ can be the travel distances of the particular travelled sections 424 of each category. The application may then be a function f which relates the metric $QM_i$ to driving danger: $D=f(W_i \times QM_i)$.

In general, each category may have its specific weighting factor, wherein the overall weighting factor $W_i$ may comprise the category specific weighting factor and one or more further weighting factors, like a travel distance, a time of the day, or the like. These weightings can be determined empirically or statistically, or even negotiated with the driver to give him influence over driver assist control reactions or UBI actuarial rates depending on his driving.

It may eventually be useful to obtain metrics with a high number of values to reach a reliable result. If many categories are present in the category space, like shown in FIG. 3, some of the metrics $QM_i$ may eventually contain not enough values $m_{ij}$. It could be useful, thus, to summarize some metrics $QM_i$ to a super-metric SM:

$$SM = \sum_k P_k \times QM$$

wherein k is the number of all metrics $QM_i$ to be summarized, and $P_k$ is an adjustment factor or function for each metric $QM_i$, × indicating a multiplication or any other mathematical function.

This super-metric may then be treated as a normal metric $QM_i$ in the steps described above. To assemble the super-metric SM a main category may be defined, urban—speeding—level 0, for example, or Saturday night driving between 10 pm and 5 am the next morning—speeding—driver xyz. Then all metrics $QM_i$ of related dimensions which contain one or more of the indices of the main category are summarized into the super-metric. Related means, that to each category specific dimensions are related by predefined definition.

To give an example, with regard to FIG. 3 and a main category urban—speeding—level 0, if the emotional dimension is related, the super-metric spans over the following categories/metrics: urban—all emotional categories—level 0. If the geographical dimension is related too, the super-metric spans over the following categories/metrics: all geographical categories—all emotional categories—level 0. Of course, any other grouping may be performed starting from the main category, and spanning over any related dimension.

Related dimensions in this sense may be those dimensions which are set beforehand to be related to the specific category. By means of vector description: The main category may be described by MC=(a, b, c, . . . , n), with a, b, c, n being the single values of the n dimensional category space, Urban of FIG. 3 will then be (1, x, x), and emotional deceleration is (x, 3, x). Then the super-metric may span over all categories or metrics, respectively, which comprise the indices of the main category and any index of any related dimension.

During driving the driving characteristics will change its class several time, probably. Accordingly, the weighted value $W_i$, $\times QM_i$ will change as well, and the control parameter is adapted to the current driving class or new driving situation, respectively. For this, during driving the driving characteristics is monitored, and the current driving class is determined, like by the evaluation unit 401. To adapt the metrics to the current driving, during or after the journey the driving characteristics data are sent to the server 404 via the long distance communication unit 403. The server 404 adapts the metrics $QM_i$ and returns them into the evaluation unit 401 as update function. Alternatively, the evaluation unit 401 comprises an update function and updates the metrics $QM_i$ autonomously with the current data.

Instead of the classes of the technical dimension, as shown in FIG. 4, the metrics of the classes of another dimension can be taken for evaluation, of course. In any case should the reference metric, however, be in the same dimension than the metric under investigation.

In the foregoing several methods are described which all are standalone methods, but unfold the best results when combined. The four methods, for example, of FIGS. 2 and 3, FIG. 4, FIG. 5, and FIG. 7, can be applied alone, all together with the method of FIG. 6, but can be combined in any manner. The methods of FIG. 10 is a useful completion of one or more of the first four methods to determine driving characteristics of the vehicle or driver respectively more thoroughly. The method of FIGS. 16 and 17 may again be used as completion of the foregoing methods. The same is true for the method according to FIGS. 11 and 12. If the driver characteristics are found they may be applied in the method of FIGS. 11 and 12 to determine the best route to minimize wear and tear of vehicle components or to optimize driver assist system control values or functions. The driver identification method according to FIGS. 13 to 15 will help to re-identify the driver to be able to assign collected driving characterizing data to a driver and thus to a driving quality metric. Other method combinations are useful as well. Accordingly, one or more method steps of any method may be applied to another method for its improvement, independently whether described in the foregoing or not.

The invention claimed is:

1. The method for determining driving characteristics of a vehicle, wherein during operation of the vehicle an acceleration of the vehicle is detected by an acceleration sensor in the vehicle, wherein a driving parameter occurring during an acceleration event in which the vehicle acceleration is above a predetermined threshold is used to determine a driving characteristics value of the vehicle.

2. The method according to claim 1, wherein the driving characteristics value is a value indicating mechanical stress of at least one mechanical component of the vehicle, and the value is used to determine a long term driver induced mechanical stress of the vehicle.

3. The method according to claim 1, wherein the driving parameter is a vehicle speed value indicating a speed that the vehicle drove during the acceleration event.

4. The method according to claim 1, wherein the driving parameter is a speed difference between a speed at a beginning of the acceleration event and a speed at an end of the acceleration event.

5. The method according to claim 1, wherein the driving parameter is stored if a vehicle speed at an end of the acceleration event is at or below a threshold speed, and the driving parameter is discarded if a vehicle speed is above the threshold.

6. The method according to claim 5, wherein the driving parameter is stored if the vehicle speed at the end of the acceleration event is zero, and the driving parameter is discarded if the vehicle speed at the end of the acceleration event is above zero.

7. The method according to claim 1, wherein a speed at an beginning of the acceleration event is used to calculate an acceleration event value from which the driving characteristics value is derived.

8. The method according to claim 1, wherein the driving characteristics value is derived from a number of acceleration events during a driving event and the driving parameter values of those acceleration events.

9. The method according to claim 1, wherein the driving characteristics value is derived from a number of acceleration events during a driving event and acceleration values occurring in each of those acceleration events.

10. The method according to claim 1, wherein the driving characteristics value is derived from a duration time of the acceleration event.

11. The method according to claim 1, wherein the driving parameter is a vehicle speed which occurred during the acceleration event, and wherein for determination of the driving characteristics value a vehicle speed is assigned to a geostationary category of a place of occurrence of the acceleration event.

12. The method according to claim 11, wherein the geostationary value is a traffic category, like urban, rural or highway.

13. The method according to claim 12, wherein for each category a plurality of driving parameter values are averaged to a driving metric.

14. The method according to claim 1, wherein the acceleration sensor is located in a mobile device of a vehicle analyzing system which further comprises a software application which adapts the acceleration threshold to the type of the acceleration sensor.

15. The method according to claim 1, wherein a plurality of driving parameter values, each being a speed difference within an acceleration event, are averaged to an average speed value, and a mechanical stress indicating driving metric is determined from the average speed value divided by the average vehicle speed at a beginning of each acceleration event of the plurality of acceleration events.

16. A vehicle analyzing system comprising an acceleration sensor, a communication unit prepared for sending data to a remote server, an acceleration monitoring unit for monitoring the acceleration of the vehicle and an evaluation unit to determine a driving parameter of the vehicle occurring during an acceleration event in which the vehicle acceleration is above a predetermined threshold.

17. The method according to claim 11, wherein for each category a plurality of driving parameter values are averaged to a driving metric.

* * * * *